United States Patent
Campbell et al.

(10) Patent No.: US 10,864,469 B2
(45) Date of Patent: Dec. 15, 2020

(54) AIR CLEANER ASSEMBLIES AND METHODS OF USE

(71) Applicant: DONALDSON COMPANY, INC., Minneapolis, MN (US)

(72) Inventors: Steven K. Campbell, Lakeville, MN (US); David J. Burton, Minneapolis, MN (US); Benny Nelson, Bloomington, MN (US); Timothy J. Wessels, Victoria, MN (US); Daniel Eric Adamek, Bloomington, MN (US); Robert Dean Johnston, Lakeville, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 158 days.

(21) Appl. No.: 16/000,629

(22) Filed: Jun. 5, 2018

(65) Prior Publication Data

US 2018/0345196 A1    Dec. 6, 2018

Related U.S. Application Data

(60) Provisional application No. 62/584,552, filed on Nov. 10, 2017, provisional application No. 62/515,284, filed on Jun. 5, 2017.

(51) Int. Cl.
*B01D 46/00* (2006.01)
*B01D 46/10* (2006.01)
(Continued)

(52) U.S. Cl.
CPC ..... *B01D 46/0006* (2013.01); *B01D 46/0004* (2013.01); *B01D 46/0024* (2013.01);
(Continued)

(58) Field of Classification Search
CPC ............ B01D 46/0004; B01D 46/0006; B01D 46/525; B01D 46/527; B01D 2265/025; B01D 2265/028; B01D 2271/022
See application file for complete search history.

(56) References Cited

U.S. PATENT DOCUMENTS 5,030,264 A    7/1991  Klotz et al.
5,472,463 A   12/1995  Herman et al.
(Continued)

FOREIGN PATENT DOCUMENTS

DE    100 55 732 A1    3/2002
DE    103 50 119 B3    1/2005
(Continued)

OTHER PUBLICATIONS

International Search Report and Written Opinion for Application No. PCT/US2018/036119 dated Mar. 1, 2019.
(Continued)

*Primary Examiner* — Robert Clemente
(74) *Attorney, Agent, or Firm* — Merchant & Gould P.C.

(57) ABSTRACT

An air cleaner assembly is disclosed. In one aspect, the air cleaner assembly includes a housing defining an inlet and an outlet, and including an access opening between the inlet and outlet. The air cleaner also includes a filter cartridge received within the housing and covering the access opening. The air cleaner also includes a lock mechanism. The lock mechanism is movable between an unlocked position in which the filter cartridge can be installed and removed from the housing and a locked position in which the filter cartridge is secured within the housing. The filter cartridge and lock mechanism include interacting features allowing the lock mechanism to be moved from the unlocked position to the locked position only when the filter cartridge is installed within the housing.

5 Claims, 73 Drawing Sheets

(51) Int. Cl.
*F02M 35/024* (2006.01)
*B01D 46/52* (2006.01)
*B01D 46/24* (2006.01)
*B01D 50/00* (2006.01)

(52) U.S. Cl.
CPC ......... *B01D 46/10* (2013.01); *B01D 46/2411* (2013.01); *B01D 46/525* (2013.01); *F02M 35/024* (2013.01); *B01D 50/002* (2013.01); *B01D 2201/28* (2013.01); *B01D 2201/29* (2013.01); *B01D 2265/025* (2013.01); *B01D 2265/028* (2013.01); *B01D 2267/40* (2013.01); *B01D 2271/022* (2013.01); *B01D 2279/60* (2013.01)

(56) References Cited

U.S. PATENT DOCUMENTS

| | | |
|---|---|---|
| 5,494,497 A | 2/1996 | Lee |
| 5,545,241 A | 8/1996 | Vanderauwera et al. |
| 5,613,992 A | 3/1997 | Engel |
| 5,772,883 A | 6/1998 | Rothman et al. |
| D396,098 S | 7/1998 | Gillingham et al. |
| 5,792,247 A | 8/1998 | Gillingham et al. |
| D398,046 S | 9/1998 | Gillingham et al. |
| D399,944 S | 10/1998 | Gillingham et al. |
| 5,820,646 A | 10/1998 | Gillingham et al. |
| 5,895,574 A | 4/1999 | Friedmann et al. |
| 5,902,364 A | 5/1999 | Tokar et al. |
| 6,039,778 A | 3/2000 | Coulonvaux |
| D428,128 S | 7/2000 | Gillingham et al. |
| 6,179,890 B1 | 1/2001 | Ramos et al. |
| D437,401 S | 2/2001 | Ramos et al. |
| 6,190,432 B1 | 2/2001 | Gieseke et al. |
| 6,210,469 B1 | 4/2001 | Tokar |
| 6,235,195 B1 | 5/2001 | Tokar |
| 6,350,296 B1 | 2/2002 | Warner |
| 6,375,700 B1 | 4/2002 | Jaroszczyk et al. |
| 6,673,136 B2 | 1/2004 | Gillingham et al. |
| 6,808,547 B2 | 10/2004 | Ota et al. |
| 7,004,986 B2 | 2/2006 | Kepec et al. |
| 7,341,613 B2 | 3/2008 | Kirsch |
| 7,494,017 B2 | 2/2009 | Miller |
| 7,625,419 B2 | 12/2009 | Nelson et al. |
| 7,942,423 B2 | 5/2011 | Kondo et al. |
| 7,959,700 B2 | 6/2011 | Kidman |
| 8,034,145 B2 | 10/2011 | Boehrs et al. |
| 8,152,876 B2 | 4/2012 | Gillenberg et al. |
| 8,216,332 B2 | 7/2012 | Kopec et al. |
| 8,273,145 B2 | 9/2012 | Banks et al. |
| 8,318,251 B2 | 11/2012 | Cavanaugh et al. |
| 8,343,245 B2 | 1/2013 | Coulonvaux et al. |
| 8,382,876 B2 | 2/2013 | Widerski et al. |
| 8,496,723 B2 | 7/2013 | Reichter et al. |
| RE44,424 E | 8/2013 | Barnwell |
| 8,668,756 B2 | 3/2014 | Zou et al. |
| 8,888,882 B2 | 11/2014 | Ackermann et al. |
| 8,916,044 B2 | 12/2014 | Rapin |
| RE45,588 E | 6/2015 | Engelland et al. |
| 9,101,864 B2 | 8/2015 | Neef et al. |
| 9,127,625 B2 | 9/2015 | Kaiser |
| 9,162,172 B2 | 10/2015 | Nepsund et al. |
| 9,180,399 B2 | 11/2015 | Reichter et al. |
| 9,283,507 B2 | 3/2016 | Coulonvaux et al. |
| 9,295,936 B2 | 3/2016 | Krisko et al. |
| D770,026 S | 10/2016 | Morgan et al. |
| 9,623,351 B2 | 4/2017 | Kindkeppel et al. |
| 9,638,147 B2 | 5/2017 | Hasenfratz et al. |
| 2004/0020177 A1 | 2/2004 | Ota et al. |
| 2004/0187689 A1 | 9/2004 | Sporre et al. |
| 2005/0130508 A1 | 6/2005 | Yeh |
| 2008/0047240 A1 | 2/2008 | Trautmann et al. |
| 2008/0148695 A1 | 6/2008 | Terres et al. |
| 2010/0000413 A1 | 1/2010 | Turner et al. |
| 2010/0034646 A1 | 2/2010 | Magara et al. |
| 2010/0064646 A1 | 3/2010 | Smith et al. |
| 2013/0199143 A1 | 8/2013 | Zou et al. |
| 2013/0200575 A1 | 8/2013 | Humblot et al. |
| 2014/0250843 A1 | 9/2014 | Krull et al. |
| 2015/0075126 A1 | 3/2015 | Schmid et al. |
| 2015/0176544 A1 | 6/2015 | Kaufmann et al. |
| 2015/0306530 A1 | 10/2015 | Reichter et al. |
| 2016/0061159 A1 | 3/2016 | Ryon et al. |
| 2016/0230716 A1 | 8/2016 | Finn |
| 2017/0095761 A1 | 4/2017 | Knight et al. |
| 2017/0096973 A1 | 4/2017 | Kaufmann et al. |
| 2017/0165601 A1 | 6/2017 | Wuebbeling et al. |
| 2017/0304760 A1 | 10/2017 | Kaufmann et al. |
| 2017/0361260 A1 | 10/2017 | Campbell et al. |

FOREIGN PATENT DOCUMENTS

| | | |
|---|---|---|
| DE | 20 2008 017 059 U1 | 6/2010 |
| DE | 10 2006 039 952 B4 | 12/2012 |
| DE | 10 2014 008 704 B3 | 12/2015 |
| EP | 1 008 375 A1 | 6/2000 |
| EP | 0 932 515 B2 | 9/2001 |
| EP | 1 166 843 A1 | 1/2002 |
| EP | 1 611 937 A1 | 1/2006 |
| EP | 1 843 035 B1 | 8/2012 |
| EP | 2 247 359 B1 | 8/2014 |
| JP | 6-67852 U | 9/1994 |
| JP | 11-82193 A1 | 3/1999 |
| JP | 11-132117 A1 | 5/1999 |
| JP | 2001-329921 A | 11/2001 |
| JP | 2003-120815 A | 4/2003 |
| WO | 2004/007054 A1 | 1/2004 |
| WO | 2004/082795 A2 | 9/2004 |
| WO | 2005/077487 A1 | 8/2005 |
| WO | 2014/164145 A1 | 10/2014 |
| WO | 2016/030037 A1 | 3/2016 |
| WO | 2016/077377 A1 | 5/2016 |
| WO | 2017/079191 A1 | 5/2017 |
| WO | 2017/133796 A1 | 8/2017 |

OTHER PUBLICATIONS

International Search Report and Written Opinion for Application No. PCT/US2017/037994 dated Sep. 18, 2017.
International Search Report and Written Opinion for Application No. PCT/US2018/036119 dated Jan. 7, 2019.

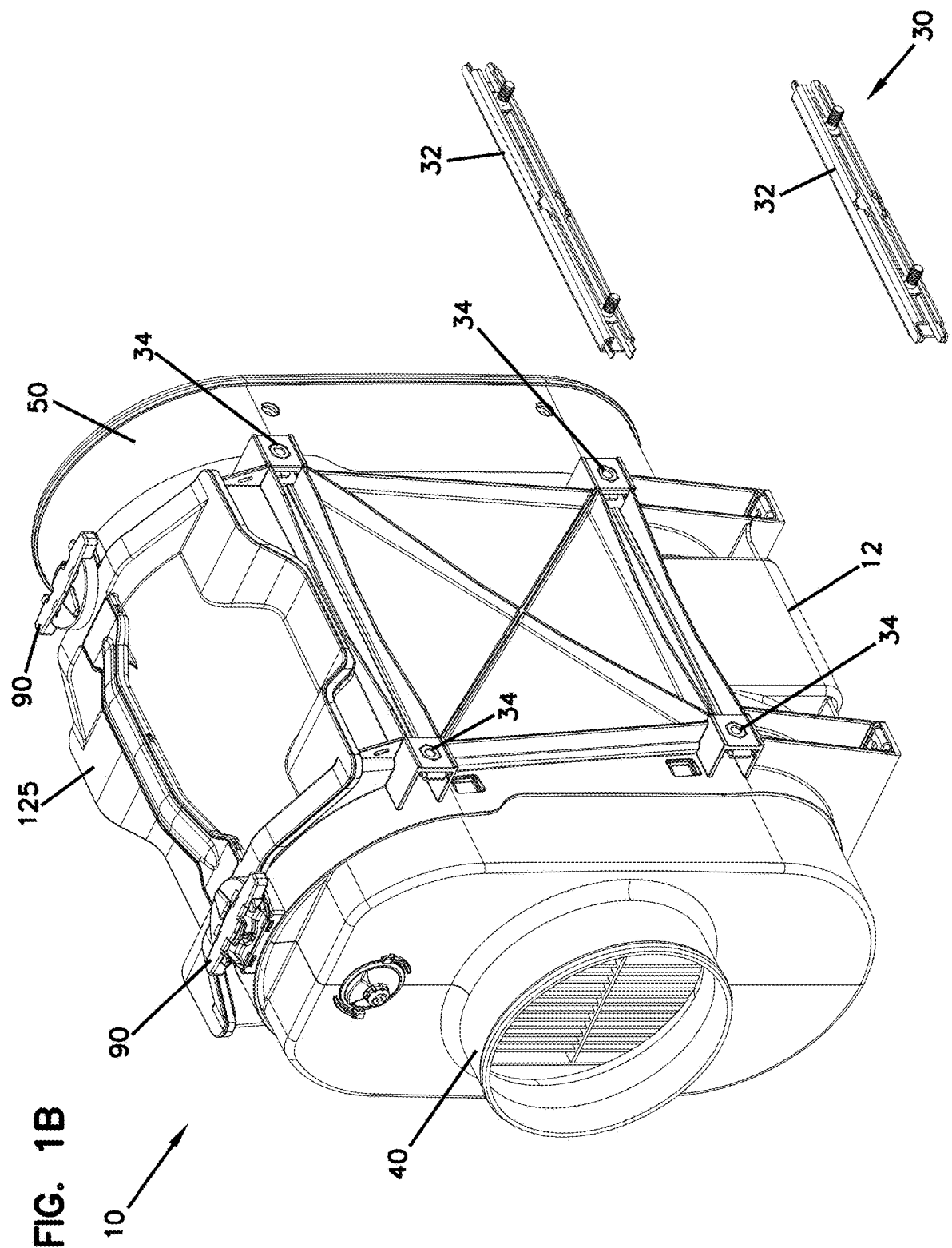

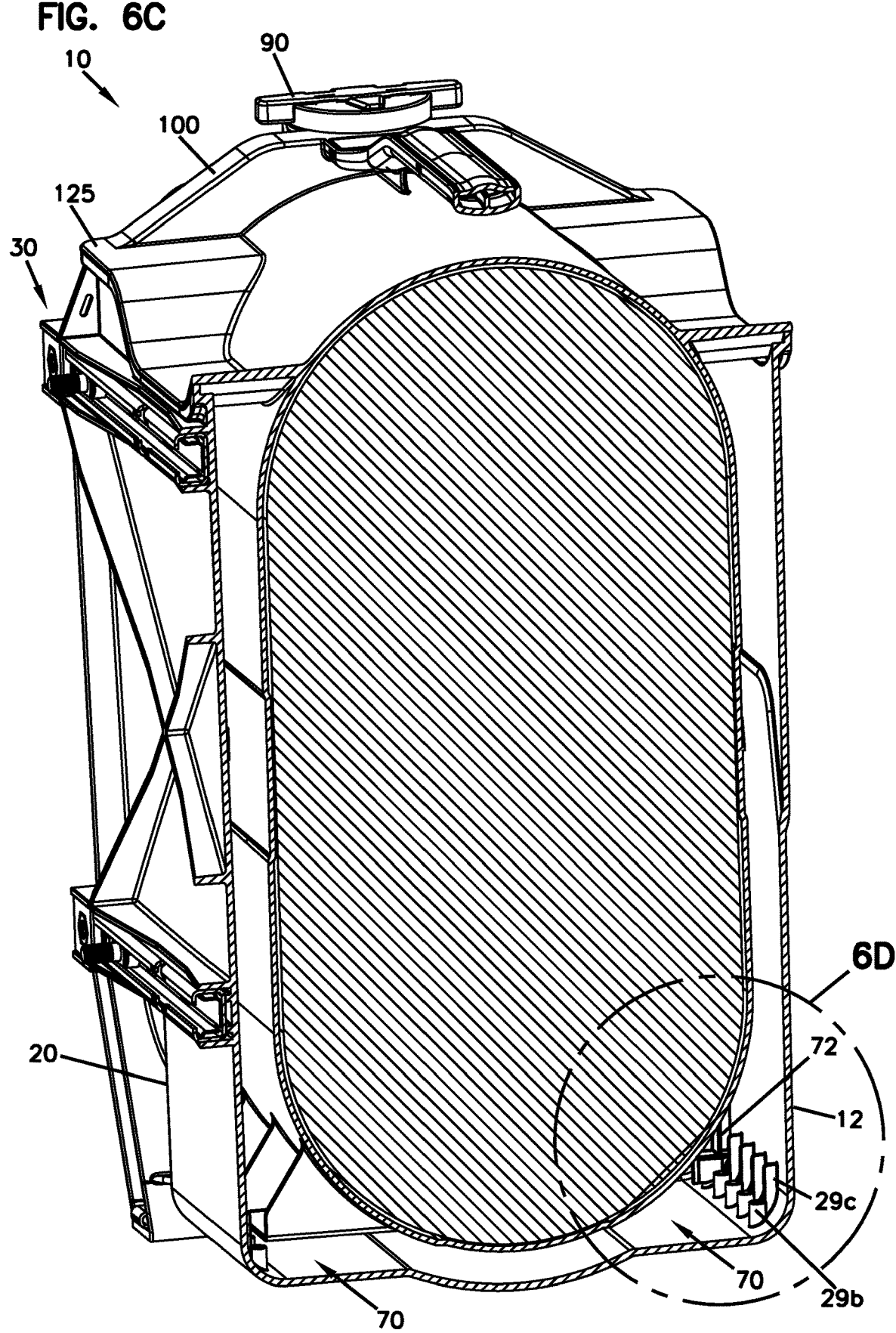

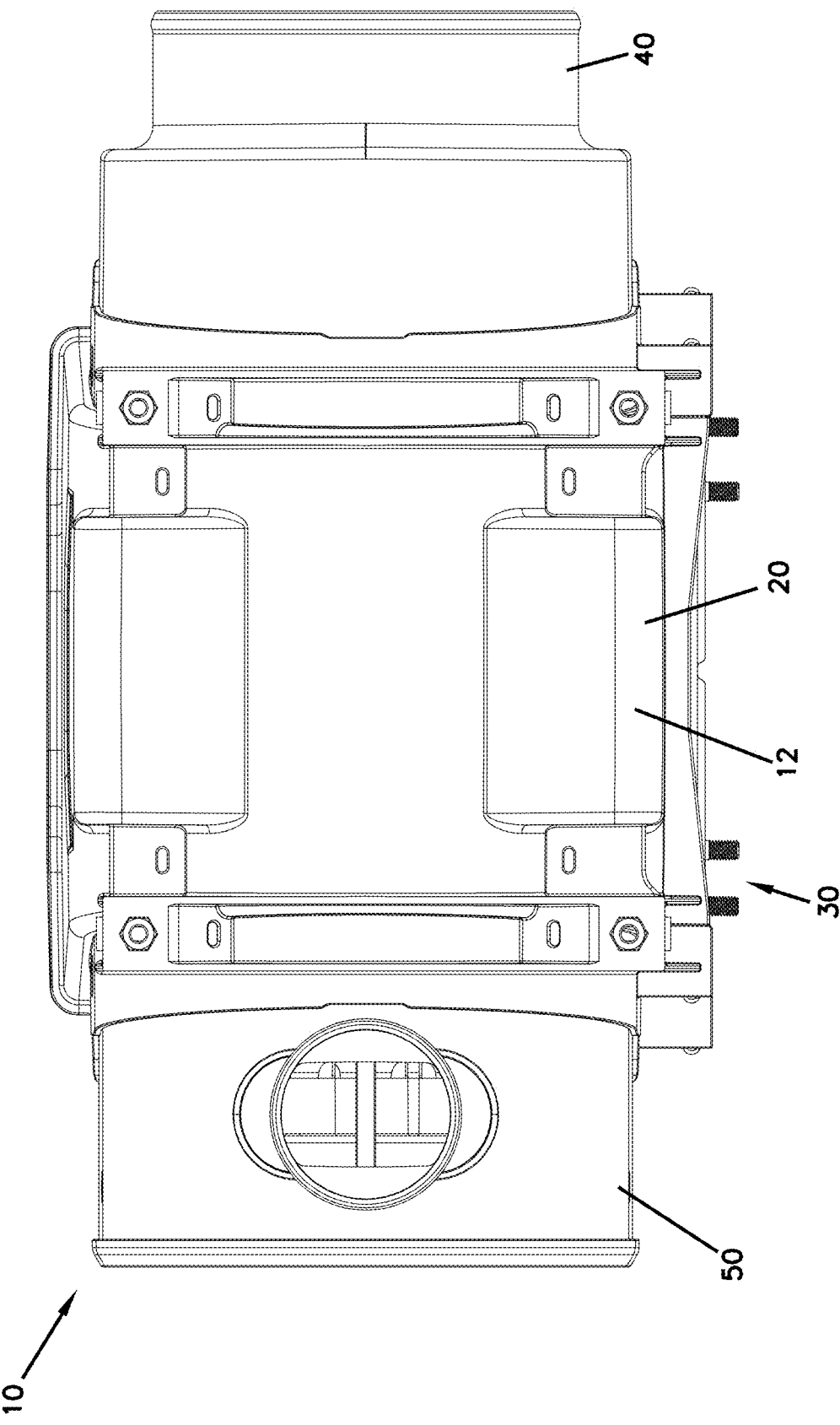

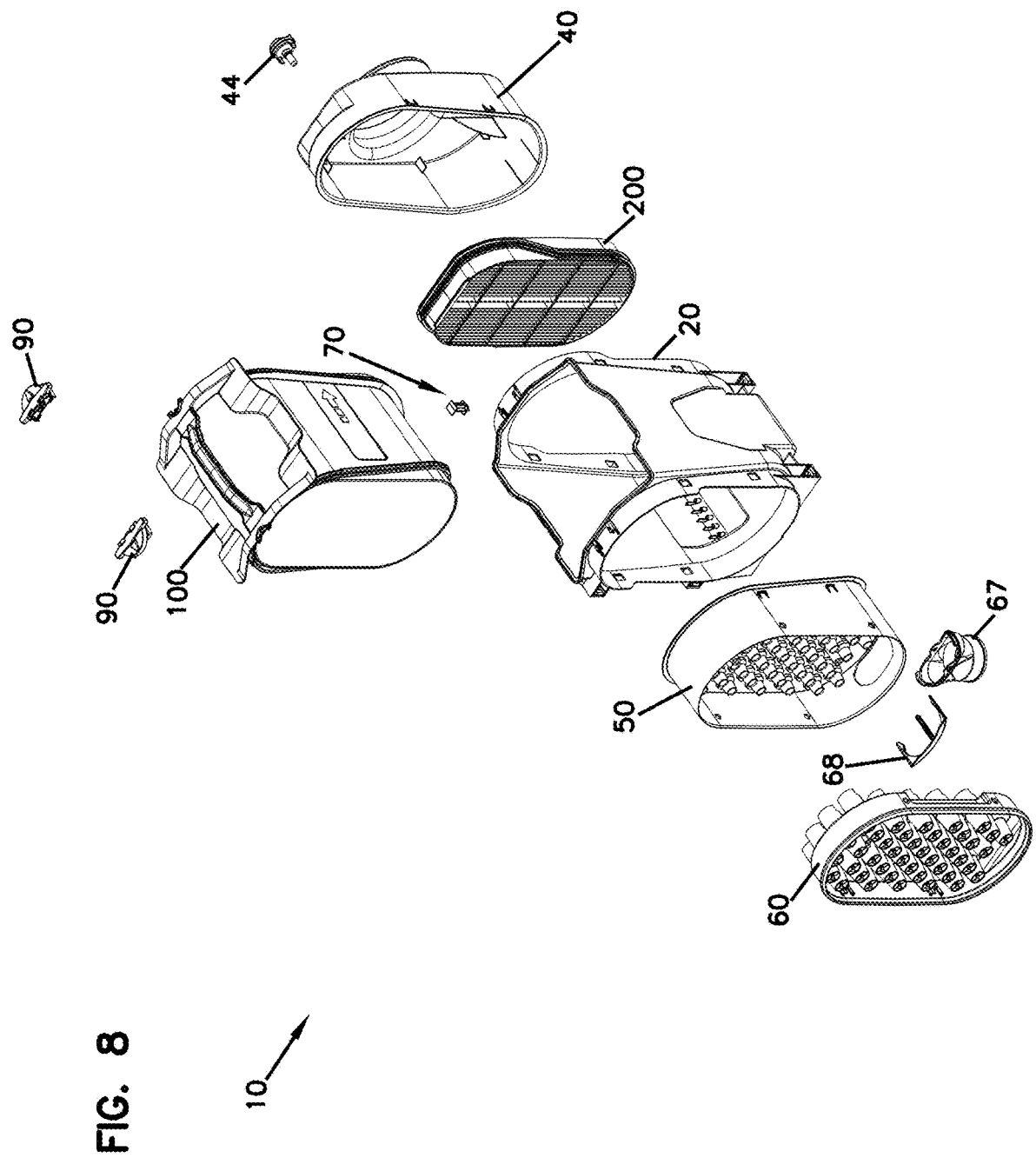

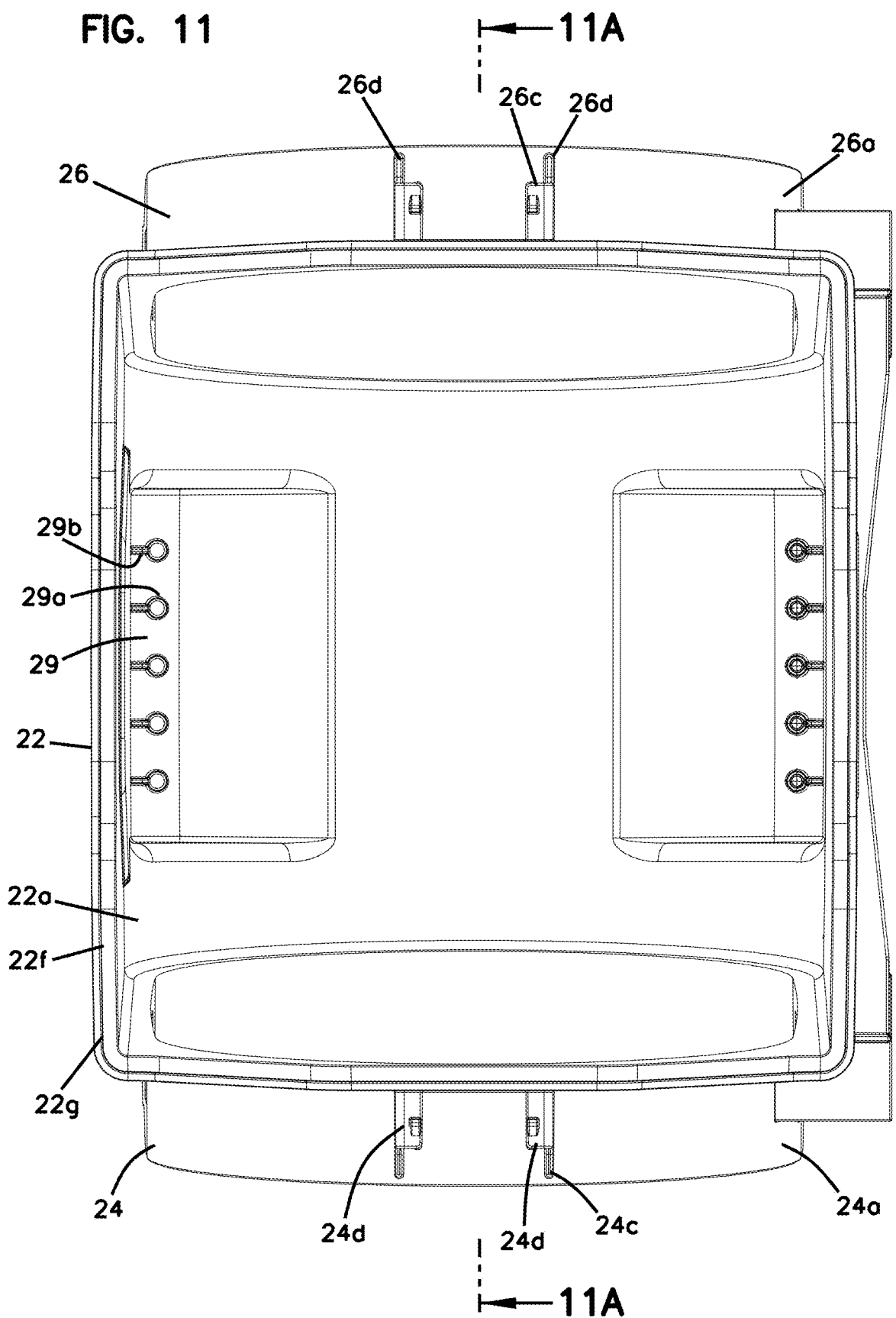

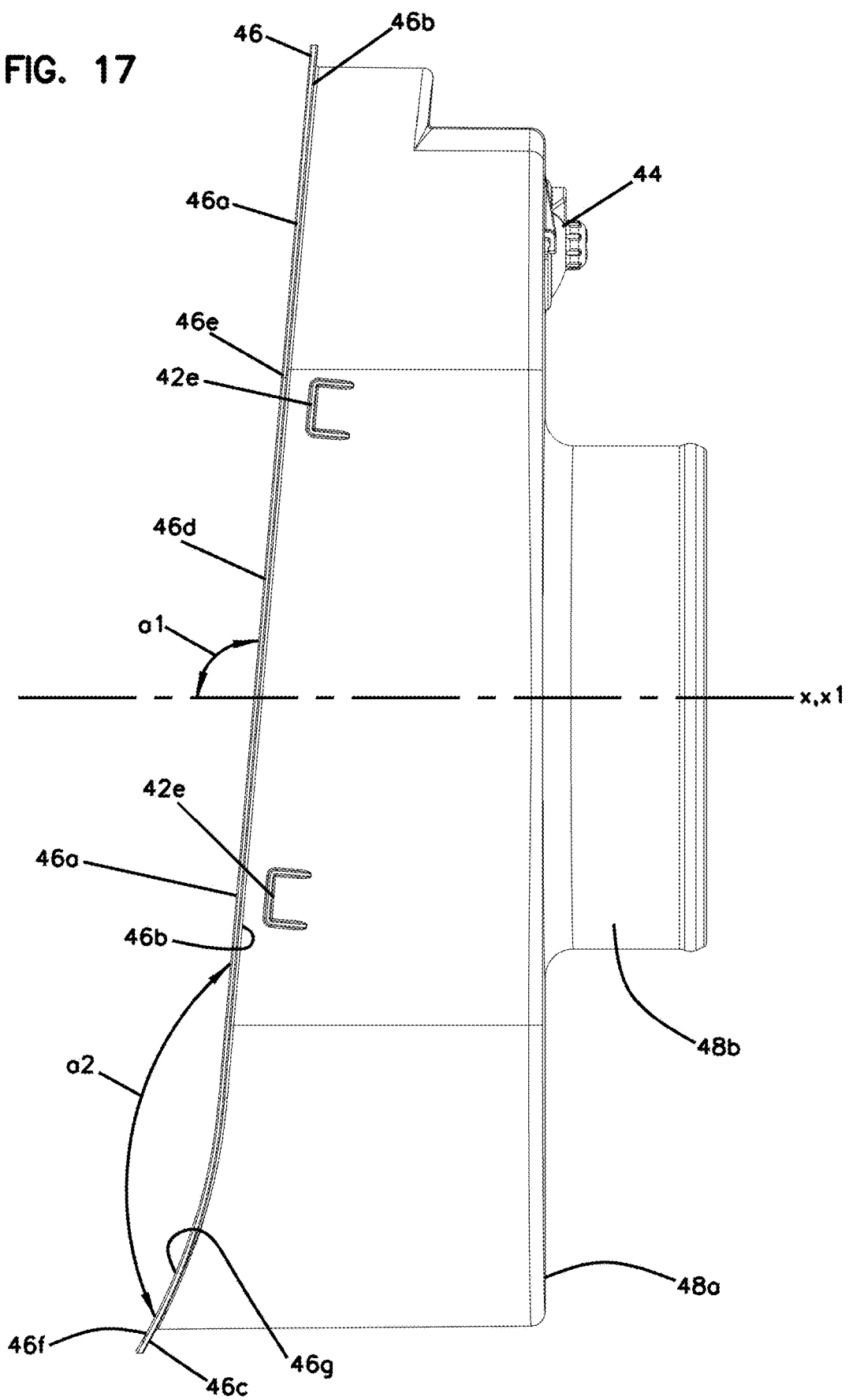

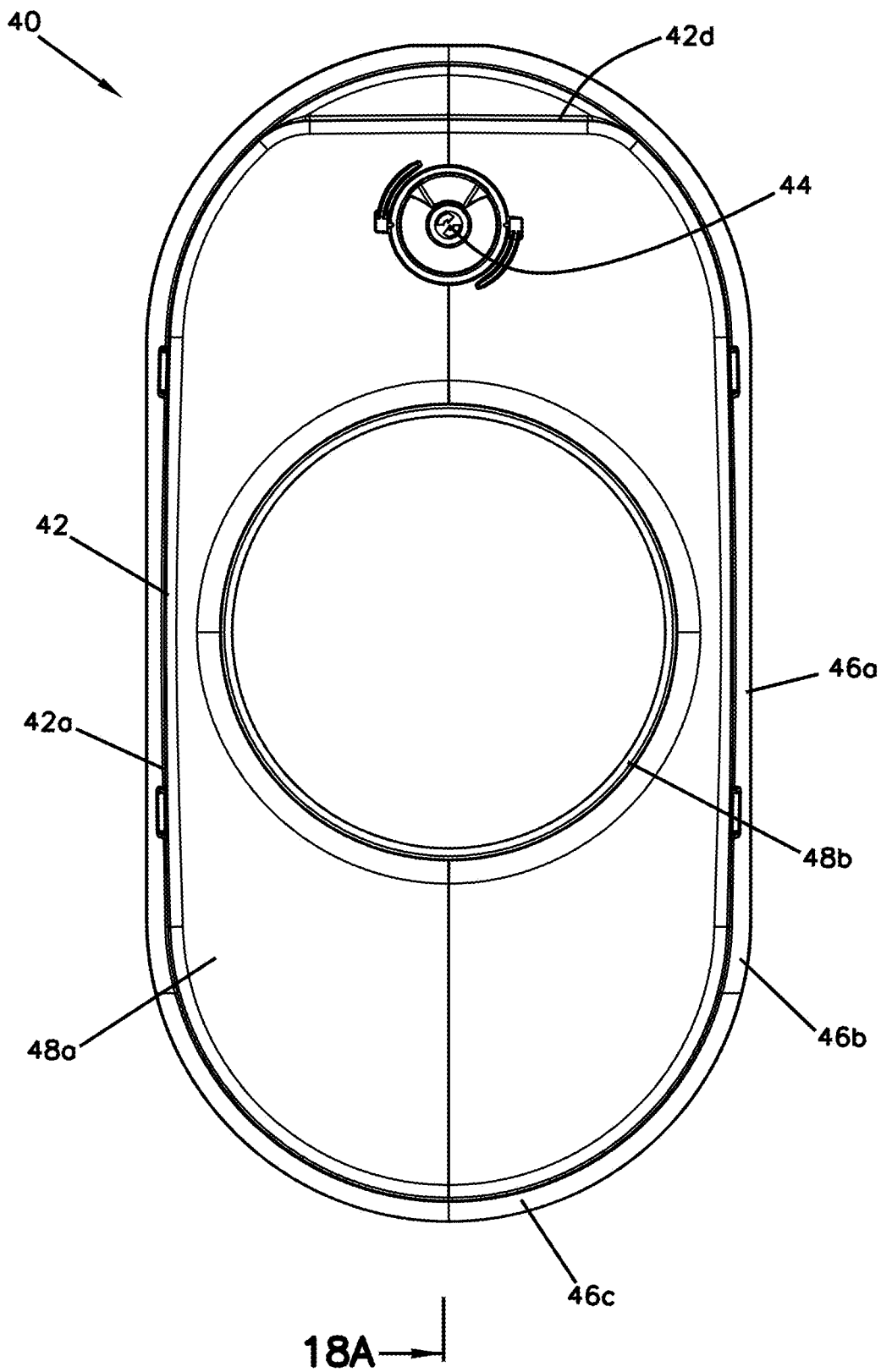

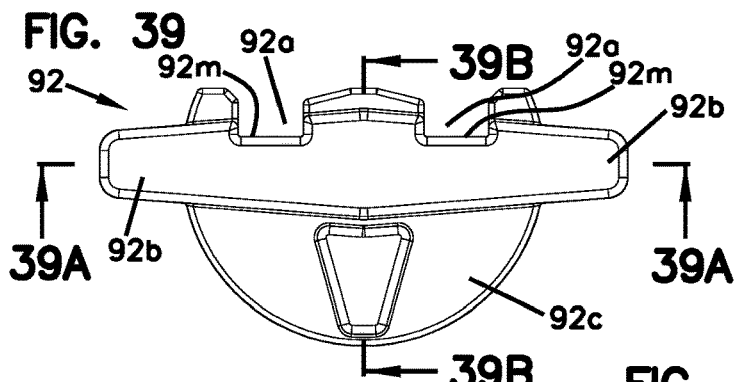
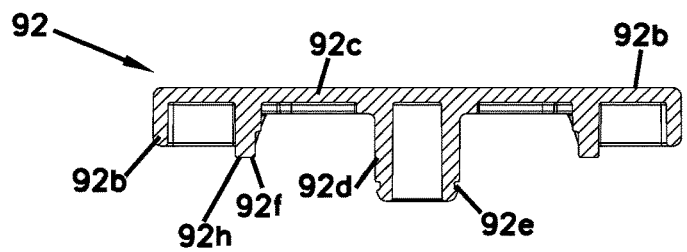
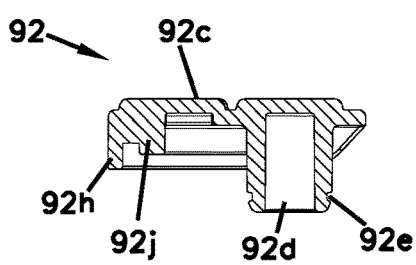
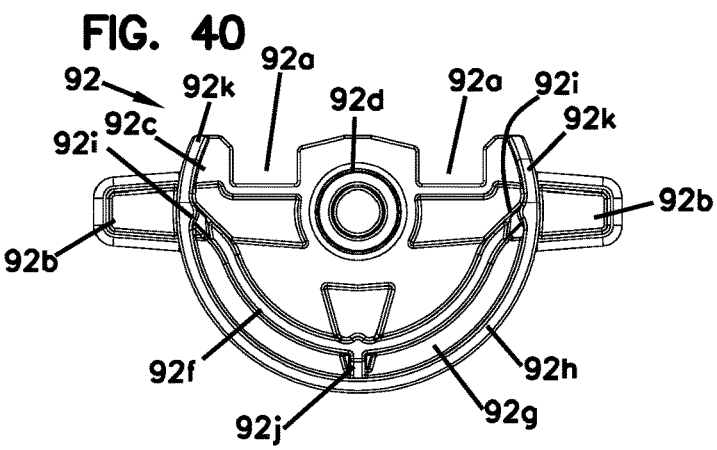
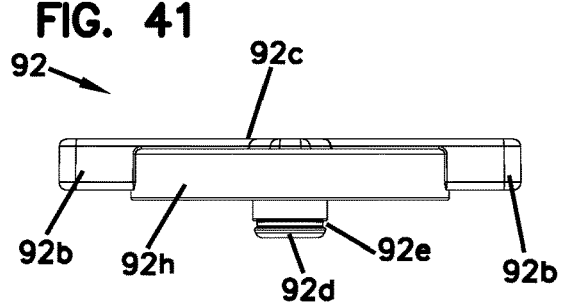
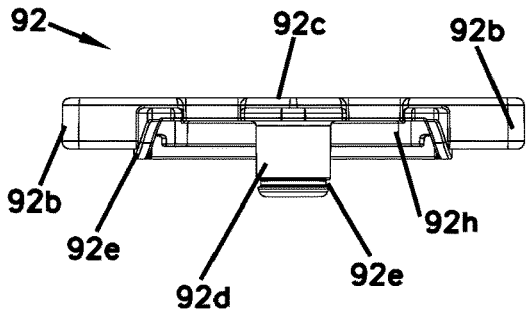
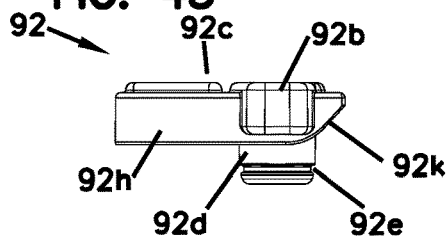

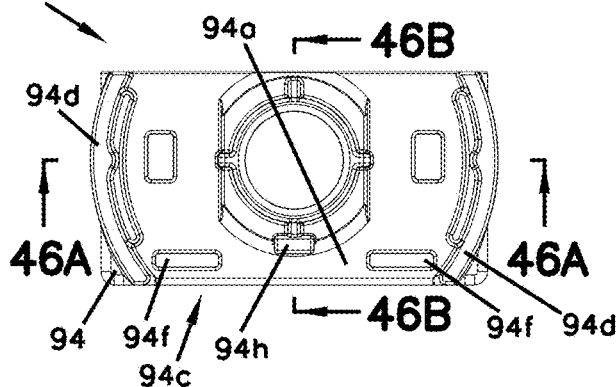
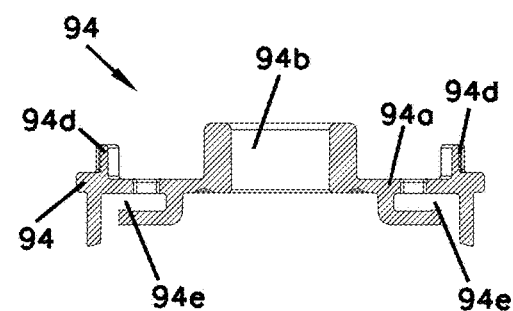
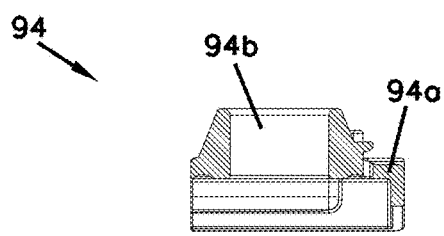
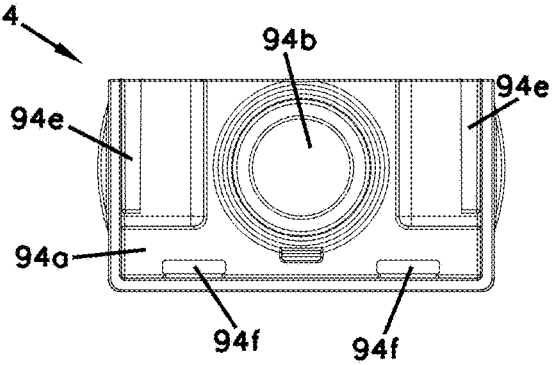
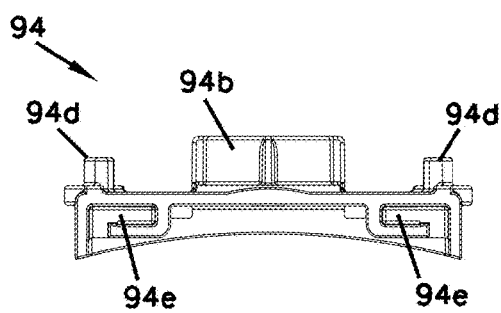
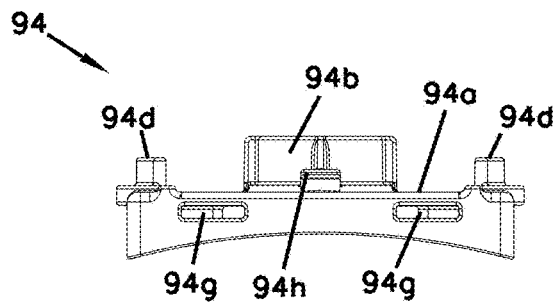
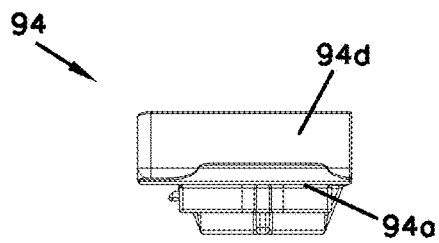

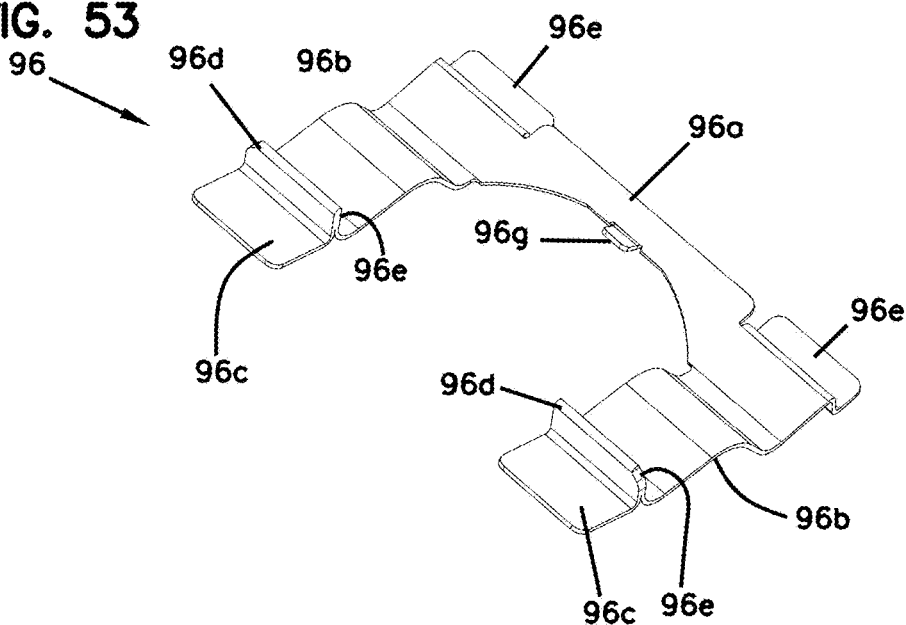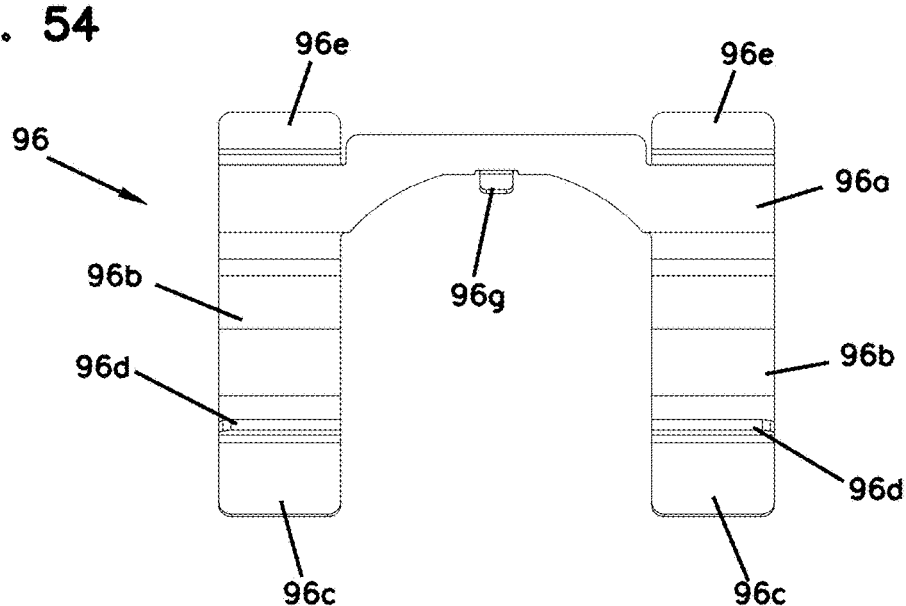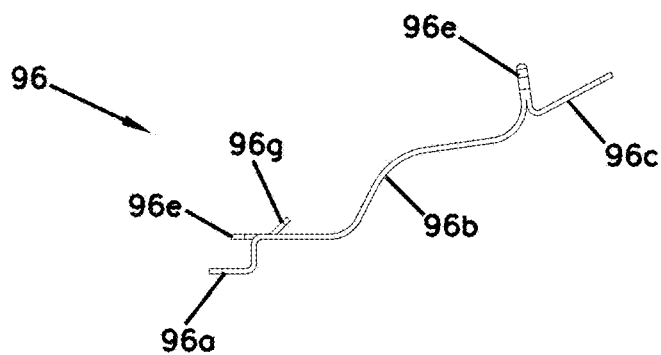

FIG. 92
34
FIG. 93
34
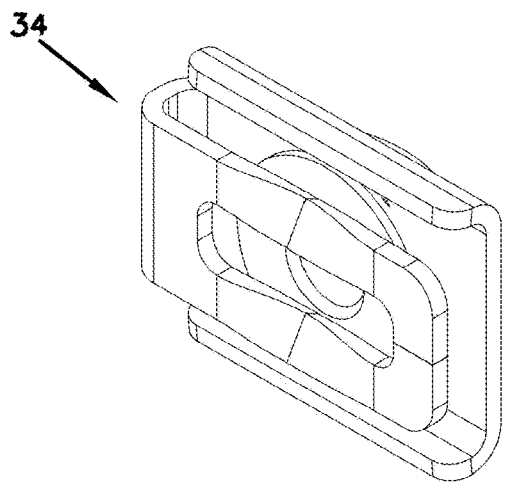
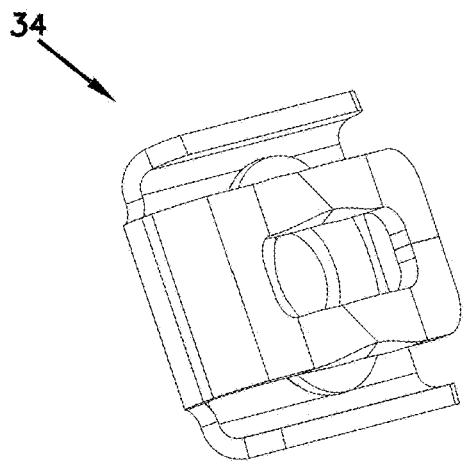
FIG. 94
34
FIG. 95
34
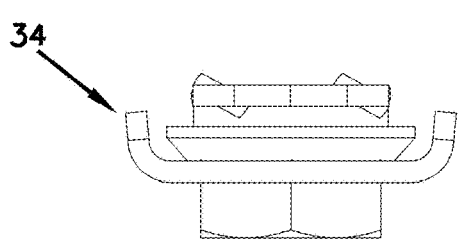
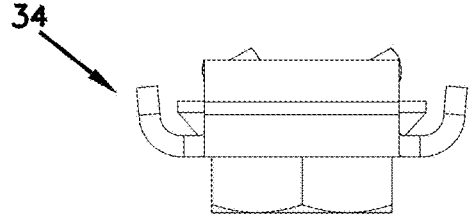
FIG. 96
34
FIG. 97
34
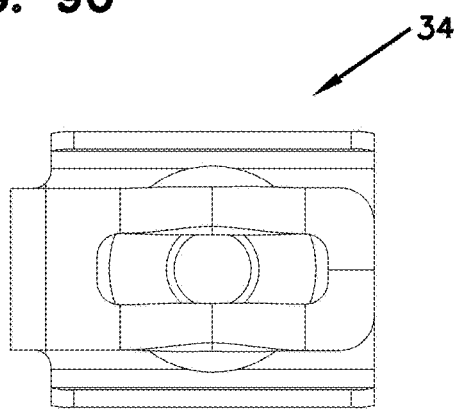
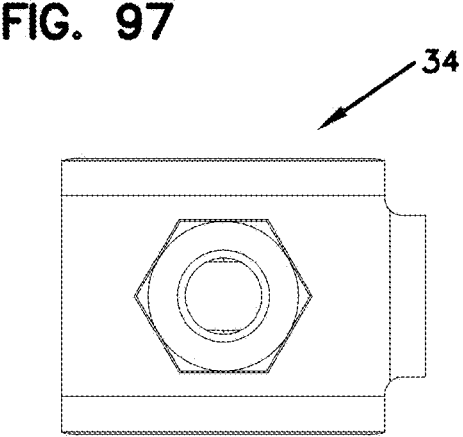
FIG. 98
34
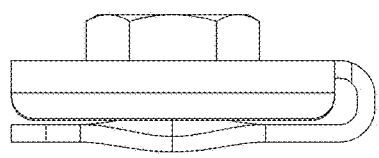

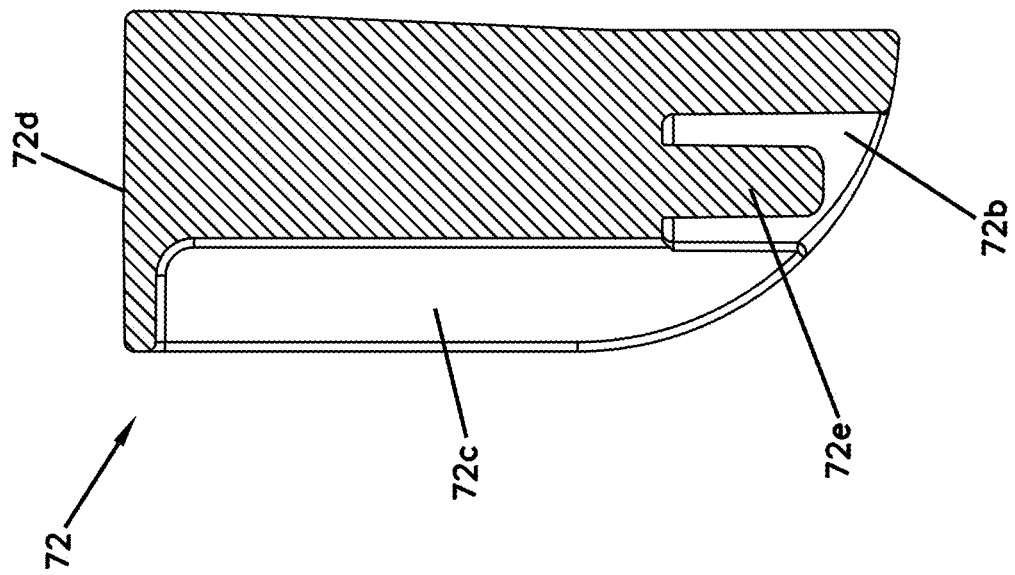
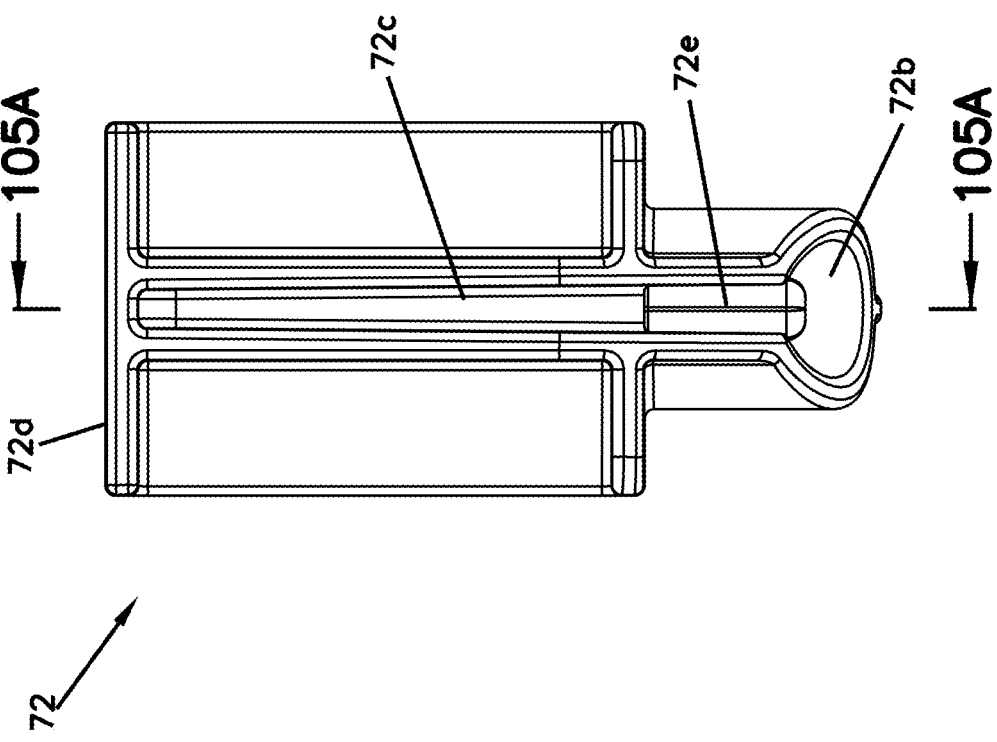

FIG. 107
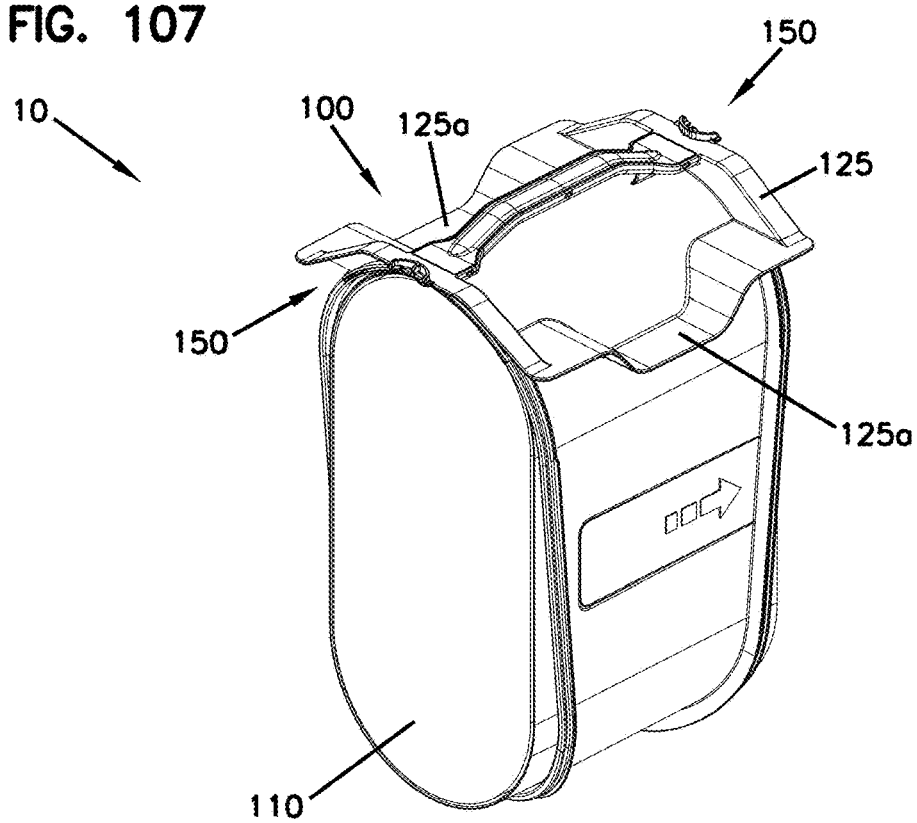
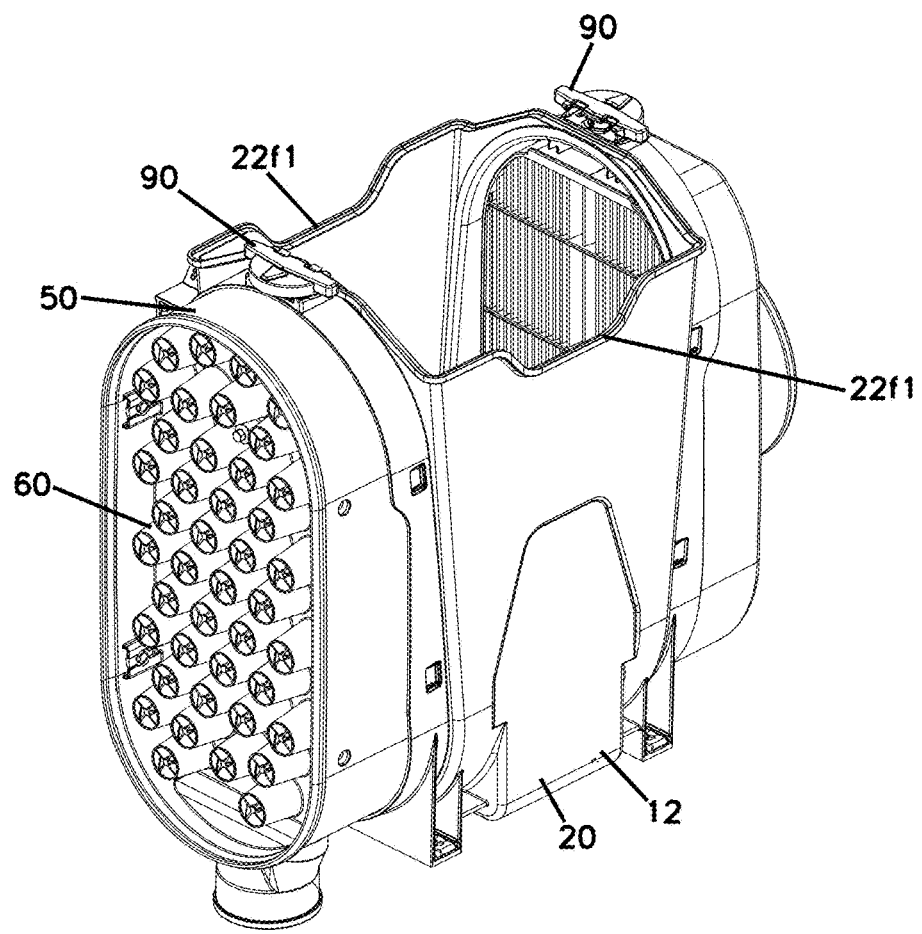

US 10,864,469 B2

AIR CLEANER ASSEMBLIES AND METHODS OF USE

RELATED APPLICATIONS

This application claims priority to U.S. Provisional Patent Applications 62/515,284, filed Jun. 5, 2017 and 62/584,552, filed Nov. 10, 2017, the entireties of which are incorporated by reference herein.

TECHNICAL FIELD

The present invention relates to filter arrangements, typically for use in filtering air, such as intake air for internal combustion engines, and more particularly relates to filter assemblies that include multiple components arranged in a housing to provide desired filtering capabilities.

BACKGROUND

Air or other gas filtering is desirable in a number of systems. A typical application is in the filtration of intake air to internal combustion engines. Another is in the filtration of crankcase ventilation filter assemblies. Typically, such systems comprise filter assemblies having a serviceable filter cartridge therein. After a period of use, filter media within a filter housing requires servicing, either through cleaning or complete replacement. Typically, for an air cleaner or crankcase ventilation filter assembly used with an internal combustion engine, for example, on a vehicle, the filter media is contained in a removable and replaceable, i.e. serviceable, component, typically referred as a filter element or cartridge. The filter cartridge is configured to be removably sealed within the air cleaner, in use. Improvements in filter arrangements relating to assembly, serviceability, and/or use are desirable. The filter cartridge can be provided as a first (e.g., primary) filter cartridge or a second (e.g., secondary or safety) filter cartridge. The air cleaner assembly can contain only a first filter cartridge or both a first filter cartridge and a second filter cartridge.

SUMMARY

An air cleaner assembly is disclosed. In one aspect, the air cleaner assembly includes a housing defining an inlet and an outlet, and including an access opening between the inlet and outlet. The air cleaner also includes a filter cartridge received within the housing and covering the access opening. The air cleaner also includes a lock mechanism. The lock mechanism is movable between an unlocked position in which the filter cartridge can be installed and removed from the housing and a locked position in which the filter cartridge is secured within the housing. The filter cartridge and lock mechanism include interacting features allowing the lock mechanism to be moved from the unlocked position to the locked position only when the filter cartridge is installed within the housing.

BRIEF DESCRIPTION OF THE DRAWINGS

The present invention will be further explained with reference to the appended Figures, wherein like structure is referred to by like numerals throughout the several views, and wherein;

FIG. 1B is a perspective view of the air cleaner shown in FIG. 1, with a mounting structure of a mounting arrangement shown as being removed from the housing.

FIG. 6C is a cross-sectional view of the air cleaner shown in FIG. 1, taken along the line 6C-6C in FIG. 6.

FIG. 7 is a bottom view of the air cleaner shown in FIG. 1.

FIG. 8 is an exploded perspective view of the air cleaner shown in FIG. 1.

FIG. 11 is a top view of the housing shown in FIG. 10.

FIG. 17 is a side view of the outlet assembly shown in FIG. 14.

FIG. 18 is an end view of the outlet assembly shown in FIG. 14.

FIG. 35 is a cross-sectional view of the lock mechanism shown in FIG. 32, taken along the line 35-35 shown in FIG. 32.

FIG. 39 is a top view of an operator part of the lock mechanism shown in FIG. 32.

FIG. 39A is a cross-sectional view of the operator part shown in FIG. 39, taken along the line 39A-39A in FIG. 39.

FIG. 39B is a cross-sectional view of the operator part shown in FIG. 39, taken along the line 39B-39B in FIG. 39.

FIG. 40 is a bottom view of the operator part shown in FIG. 39.

FIG. 41 is a first end view of the operator part shown in FIG. 39.

FIG. 42 is a second end view of the operator part shown in FIG. 39.

FIG. 43 is a side view of the operator part shown in FIG. 39.

FIG. 46 is a top view of a base part of the lock mechanism shown in FIG. 32.

FIG. 46A is a cross-sectional view of the base part shown in FIG. 46, taken along the line 46A-46A in FIG. 46.

FIG. 46B is a cross-sectional view of the base part shown in FIG. 46, taken along the line 46B-46B in FIG. 46.

FIG. 47 is a bottom view of the base part shown in FIG. 46.

FIG. 48 is a first end view of the base part shown in FIG. 46.

FIG. 49 is a second end view of the base part shown in FIG. 46.

FIG. 50 is a side view of the base part shown in FIG. 46.

FIG. 53 is a perspective view of a lock spring of the lock mechanism shown in FIG. 32.

FIG. 54 is a top view of the lock spring shown in FIG. 53.

FIG. 55 is a side view of the lock spring shown in FIG. 53.

FIG. 92 is a first perspective view of a mounting arrangement mounting clip of the air cleaner shown in FIG. 1.

FIG. 93 is a second perspective view of the mounting clip shown in FIG. 92.

FIG. 94 is a first end view of the mounting clip shown in FIG. 92.

FIG. 95 is a second end view of the mounting clip shown in FIG. 92.

FIG. 96 is a top view of the mounting clip shown in FIG. 92.

FIG. 97 is a bottom view of the mounting clip shown in FIG. 92.

FIG. 98 is a side view of the mounting clip shown in FIG. 92.

FIG. 99 is a perspective view of a spacer module of the air cleaner shown in FIG. 1.

FIG. 100 is a second perspective view of the spacer module shown in FIG. 99.

FIG. 101 is a side view of the spacer module shown in FIG. 99.

FIG. 102 is a front view of the spacer module shown in FIG. 99.

FIG. 103 is a top view of the spacer module shown in FIG. 99.

FIG. 104 is a bottom view of the spacer module shown in FIG. 99.

FIG. 105 is a rear view of the spacer module shown in FIG. 99.

FIG. 105A is a cross-sectional view of the spacer module shown in FIG. 99, taken along the line 105A-105A in FIG. 105.

FIG. 106 is a perspective view of the air cleaner shown in FIG. 1, with the lock mechanisms in a locked position.

FIG. 107 is a perspective view of the air cleaner shown in FIG. 1 with the air filter cartridge removed and the lock mechanisms in an unlocked position.

DETAILED DESCRIPTION

Figure 1:
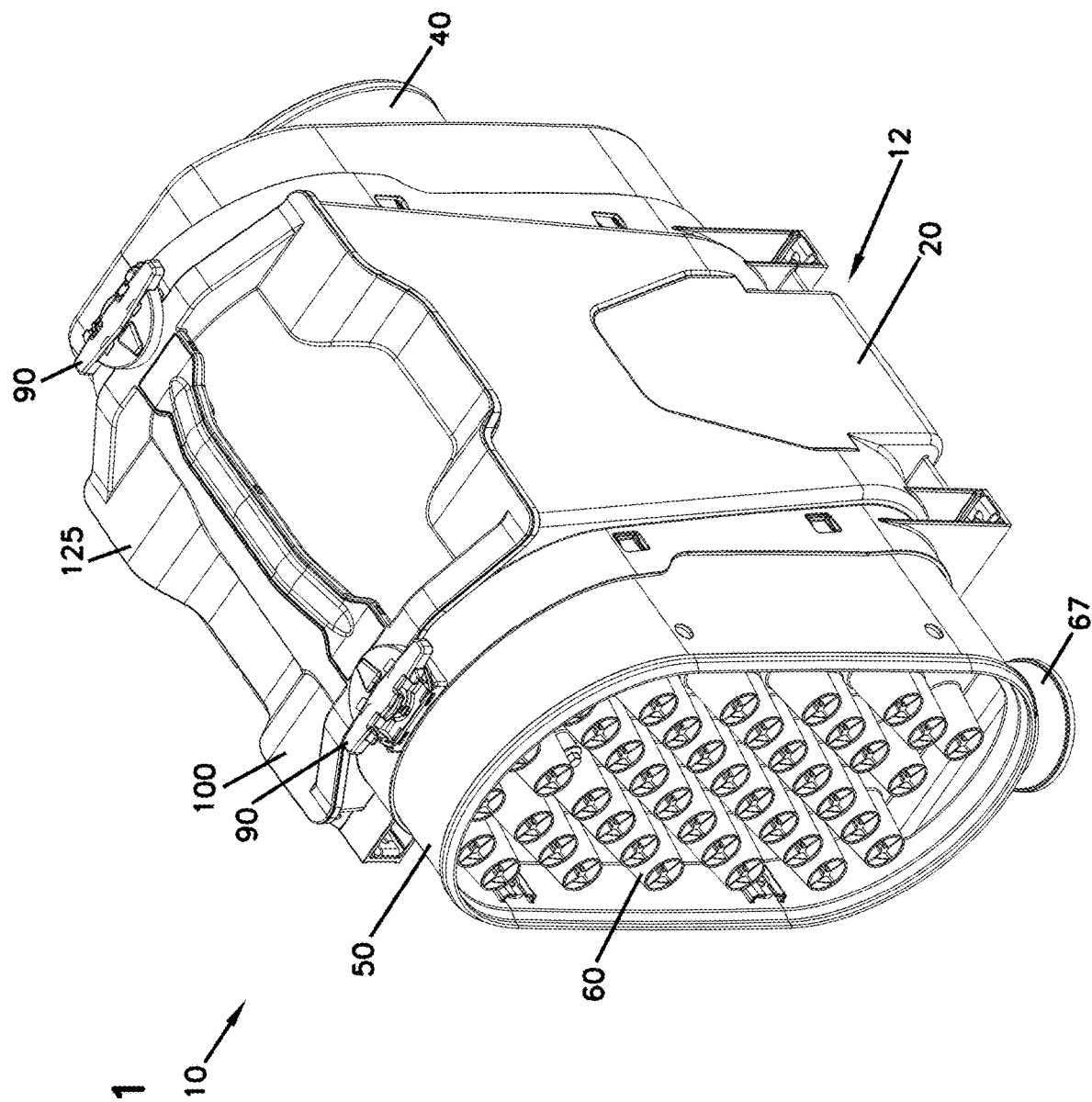
FIG. 1 is a first perspective view of an air cleaner in accordance with an embodiment of the invention.

Herein, example filter assemblies, filter cartridges, features and components therefor are described and depicted. A variety of specific features and components are characterized in detail. Many can be applied to provide advantage. There is no specific requirement that the various individual features and components be applied in an overall assembly with all of the features and characteristics described, however, in order to provide for some benefit in accord with the present disclosure.

It is noted that a plurality of embodiments are depicted and described. The embodiments are not meant to be exclusive with respect to features depicted. That is, selected features of one embodiment can be applied in one or more of the other embodiments if desired, to advantage. In many examples, the filter assembly depicted is an air cleaner assembly, for example, used to filter intake air for an internal combustion engine. Additional applications are possible, for example, applications in which the filter assembly is a crankcase ventilation filter assembly, in which the filter cartridge is used to filter crankcase blowby gases which include, typically, both particulate and liquid contaminant therein. Both type of filter assemblies are generally "gas filter assemblies," since the carrier stage being filtered is gas (air or crankcase ventilation gases). While the techniques described herein will typically be used in application for gas filtration, they can be used in the filtration of other materials, for example, liquids, if desired.

Air Cleaner General Construction

Referring to FIGS. 1-9, aspects of an air cleaner 10 in accordance with an embodiment of the invention are presented. As shown, the air cleaner 10 includes a housing assembly 12 including a main housing body 20 defining within which a removable filter cartridge 100 is disposed. The air cleaner 10 includes a housing assembly 12 with a housing body 20 defining an interior region 20a within which a primary removable filter cartridge 100 is disposed. The housing assembly 12 further includes an outlet assembly 40 that is positioned for exit of filtered air. In the embodiment presented, the air outlet assembly 40 defines an interior region 40a within which a secondary removable filter cartridge 200 is disposed The outlet assembly 40 can be made separately from the housing body 20 and attached thereto, or it can be integrally constructed as a portion of the housing body 20. The housing assembly 12 further includes an inlet assembly 50 through which air to be filtered enters the assembly 10. The inlet assembly 50 can be made separately from the housing body 20 and attached thereto, or it can be integrally constructed as a portion of the housing 20. In the embodiment disclosed, and as explained in detail later in this section, the housing assembly 12 is modular in configuration in which the outlet and inlet assemblies 40, 50 are separate assemblies secured to the housing body 20.

The air cleaner 10 can include an access cover 125 to provide access to the interior region 20a of the housing body 20, such as for placement and removal of filter cartridges 100, 200. The access cover 125 may be a separate component or may be an integral feature of another component of the air filter cartridge 100, for example integral with the circumferential shell of the filter cartridge 100. In the embodiment disclosed herein, the access cover 125 is integral to the air filter cartridge 100. In one aspect of the disclosure, the access cover 125, and thus the filter cartridge 100, are secured to the housing body 20 via a pair of connectors or lock mechanisms 90.

In one aspect, the air filter cartridge 100 can be configured such that it has an axis of symmetry about a plane passing through the longitudinal axis of the air filter cartridge 100. Such a configuration can allow for the air filter cartridge 100 to be installed in either direction while still interacting in a satisfactory way with the mating parts of the housing body 20 and lock mechanisms 90.

Housing Body 20

Referring to FIGS. 10-13, the housing body 20 is shown in isolation. As presented, the housing body 20 is unitarily formed as a single component from a polymeric material, such as nylon, polypropylene, or ABS plastic. In one aspect, the housing body 20 extends between a first end 20a and a second end 20b and defines and interior region 20i. The housing body 20 can be characterized as having a central portion 22, an inlet portion 24, and an outlet portion 26. Although the terms "inlet portion" and "outlet portion" are used herein, it should be understood that, because of the configuration of the housing body 20, the inlet portion 24 can serve as the outlet end of the housing body 20 and the outlet portion 26 can serve as the inlet portion of the housing body 20. In general, the central portion 22 retains the filter cartridge 100, the inlet portion 24 secures the air inlet assembly 50 to the housing body 20 and also supports one of the lock mechanisms 90, and the outlet portion 26 secures the air outlet assembly 40 to the housing body 20 and also supports the other lock mechanism 90.

Figure 106:
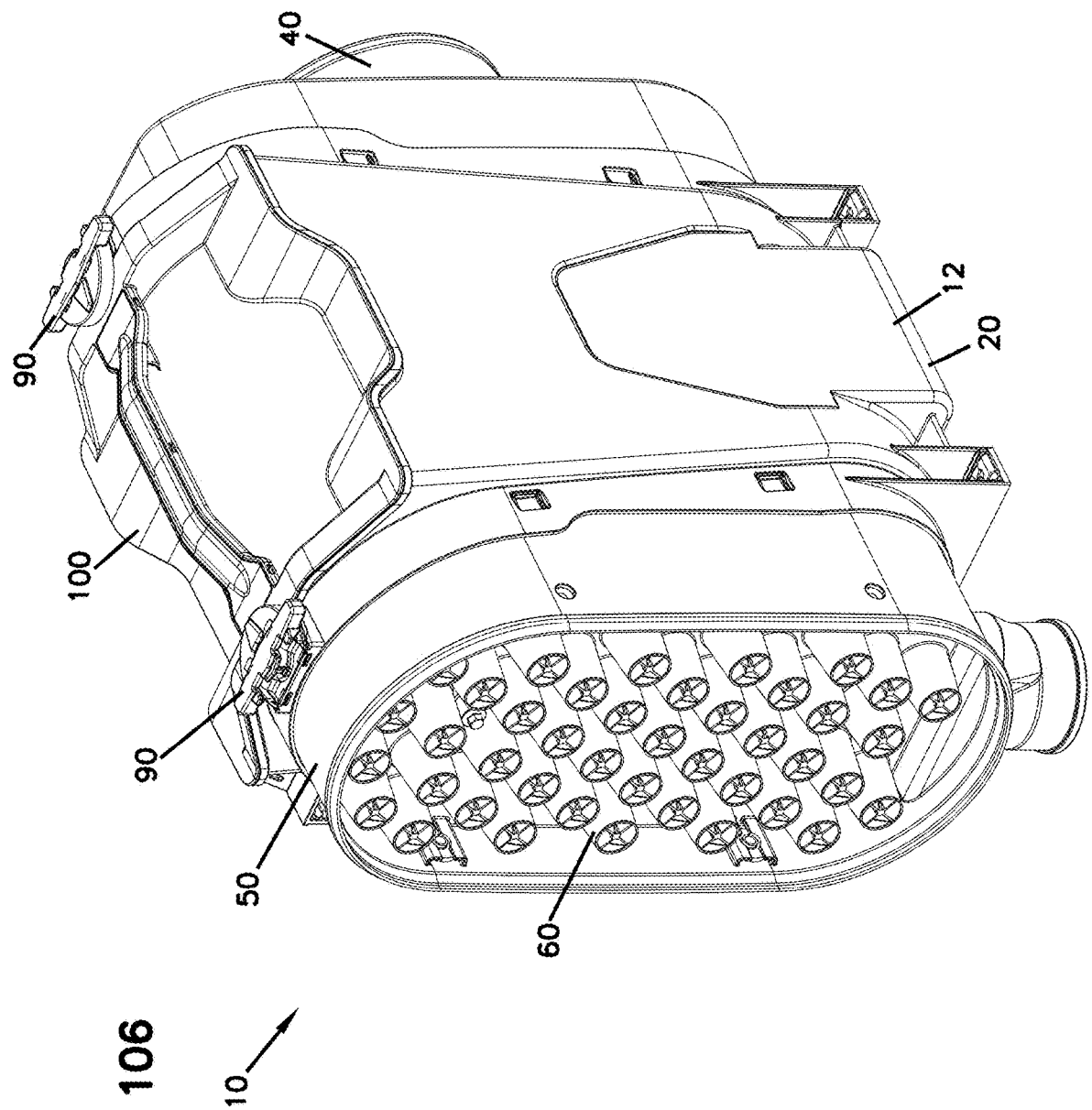

In one aspect, the central portion 22 of the housing body 20 is defined by a sidewall 22a extending between a first end wall 22b proximate the inlet portion 24 and a second end wall 22c proximate the outlet portion 26. Each of the first and second end walls 22b, 22c respectively define openings 22d, 22e through which air can flow through the housing body 20. The central portion 22 further defines an access opening 22f through which the filter cartridge 100 can be installed. The access opening 22f is also sized such that the outlet assembly 40 and the inlet assembly 50 can be inserted through the access opening 22f during assembly of the housing assembly 12. In one aspect, the access opening 22f is provided with a grooved structure defining an open channel 22g for receiving a seal member, such as an O-ring, such that access cover 125 can be adequately sealed against the housing body 20. Referring to FIGS. 106 and 107, an alternative air cleaner design is shown in which the access opening 22f has a varying profile with a transversely or radially recessed portion 22f1 that can be used to enhance positive location of the filter cartridge 100 during insertion.

The inlet portion 24 of the housing body 20 is shown as being provided with a circumferential sidewall 24a with a rectangular shape with rounded ends or corners (e.g. a race track shape). Within the sidewall 24a, a plurality of oppositely arranged and spaced apart apertures 24b are provided. The apertures 24b are for receiving cooperatively shaped latch members of the air inlet assembly 50 to facilitate a snap-fit type connection between the housing body 20 and the air inlet assembly 50. The inlet portion 24 is also provided with a mounting structure 24c proximate the access opening 22f. The mounting structure 24c provides a structure to which the lock mechanism 90 can be mounted. As shown, the mounting structure 24c is defined by a pair of spaced apart, parallel L-shaped channel or rib members 24d extending in a lengthwise direction of the housing body 20. The inlet portion 24 is further provided with a cut-out portion 24e within the sidewall 24a to facilitate mounting of a dust ejector in a desired location and orientation, as is explained later in this section.

The outlet portion 26 of the housing body 20 is shown as being provided with a circumferential sidewall 26a with a rectangular shape with rounded ends or corners (e.g. a race track shape). Within the sidewall 26a, a plurality of oppositely arranged and spaced apart apertures 26b are provided. The apertures 26b are for receiving cooperatively shaped latch members of the air outlet assembly 40 to facilitate a snap-fit type connection between the housing body 20 and the air outlet assembly 40. The outlet portion 26 is also provided with a mounting structure 26c proximate the access opening 22f. The mounting structure 26c provides a structure to which the lock mechanism 90 can be mounted. As shown, the mounting structure 26c is defined by a pair of spaced apart, parallel L-shaped channel or rib members 26d extending in a lengthwise direction of the housing body 20. Although not shown, the outlet portion 26 can be further provided with a cut-out portion similar to 24e within the sidewall 26a to facilitate mounting of a dust ejector in a desired location and orientation where the air cleaner is configured for air to flow from the portion 26 to the portion 24.

Outlet Assembly 40

Referring to FIGS. 14 to 18, the outlet assembly 40, is shown in further detail. For the purpose of clarity, the filter cartridge 200 is not shown as being installed within the outlet assembly at FIGS. 14 to 18. As presented, the outlet assembly 40 includes an outlet body 42 and flow restriction indicator 44. The flow restriction indicator 44 is a dial-type gauge that snap-fits into the outlet assembly 40. As shown, the outlet body 42 is defined by a sidewall 42a extending between a first end 42b and a second end 42c. In one aspect, the sidewall 42a includes a contoured portion 42d for receiving and sealing with a portion of a seal member 204 associated with the secondary filter cartridge 200. The interior of the sidewall 42a forms the remaining portion of the seal interface with the secondary filter cartridge seal member 204. The sidewall 42a is also shown as being provided with latch portions 42e, each of which having a ramped surface 42f and a shoulder surface 42g. The latch portions 42e interact with the apertures 26b in the housing body 20 such that a snap-fit connection can be formed between the housing assembly 20 and the outlet assembly 40.

The outlet assembly 40 is also shown as being provided with a flange structure 46 adjoining the first end 42b of the outlet body sidewall 42a. In one aspect, the flange structure 46 is defined by a first flange portion 46a and a second flange portion 46c that each extending radially outwardly from the sidewall 42a. In one aspect, the flange portions 46a, 46c define a mounting surface 46b on one side of the flange structure 46 and a sealing surface 46c on an opposite side of the flange structure 46.

In the embodiment shown, the sealing surface 46c of the first flange portion 46a is disposed at an angle a1 to a longitudinal axis X of the air cleaner 10 and outlet assembly 40. In one aspect, the angle a1 is an oblique or non-orthogonal angle. In the example shown, the angle a1 is 95 degrees. However, other angles are possible, such as angles ranging between 90 and 135 degrees, for example 100 degrees. In some examples, the angle a1 is minimized such that the surface area of the sidewall 42a between the flange portions 46a, 46c is similarly minimized such that debris falling into the interior region 20i is less able to collect on the resulting ledge area of the sidewall 42a, for example when the filter cartridge 100 is being removed. In one aspect, the first and second flange portions 46a, 46c are disposed at an angle a2 with respect to each other. In the example shown, the angle a2 is greater than zero and less than 180 degrees such that the first and second flange portions 46a, 46c are disposed in a non-parallel relationship. In the example shown, the angel a2 is about 152 degrees. Where the outlet end of the media pack 110 is orthogonal to the longitudinal axis X, the angles a1 and a2 can also be said to be at an oblique angle to the outlet end 114. As the seal surfaces 132b, 132c of the seal member 132 can be defined by the angles a1, a2 of the flange portions 46a, 46c, the seal surfaces 132b, 132c can likewise have the angles specified above. Other angles are possible.

Figure 6:
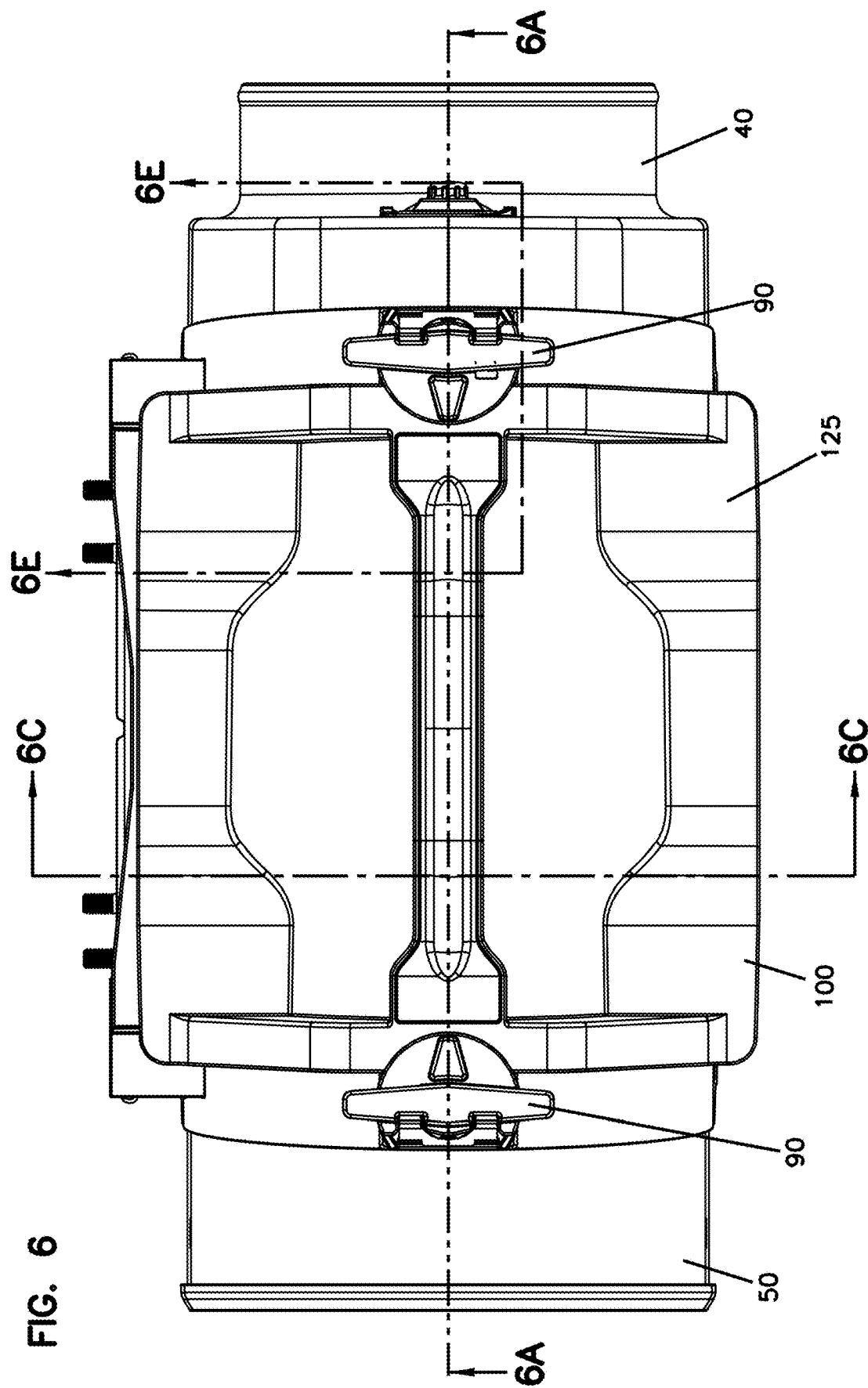
FIG. 6 is a top view of the air cleaner shown in FIG. 1.
Figure 6A:
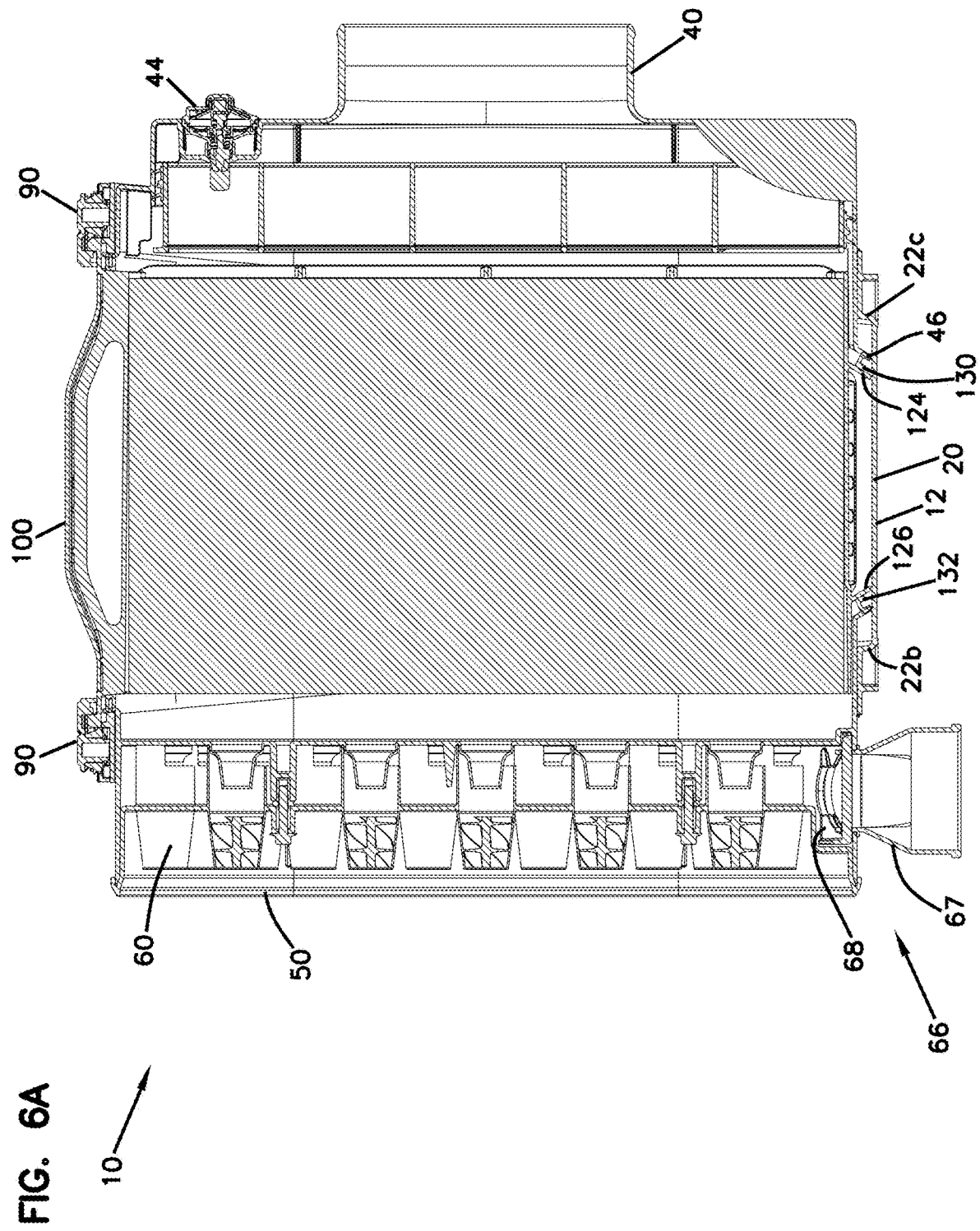
FIG. 6A is a cross-sectional view of the air cleaner shown in FIG. 1, taken along the line 6A-6A in FIG. 6.

When the outlet assembly 40 is inserted through the housing body access opening 22f such that the outlet assembly 40 resides within the interior region 20i of the housing body 20, the outlet assembly 40 can be pushed forward towards the housing body outlet portion 26 (or inlet portion 24) until the mounting surface 46b abuts the end wall 22c of the housing body 20. This position is most easily seen in the cross-sectional views of FIGS. 6A and 6B. The end wall 22c provides a positive stop against the mounting surface 46b of the first flange portion 46a. During this action, the ramped surface 42f of each of the latch portions 42e ride along the interior surface of the sidewall 26a until the outlet body 42 is sufficiently inserted for the latch portions 42e to be fully received into the apertures 26b. At this point, the shoulder surfaces 42g of the latch portions 42e lock against an edge of the apertures 26b in a snap-fit type of connection, wherein the outlet housing 42 is locked from further movement by the latch portions 42e and the end wall 22c.

In one aspect, the second flange portion 46c adjoins the first flange portion 46a to form the seal surface 46d opposite the mounting surface 46b. The seal surface 46d provides a surface against which a correspondingly shaped seal member of the filter cartridge 100 can form a seal. As the first flange portion 46a and second flange portion 46c are arranged in a non-parallel relationship, the portion 46e of the seal surface 46d defined by the first flange portion 46a is disposed at the angle a2 to the portion 46f of the seal surface 46d defined by the second flange portion 46c. Accordingly, the seal surface 46d can be said to have a compound shape or profile. At the location 46g of the seal surface 46d where the first and second seal portions 46e, 46f adjoin, the seal surface 46d is curved such that a smooth transition exists. Stated another way, the first and second seal portions 46e, 46f are planar with a curved portion 46g connecting the portions 46e, 46f. In some examples, all or part of the seal surface 46d is curved rather than being planar. For example, either or both of the first and second seal portions 46e, 46f can be curved rather than being planar. In the example shown, the first seal portion 46e represents less than half of the total seal surface 46d, and thus has a lesser length than that of the second seal portion 46f.

The outlet assembly 40 is also provided with an outlet end 48 defined by an end wall 48a and an outlet tube 48b to which a hose or duct can be connected. The outlet end 48 is also shown as including internal sidewalls or ribs 48c for interacting with the filter cartridge 200. The outlet end 48 is further shown as also including a sidewall or well 48d for receiving the restriction indicator 44.

One advantage of the presented configuration, due to the disclosed modular design, is that differently configured outlet assemblies 40 can be mounted onto the housing body 20 to suit any particular application. For example, the outlet assembly could be provided with a differently sized or shaped outlet tube or duct, could be provided without a restriction indicator, or could be provided with additional ports for the installation of electronic sensors. Accordingly, the disclosure is not necessarily limited to the specific outlet assembly configuration described herein as other or different features may be included.

Inlet Assembly 50

Referring to FIGS. 19-31, aspects of the inlet assembly 50 are shown in greater detail. As presented, the inlet assembly 50 includes an inlet body 52, a precleaner assembly 60, and a dust ejection assembly 66. In one aspect, the precleaner assembly 60 generally is used to clean selected material or contaminants carried by an air stream into the air cleaner assembly 10 before the air reaches the filter cartridge 100 positioned therein. The precleaner 60 generally includes a sidewall 62a bounding an end wall 62b through which a plurality of cyclonic separator tubes 64 extend. In the embodiment shown in the drawings, 42 separator tubes 64 are provided. More or fewer separator tubes 64 can be provided.

The inlet body 52 is also shown as including a sidewall 52a bounding an end wall 52b. A plurality of receptacles 54 are shown as being provided on and extending through the end wall 52b. The receptacles 54 are received into the outlets of the separator tubes 64 when the precleaner assembly 60 is installed into the inlet body 52, wherein the sidewall 62a slides within the sidewall 52a. In the example presented, the precleaner assembly 60 can be secured via a fastener 62c (e.g. a threaded screw or bolt) extending into a threaded opening 52c in the end wall 52b of the inlet body 52.

In operation, contaminants are separated to the outside walls of the separator tubes 64 and are collected within the interior space defined between end walls 62b, 52b and the sidewall 52a and are then ejected out of the dust ejection port assembly 66. The relatively contaminant free air passing through the central portions of the separator tubes 64 is received by the receptacles 54 where the air can pass through the end wall 52b and into the interior region 20i where the air can be received by the filter cartridge 100 for further cleaning.

Figure 19:
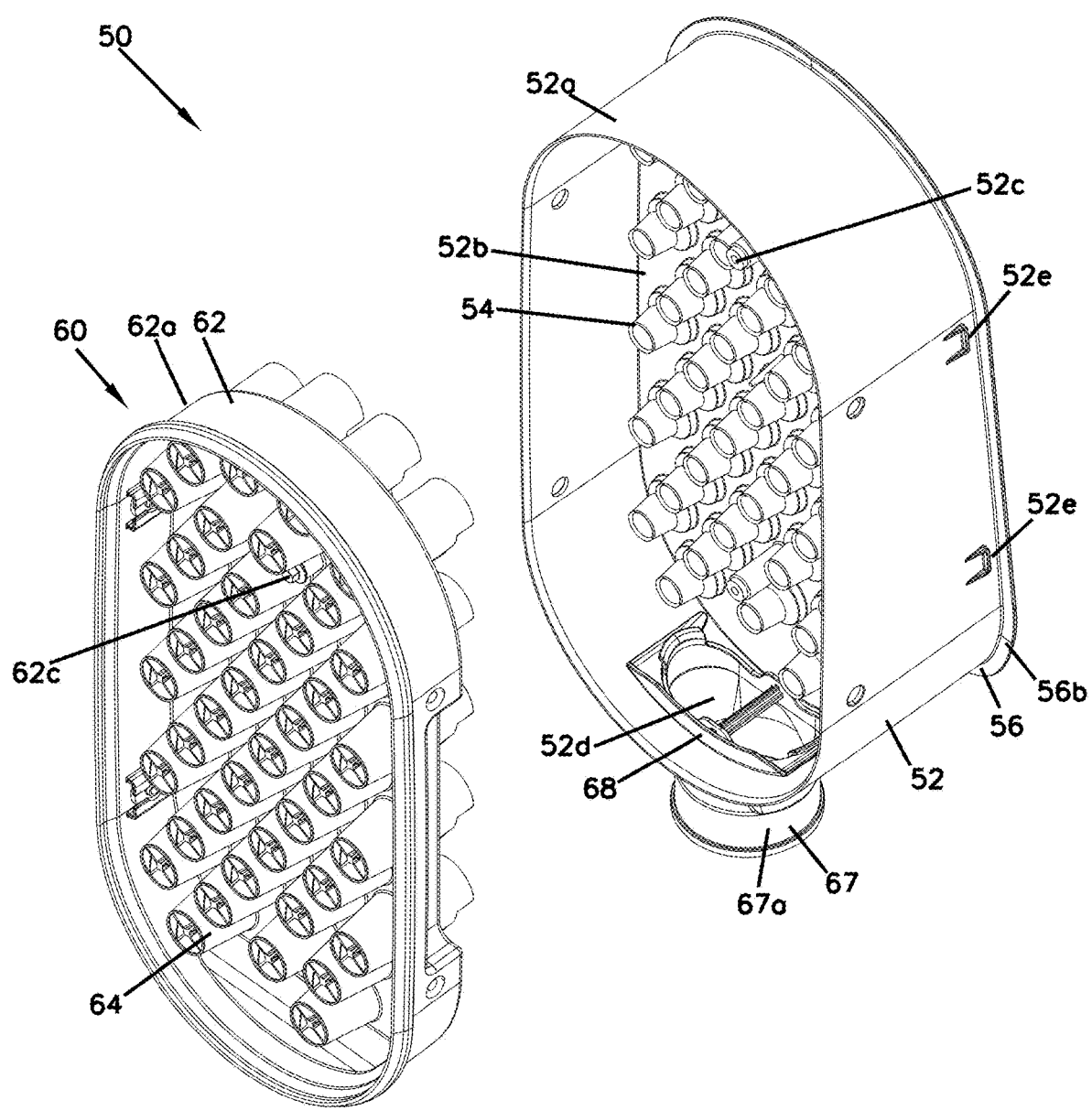
FIG. 19 is a partially exploded perspective view of the inlet assembly of the air cleaner shown in FIG. 1.
Figure 20:
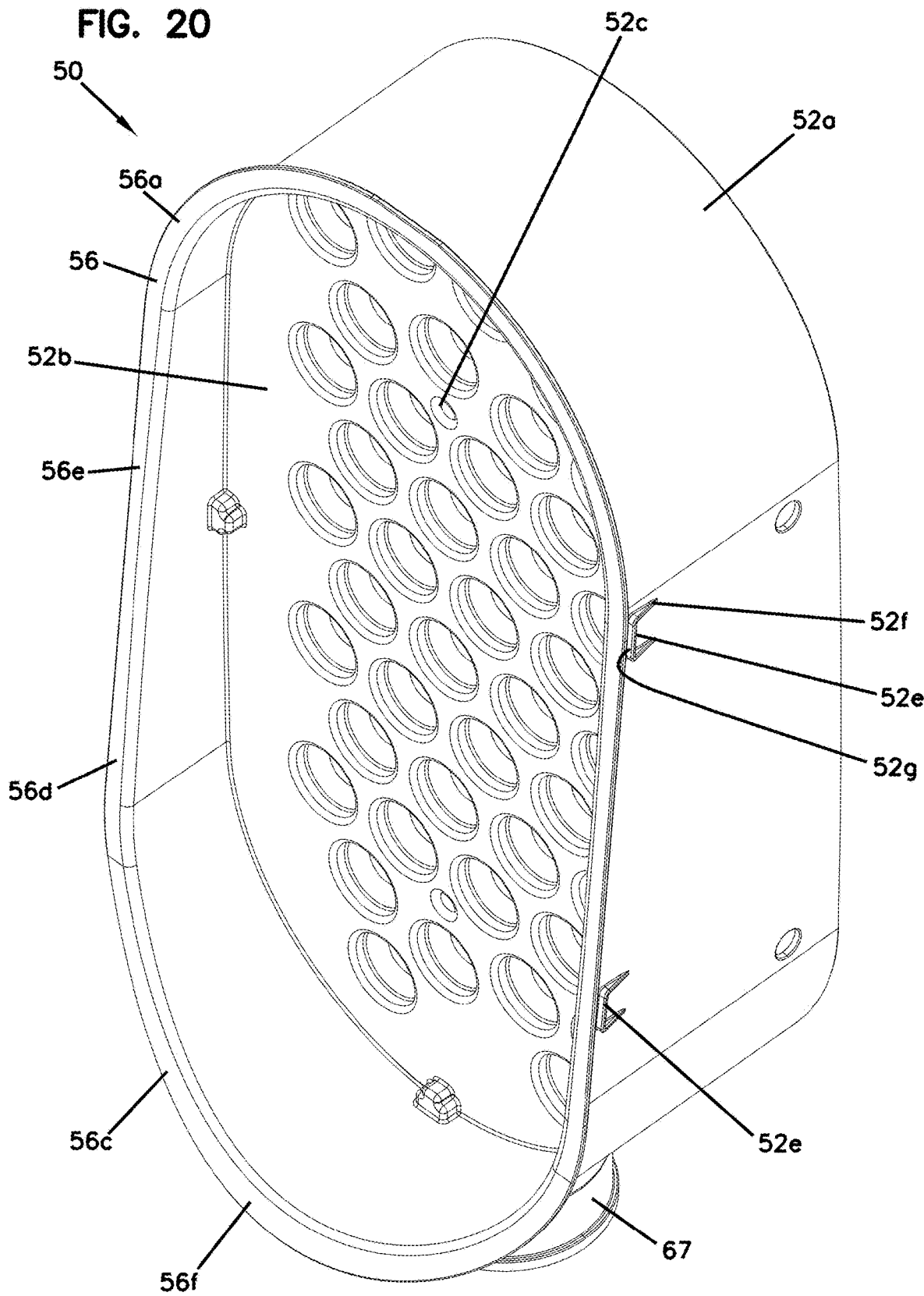
FIG. 20 is a first perspective view of the inlet assembly shown in FIG. 19.
Figure 21:
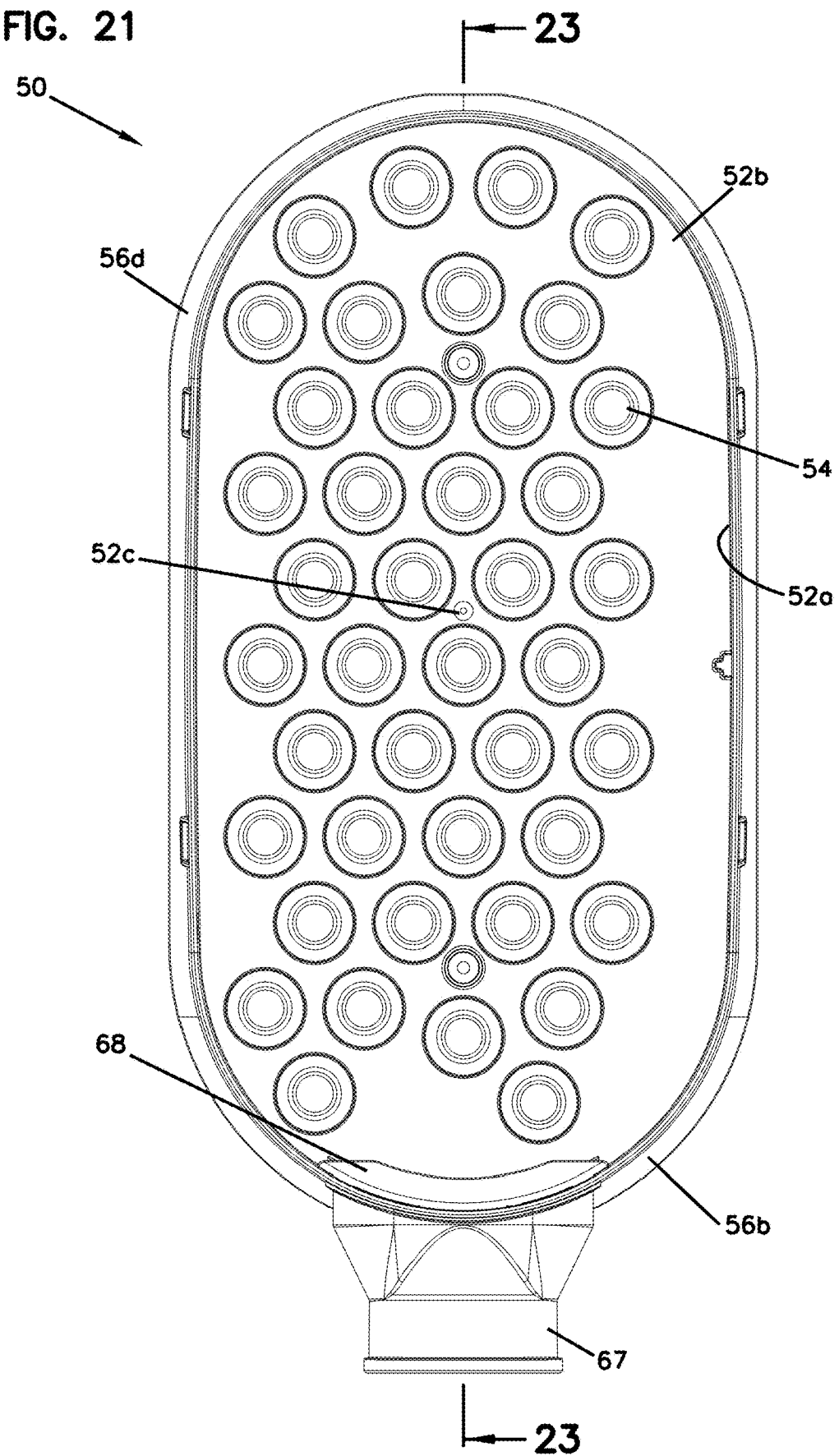
FIG. 21 is an end view of the inlet assembly shown in FIG. 19.
Figure 22:
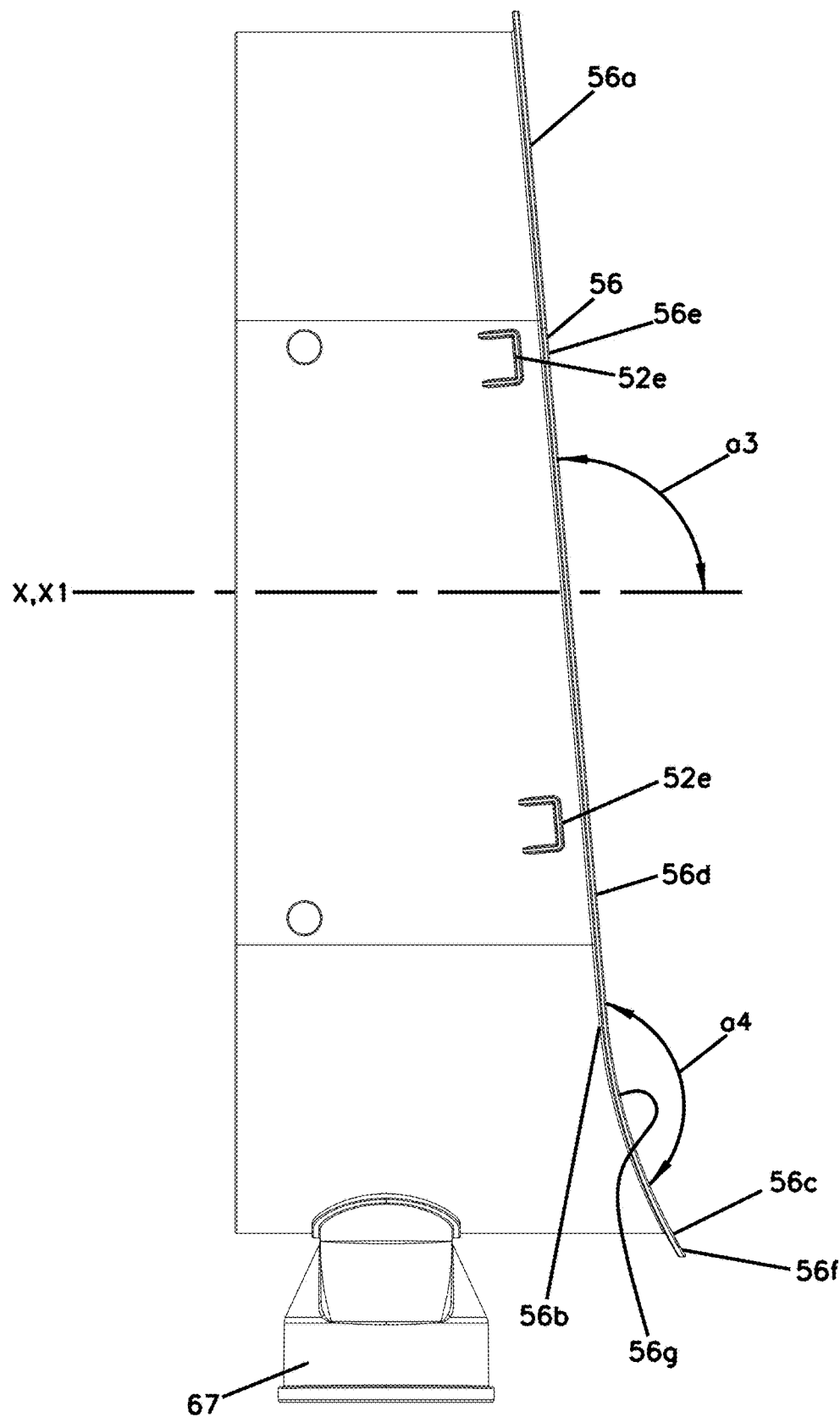
FIG. 22 is a side view of the inlet assembly shown in FIG. 19.
Figure 23:
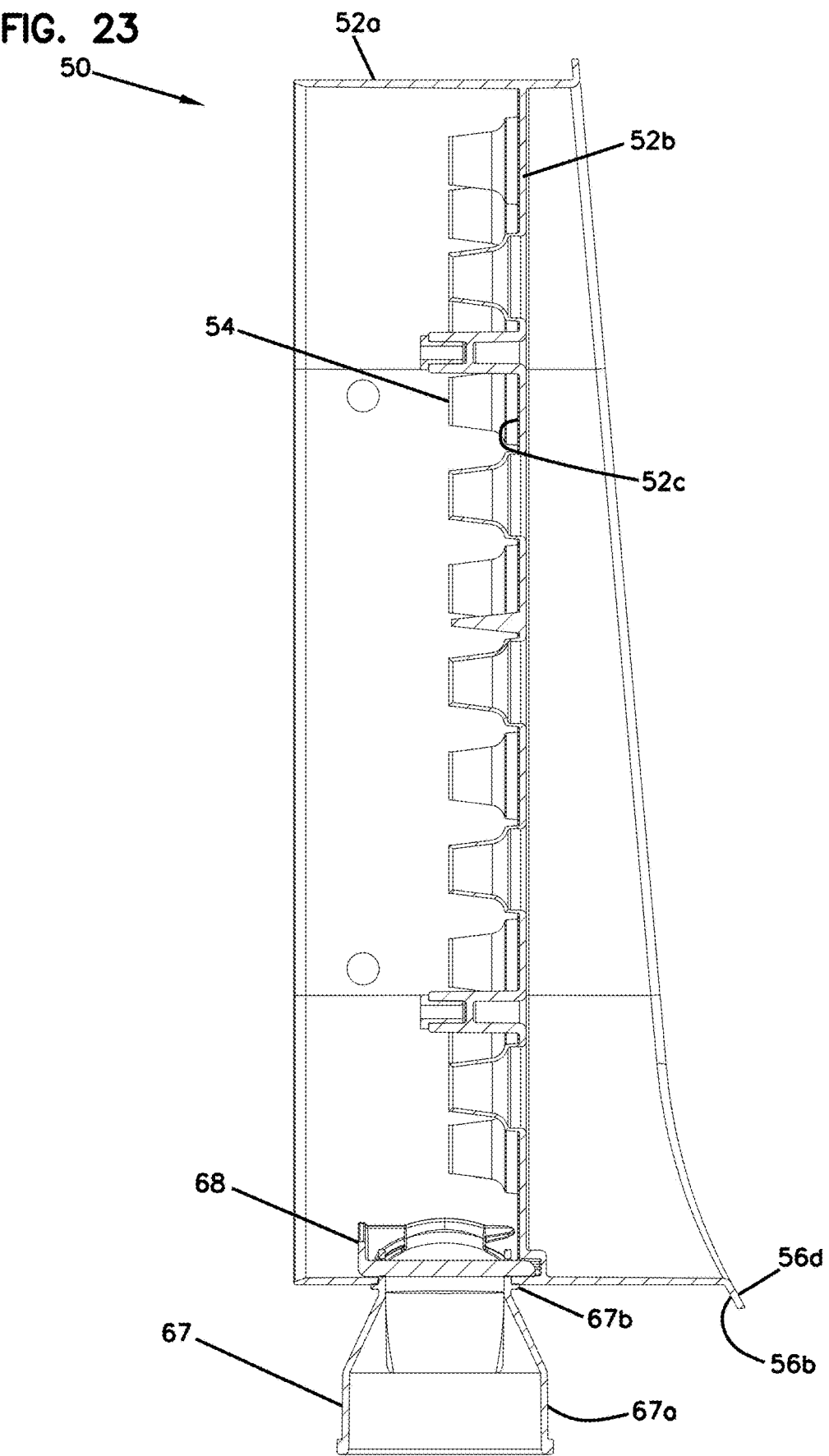
FIG. 23 is a cross-sectional side view of the inlet assembly shown in FIG. 19, taken along the line 23-23 in FIG. 21.
Figure 24:
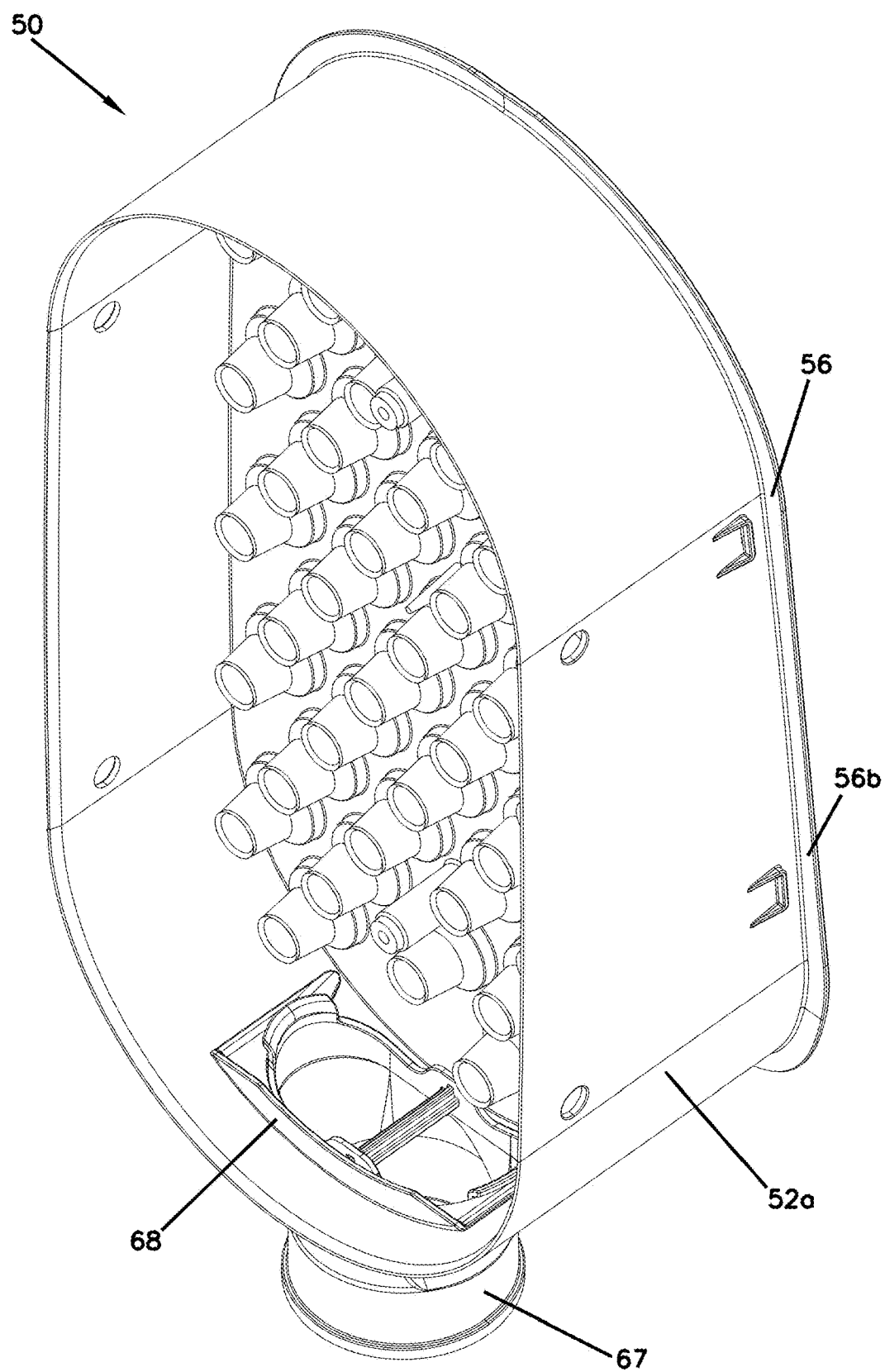
FIG. 24 is a is a perspective view of the inlet assembly shown in FIG. 19 with the precleaner assembly removed.
Figure 25:
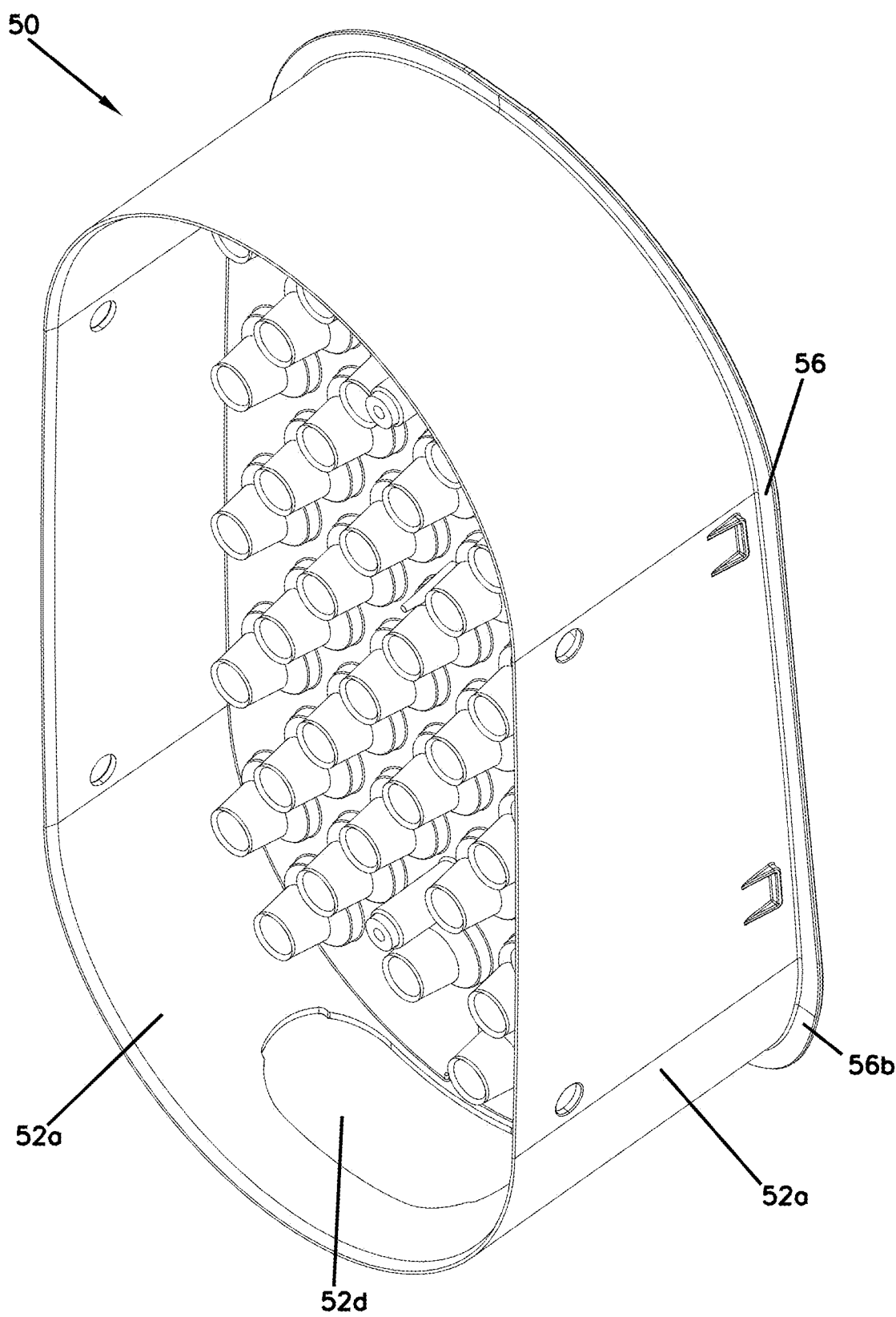
FIG. 25 is a perspective view of the inlet assembly shown in FIG. 24 with the dust ejector assembly removed.
Figure 26:
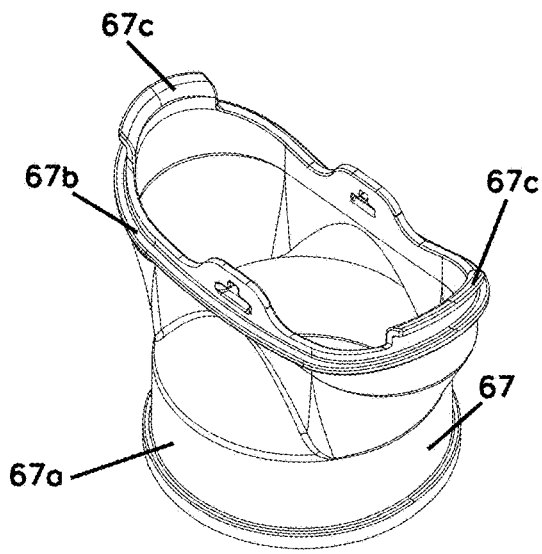
FIG. 26 is a perspective view of the dust ejector port of the inlet assembly shown in FIG. 19.
Figure 27:
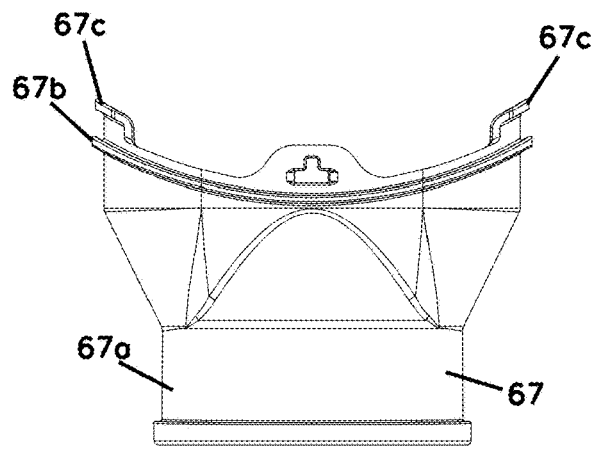
FIG. 27 is a side view of the dust ejector port shown in FIG. 26.

As can be most easily seen at FIGS. 19 and 23-21, the dust ejection assembly including a dust ejection port 67 mounted through an opening in the inlet body sidewall 52a and a retaining clip 68 securing the dust ejection port 67 to the sidewall 52a. As opposed to typical prior art assemblies in which the dust ejection port is molded into the precleaner assembly or part of the air cleaner housing, the dust ejection assembly 66 disclosed herein is removable and can be mounted in multiple locations, where the air cleaner 10 is provided with multiple openings 52d. The inlet assembly 50 is installed through the access opening 22f of the housing body 20 in a manner similar to that already described for the inlet assembly 40. The removability of the dust ejection assembly 66 facilitates this assembly process, as insufficient clearance would result if the dust ejection port 67 were non-removable and assembly through the access opening 22f were attempted. Once the inlet assembly 50 is installed onto the main body 20, the dust ejection port 67 can be inserted into the opening 52d in the inlet body 52.

With reference to FIGS. 26-31, the dust ejection port 67 is defined by a tubular sidewall 67a that extends to a flange 67b. During insertion of the dust ejection port 67 into the inlet body opening 52d in a direction from the outside of the sidewall 52a towards the interior defined by the sidewall 52a, the flange 67b acts as a stop to prevent further insertion into the interior. In one aspect, the flange 67b is provided with a complementary shape to the profile of the sidewall 52a such that a generally flush fit arrangement between the flange 67b and the sidewall 52a exists. In the example shown, both the sidewall 52a, at the location of opening 52d, and the flange 67b are curved. However, where the mounting location of the dust ejection assembly 66 is along a flat side of the inlet body sidewall 52a, the flange 67b can be planar or flat.

Figure 28:
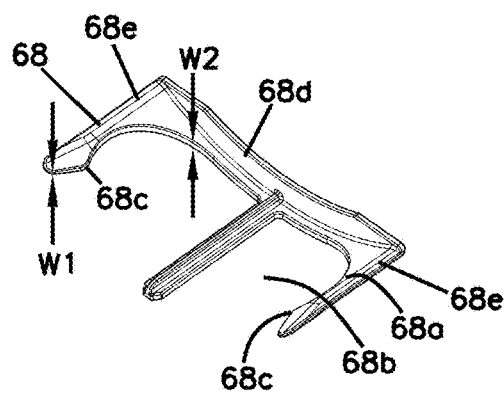
FIG. 28 is a first perspective view of the dust ejector port clip of the inlet assembly shown in FIG. 19.
Figure 29:
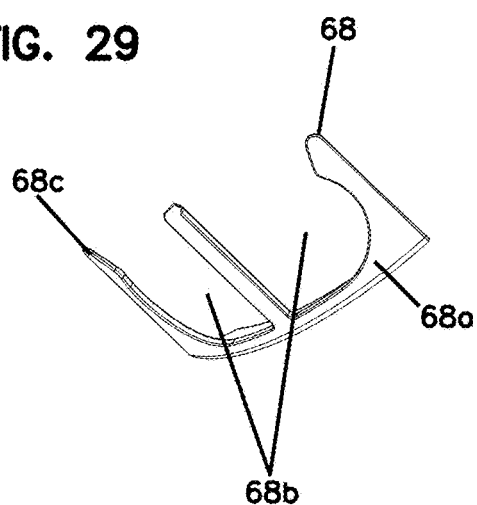
FIG. 29 is a second perspective view of the dust ejector port clip shown in FIG. 28.
Figure 30:
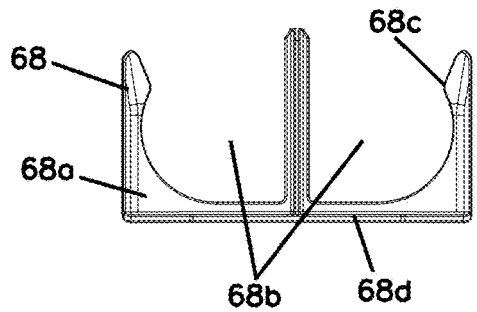
FIG. 30 is a top view of the dust ejector port clip shown in FIG. 28.
Figure 31:
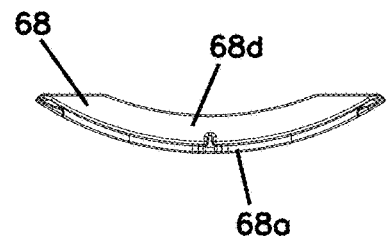
FIG. 31 is an end view of the dust ejector port clip shown in FIG. 28.
Figure 32:
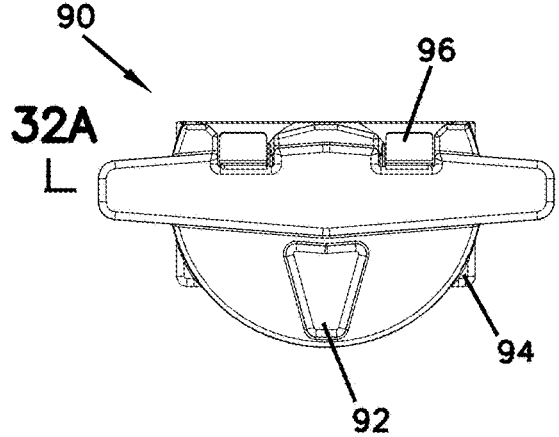
FIG. 32 is a top view of one of the lock mechanisms of the air cleaner shown in FIG. 1.
Figure 32A:
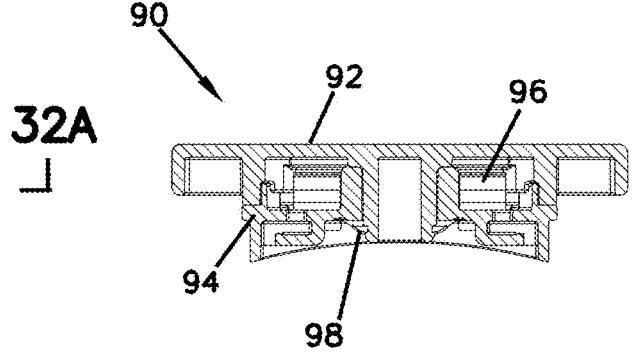
FIG. 32A is a cross-sectional view of the lock mechanism shown in FIG. 32, taken along the line 32A-32A shown in FIG. 32.
Figure 33:
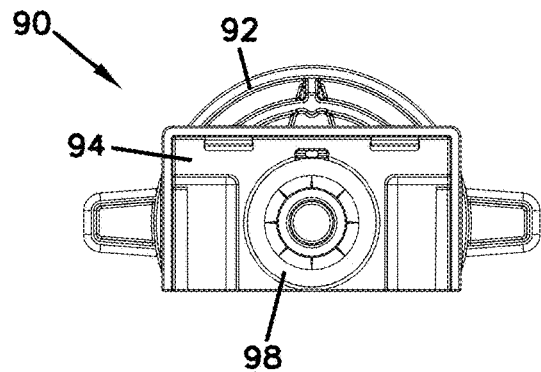
FIG. 33 is a bottom view of the lock mechanism shown in FIG. 32.
Figure 34:
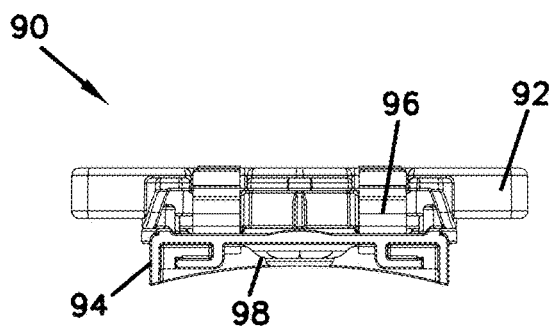
FIG. 34 is a first end view of the lock mechanism shown in FIG. 32.
Figure 35:
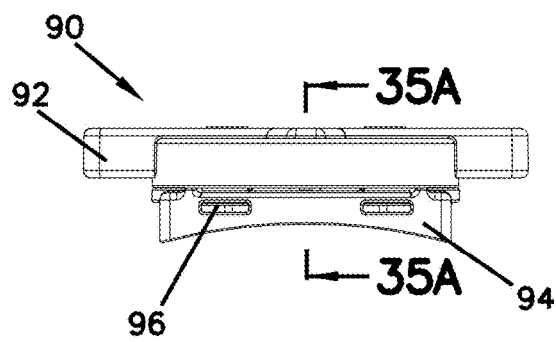
FIG. 35 is a second end view of the lock mechanism shown in FIG. 32.
Figure 35A:
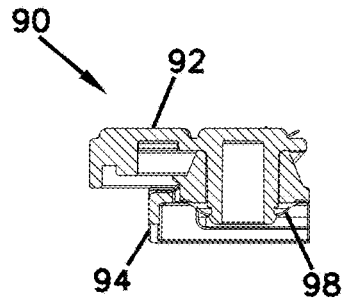
FIG. 35A is a cross-sectional view of the lock mechanism shown in FIG. 32, taken along the line 35A-35A shown in FIG. 35.

The dust ejection port 67 is further provided with a pair of retaining flanges or ears 67c that pass through the inlet body opening 52d when the flange 67b is abutted with the sidewall 52a. The retaining flanges 67b are received by the retaining clip 68 which includes a sidewall 68a defining an opening 68b with a narrowed opening area 68c for receiving a narrowed neck region of the the tubular sidewall 67a between the flanges 67b, 67c of the dust ejection port 67. The narrowed opening area 68c enables for a snap-fit type attachment between the dust ejection port 67 and the retaining clip 68. Once the dust ejection port sidewall 67a is inserted through the opening 52d, the retaining clip 68 is inserted onto the ejection port sidewall 67a on the side of the inlet body sidewall 52a opposite of the flange 67b (i.e. on the interior side of sidewall 52a). Once inserted, the retaining clip 68 operates against the retaining flanges 67b to prevent the dust ejection port 67 from being removed from the inlet body 52. As indicated at FIG. 28, the clip 68 has a width w1 at the distal end of the clip which increases to a width w2 towards the opposite end of the clip 68 to form a ramp-like structure. Thus, as the retaining clip 68 is inserted, the increasing thickness of the clip 68 acts to bind the ejection port 67 in place such that the ejection port 67 is axially secured in place with respect to the sidewall 52a. A handle or lip member 68d is provided on the retaining clip 68 to facilitate manipulation of the retaining clip during insertion and removal.

Ramped sidewall members or ribs 68e can also be provided to interact with the ends of the retaining flanges 67c to prevent rotation of the ejection port 67 with respect to the sidewall 52a. Preventing rotation is advantageous as loosening of the connection between the retaining clip 68 and the ejection port 67 could occur with such rotation.

In one aspect, the retaining clip sidewall 68a is provided with a complementary shape to the profile of the sidewall 52a such that a generally flush fit arrangement between the sidewall 68a and the sidewall 52a exists. In the example shown, both the sidewall 52a, at the location of opening 52d, and the sidewall 68a are curved. However, where the mounting location of the dust ejection assembly 66 is along a flat side of the inlet body sidewall 52a, the sidewall 68a can be planar or flat.

The sidewall 52a of the inlet body 52 is also shown as being provided with latch portions 52e, each of which having a ramped surface 52f and a shoulder surface 52g. The latch portions 52e interact with the apertures 24b in the housing body 20 such that a snap-fit connection can be formed between the housing assembly 20 and the inlet assembly 50.

The inlet assembly 50 is also shown as being provided with a flange structure 56 adjoining the second end 42c of the outlet body sidewall 42a. In one aspect, the flange structure 56 is defined by a first flange portion 56a and a second flange portion 56c that extend radially outwardly from the sidewall 52a. In one aspect, the flange portions 56a, 56c define a mounting surface 56b on one side of the flange structure 56 and a sealing surface 56c on the opposite side of the flange structure 56.

In the embodiment shown, the first flange portion 56a is disposed at an angle a3 to a longitudinal axis X of the air cleaner 10 and inlet assembly 50. In one aspect, the angle a3 is an oblique or non-orthogonal angle. In the example shown, the angle a1 is 5 degrees. However, other angles are possible, such as angles ranging between 0 and 45 degrees, for example 10 degrees. In one aspect, the first and second flange portions 56a, 56c are disposed at an angle a4 with respect to each other. In the example shown, the angle a4 is greater than zero and less than 180 degrees such that the first and second flange portions 56a, 56c are disposed in a non-parallel relationship. In the example shown, the angel a4 is about 152 degrees. Other angles are possible.

When the inlet assembly 50 is inserted through the housing body access opening 22f such that the inlet assembly 50 resides within the interior region 20i of the housing body 20, the inlet assembly 50 can be pushed forward towards the housing body inlet portion 24 (or inlet portion) until the mounting surface 56b abuts the end wall 22b of the housing body 20. This position is most easily seen in the cross-sectional views of FIGS. 3A and 6A. The end wall 22b provides a positive stop against the mounting surface 56b of the first flange portion 56a. During this action, the ramped surface 52f of each of the latch portions 52e ride along the interior surface of the sidewall 24a until the inlet body 52 is sufficiently inserted for the latch portions 52e to be fully received into the apertures 24b. At this point, the shoulder surfaces 52g of the latch portions 52e lock against an edge of the apertures 24b in a snap-fit type of connection, wherein the inlet housing 52 is locked from further movement by the latch portions 52e and the end wall 22b.

In one aspect, the flange structure 56 adjoins the first flange portion 56a to form the seal surface 56d opposite the mounting surface 56b. The seal surface 56d provides an axial surface against which a correspondingly shaped seal member of the filter cartridge 100 can form a seal. Accordingly, the seal surfaces of the seal members can have the same shape or profile as explained below for the seal surfaces herein. As the first flange portion 56a and second flange portion 56c are arranged in a non-parallel relationship, the portion 56e of the seal surface 46d defined by the first flange portion 56a is disposed at the angle a4 to the portion 56f of the seal surface 56d defined by the second flange portion 56c. Accordingly, the seal surface 56d can be said to have a compound shape or profile. At the location 56g of the seal surface 56d where the first and second seal portions 56e, 56f adjoin, the seal surface 56d is curved such that a smooth transition exists. Stated another way, the first and second seal portions 56e, 56f are planar with a curved portion 56g connecting the portions 56e, 56f. In some examples, all or part of the seal surface 56d is curved rather than being planar. For example, either or both of the first and second seal portions 56e, 56f can be curved rather than being planar. In the example shown, the first seal portion 56e represents less than half of the total seal surface 56d, and thus has a lesser length than that of the second seal portion 56f.

One advantage of the presented configuration, due to the disclosed modular design, is that differently configured inlet assemblies 50 can be mounted onto the housing body 20 to suit any particular application. For example, an inlet assembly 50 with no precleaner, an inlet duct, a different precleaner design, and/or dust ejection assembly could be provided. Accordingly, the disclosure is not necessarily limited to the specific inlet assembly configuration described herein as other or different features may be included.

Filter Cartridge 100

Referring now to FIGS. 60-69, an exemplary embodiment of filter cartridge 100 of air cleaner assembly 10 is illustrated. The filter cartridge 100 extends between a first end 102 and a second end 104. In one aspect, the first end 102 can be characterized as the upstream end of the filter cartridge 100 while the second end 104 can be characterized as the downstream end of the filter cartridge 100. The filter cartridge 100 can be considered to be the main or primary filter cartridge, and is used to selectively separate a desired amount of particulate or containment material.

Filter cartridge 100 is generally a service part or removable component, such that it is periodically removable and replaceable as desired or necessary during the lifetime of the air cleaner 10. In particular, when the cartridge 100 becomes occluded or otherwise needs to be replaced, the access cover 125 is unlocked from the housing 20, and the occluded filter 100 is removed by pulling the access cover in a direction R1 away from the housing 20 via a handle 127 associated with the access cover 125. After such removal, another filter 100 can be placed in the housing 20 by inserting the filter cartridge 100 in an insertion direction I1. In one aspect, the directions I1 and R1 are orthogonal to the longitudinal axes X, X1 of the filter cartridge 100 and housing 20. In the example shown, the access cover 125 is integral to the filter cartridge 100 and thus serves as the previously described access cover 125. Similarly, the handle 127 is integrally formed with the access cover 125. In one aspect, the handle 127 has a length that is a majority of the length of the media pack 110. As mentioned previously, FIGS. 106 and 107 show the filter cartridge 100 that the access opening 22f can have a varying profile with a recessed portion 22f1. In such an embodiment, the access cover 125 can be formed with a complementary shape to the access opening 22f such that the access cover 125 has a contoured shape with a protruding portion 125a that mates or abuts with the recessed portion 22f1

Figure 75:
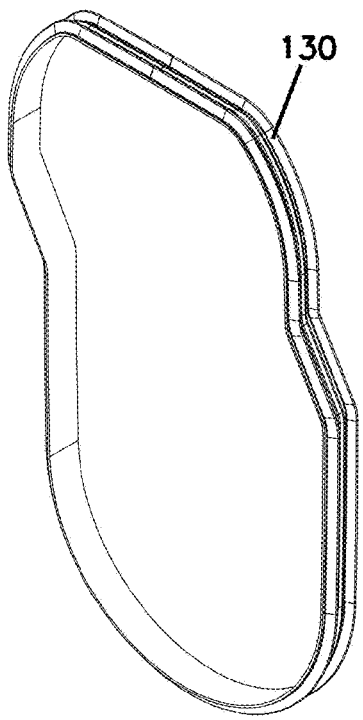
FIG. 75 is a perspective view of a first seal member of the filter cartridge shown in FIG. 60.
Figure 76:
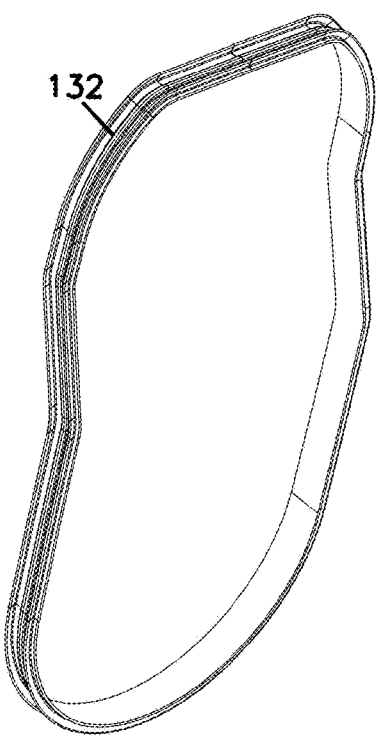
FIG. 76 is a perspective view of a second seal member of the filter cartridge shown in FIG. 60.
Figure 77:
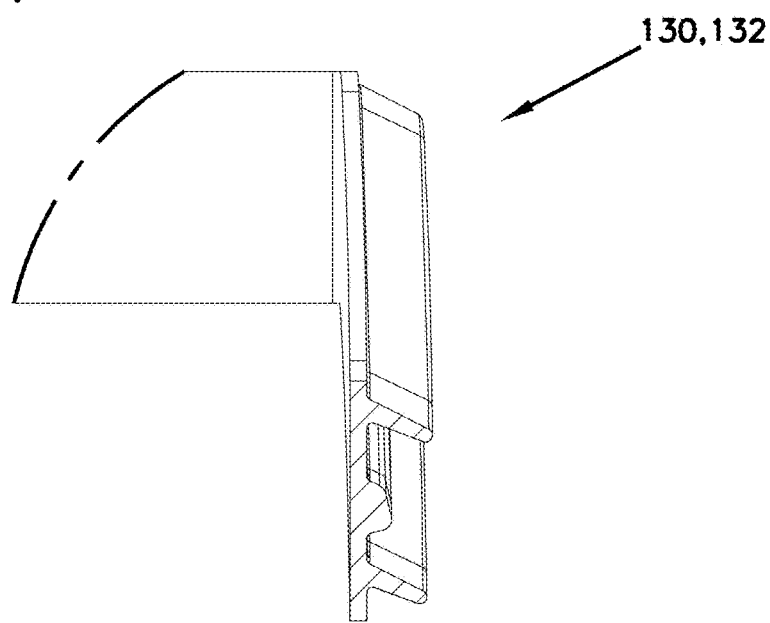
FIG. 77 is a cross-sectional view of the first and second seal members shown in FIGS. 75 and 76.

The filter cartridge 100 generally includes a media pack 110, a shell 120 integrally including the access cover 125 and the handle 127, a first sealing member 130 at the inlet end of the media pack 110, and a second sealing member 132 at the outlet end of the media pack 110. The sealing members 130, 132 will generally be made of a relatively flexible material and may be referred to herein as a "flexible sealing member," and can include an axial or radial sealing member. In one example, the sealing members 130, 132 are provided as injection molded gaskets. In the embodiment shown, the sealing members 130, 132 are provided as gaskets with alternating segments of parallel lip seals 134 and open-faced pocket structures 136, as is described later in this section. The seal members 130, 132 are shown in isolation at FIGS. 75-77.

Figure 70:
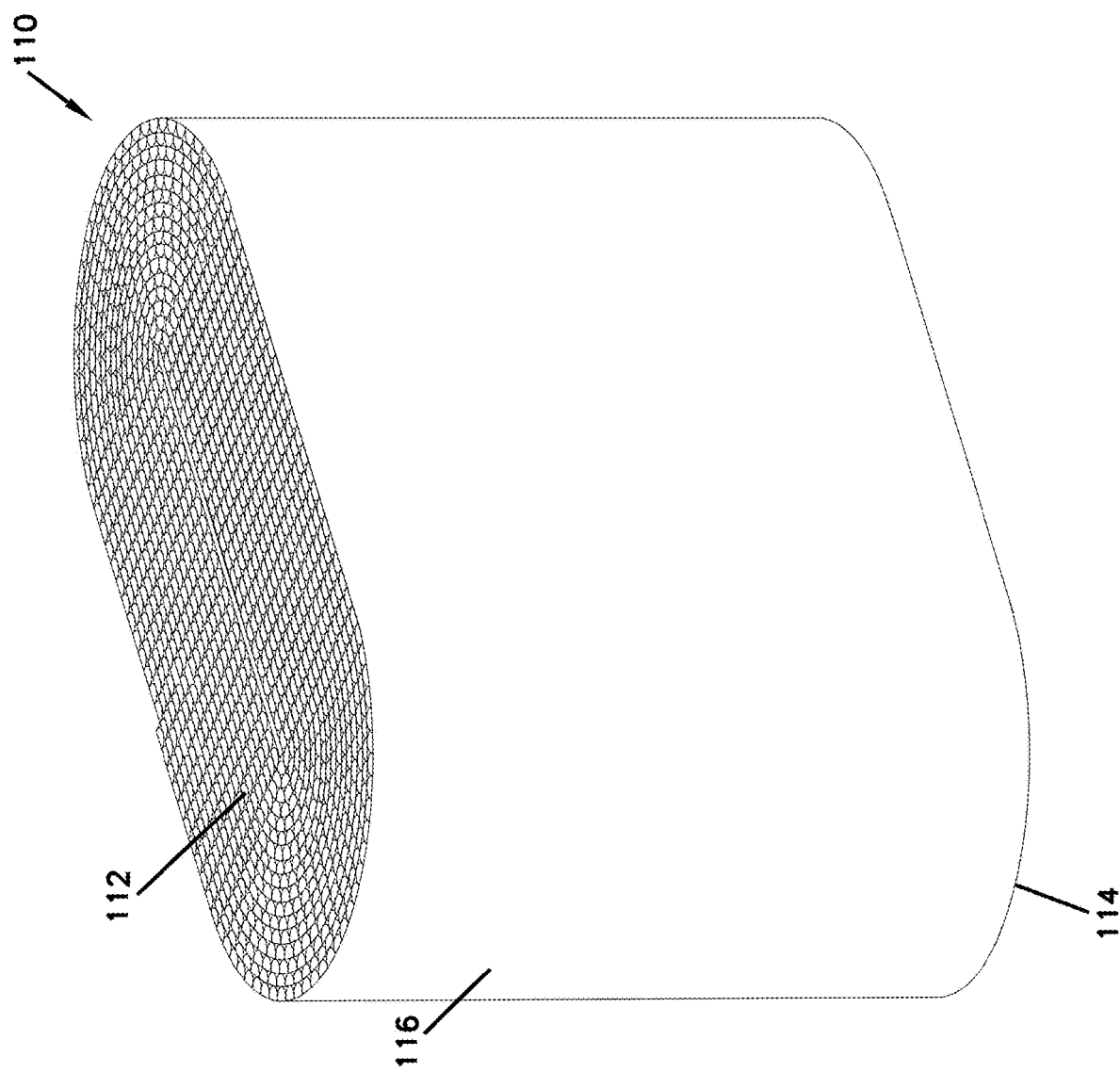
FIG. 70 is a perspective view of a media pack of the filter cartridge shown in FIG. 60.
Figure 71:
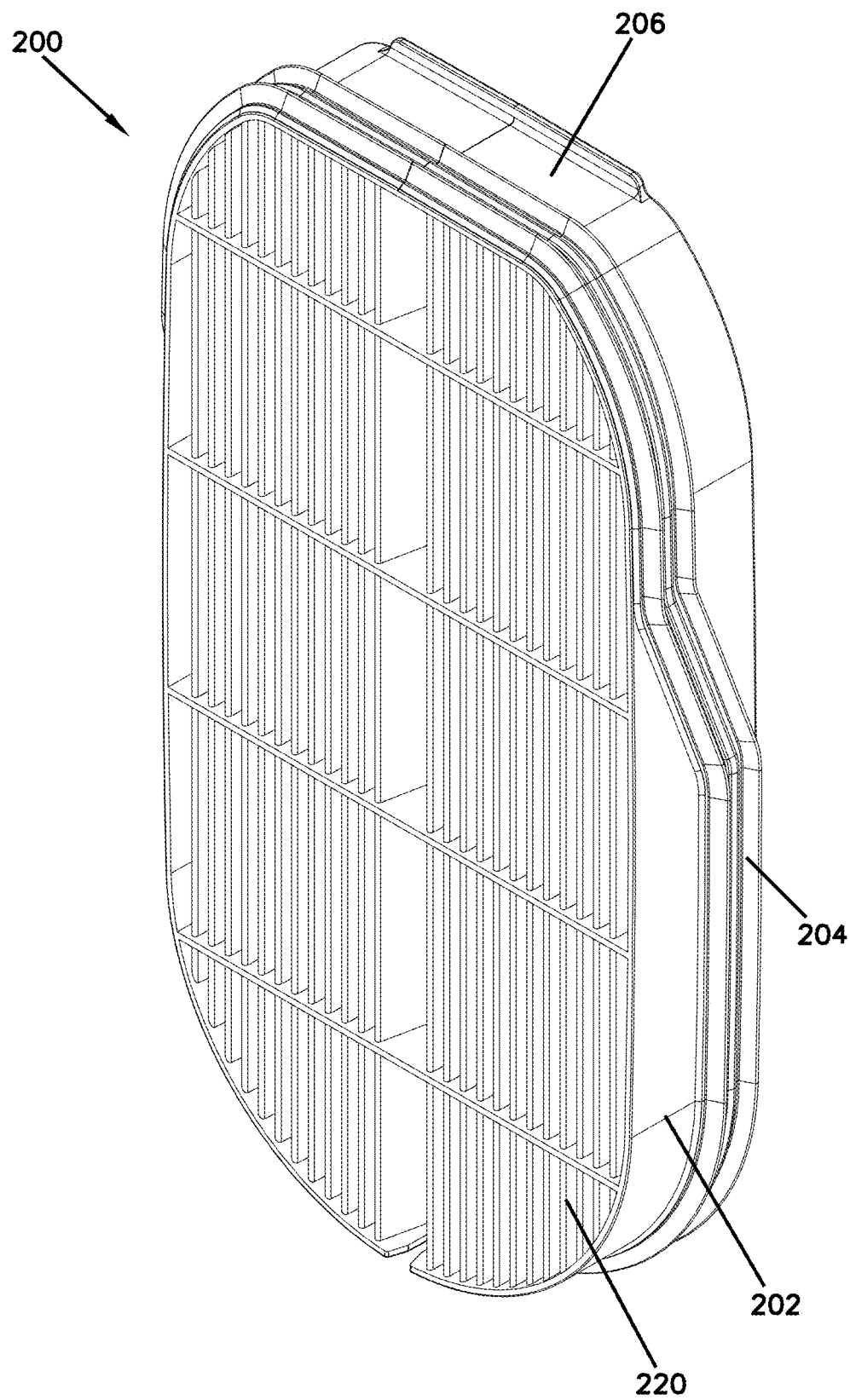
FIG. 71 is a perspective view of a secondary filter cartridge of the air cleaner shown in FIG. 1.
Figure 72:
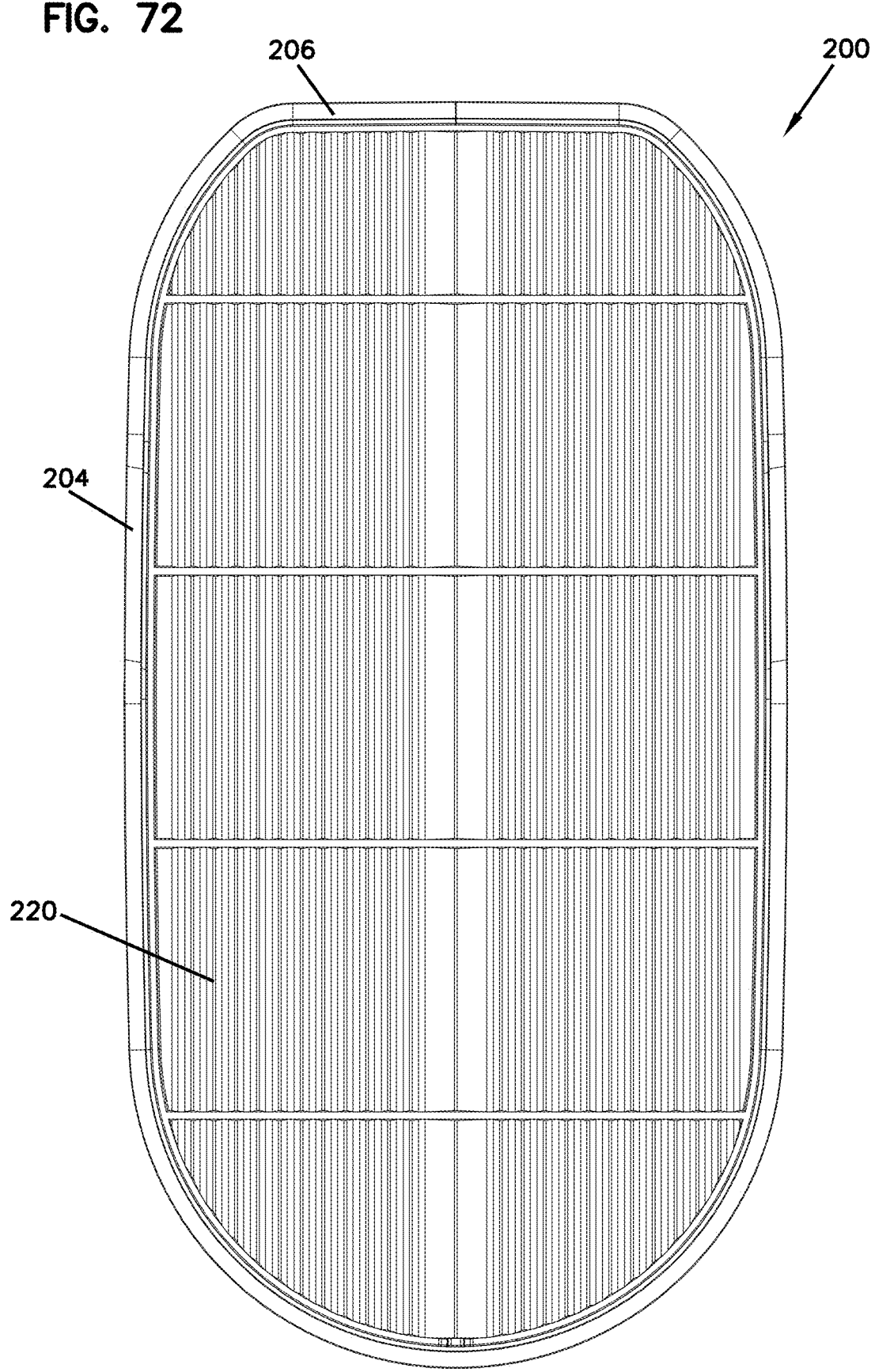
FIG. 72 is an inlet end view of the filter cartridge shown in FIG. 71.
Figure 73:
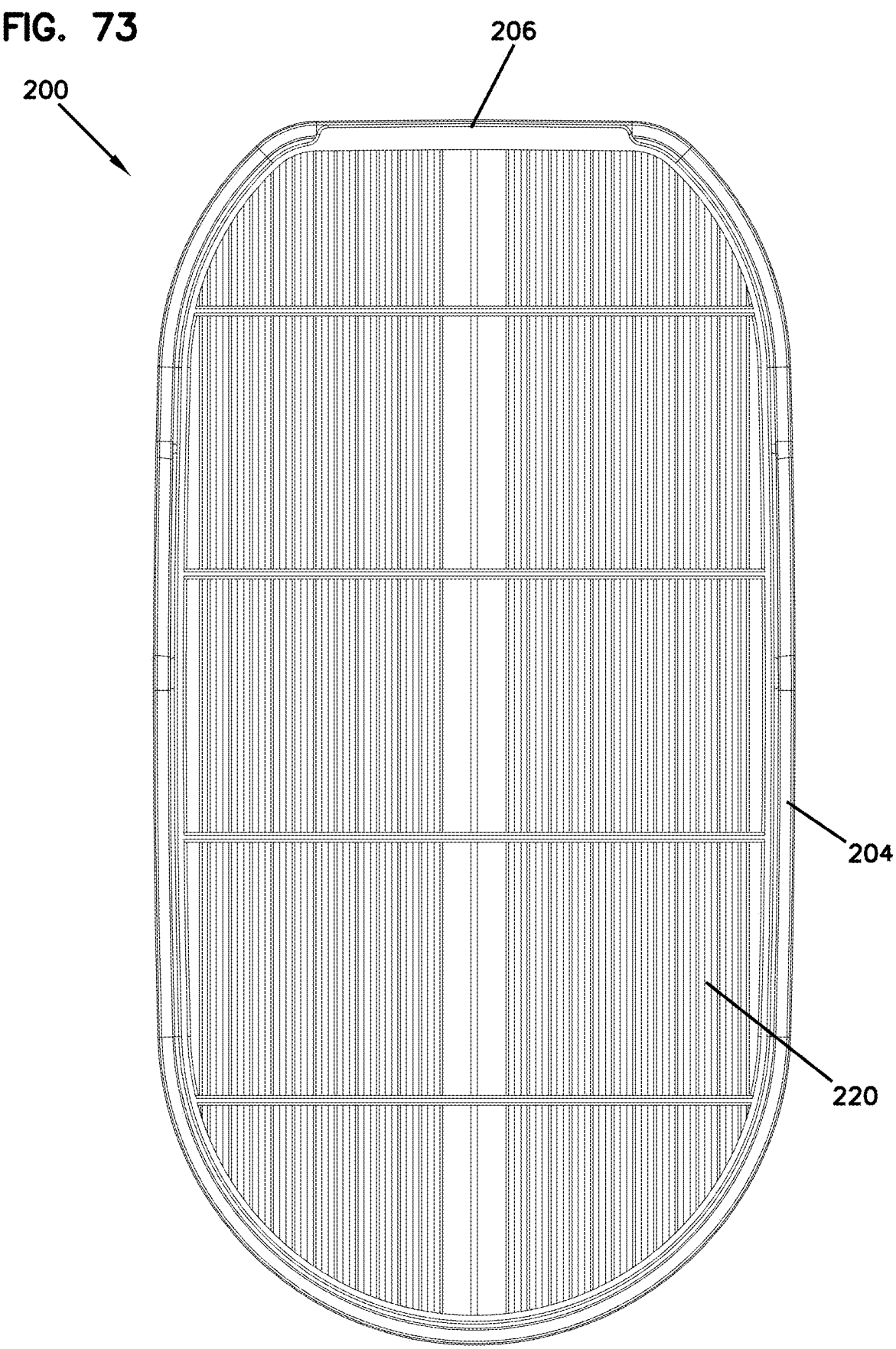
FIG. 73 is an outlet end view of the filter cartridge shown in FIG. 71.
Figure 74:
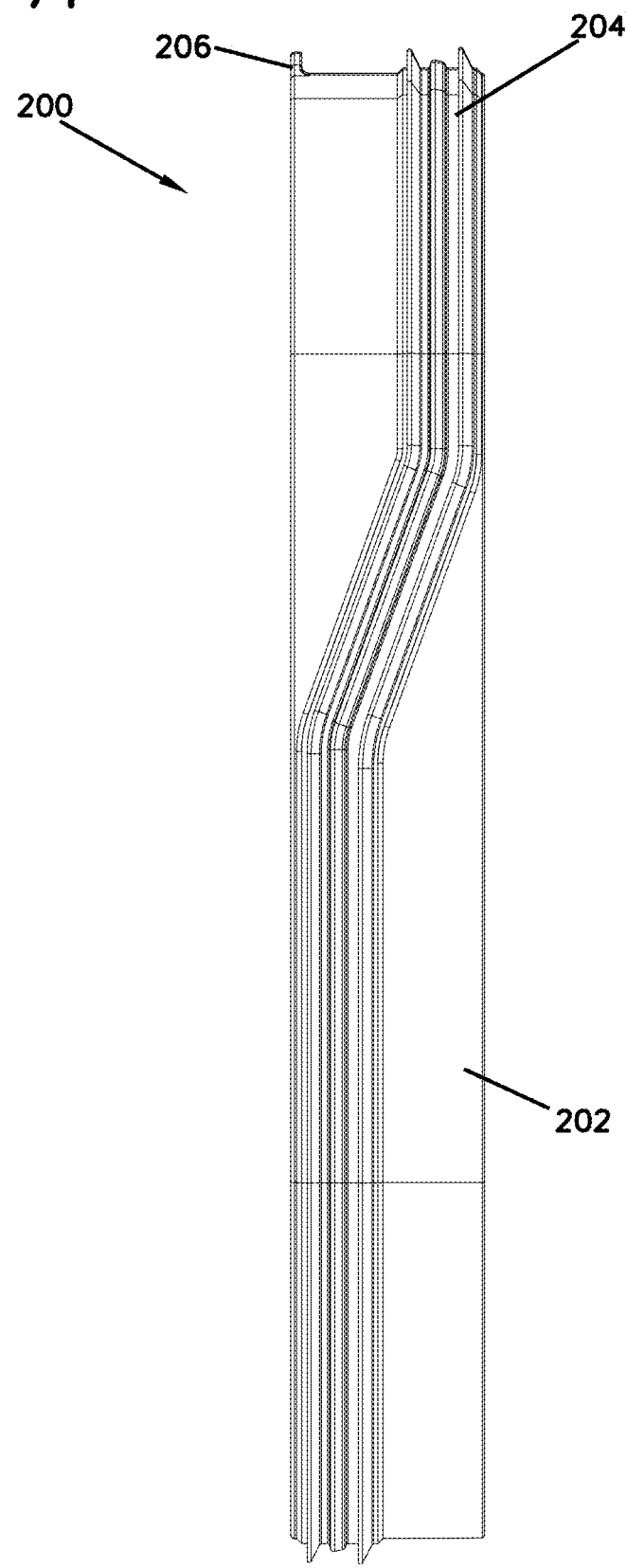
FIG. 74 is a side view of the filter cartridge shown in FIG. 71.

In the example shown, the media pack 110 has inlet flow face 112 for receiving unfiltered air or pre-cleaned air from the precleaner (if provided) and an outlet flow face 114 for delivering filtered air. The media pack 110 is shown in isolation at FIG. 70. In the example shown, the media pack 110 has an obround cross-sectional shape. However, other shapes are possible, such as round, oval, and rectangular cross-sectional shapes. In one aspect, the media pack 110 defines an outer perimeter 116 extending between the inlet and outlet flow faces 112, 114. In the example shown, the media pack 110 is formed from a coiled media construction, for example a media construction having a fluted (typically corrugated) media sheet and a facing media sheet that together define parallel flutes to form a fluted or z-filter media construction. Suitable media constructions for the media pack 110 are discussed in more detail in the Media Types and Configurations section.

In one aspect, the shell 120 of the filter cartridge 100 is formed from a polymeric material, such as nylon, polypropylene, or ABS plastic. The shell 120 is shown in isolation at FIGS. 66-69. In one aspect, the shell 120 defines a perimeter wall 122 that surrounds the outer perimeter 116 of the media pack 110. A grid structure 123 is also shown as being provided with the shell 120 for supporting the outlet flow face 114 of the media pack 110. The shell 120 may be secured to the media pack 110 by an adhesive. The perimeter wall 122 may surround the entirety of the media pack outer perimeter 116, as shown, or surround a portion of the media pack outer perimeter 116. As noted previously, the access cover 125 and handle 127 are integrally formed with the shell. As shown, the access cover 125 includes a main body 125a that is sized and shaped to mate against and cover the access opening 22f of the housing body 20. The main body 125a defines a sealing surface 125b against which a seal associated with the housing body 20 can form a seal. In the example shown, the handle 127 is formed with the access cover 125 such that an open space 127a exists between the handle 127 and the cover 125 to allow an operator to grasp the handle 127. The open space 127a can be defined as a recess beneath one or both sides of the handle 127 or can be a completely open space, as shown in the drawings. In the example shown, the access cover 125 can be provided with indicia 125c, such as text and directional arrows, to provide an indication to an operator as to the proper installation orientation of the filter cartridge 100.

In one aspect, first and second seal support flanges 124, 126 extend orthogonally from the perimeter wall 122. The seal support flanges 124, 126 respectively provide a support surface for the seal members 130, 132. The seal support flanges 124, 126, and thus the supported seal members 130, 132, are respectively provided with profiles complementary to the sealing outlet assembly sealing surface 46d and the inlet assembly sealing surface 56d. Accordingly, the seal support flange 124 defines a support surface 124a having a first portion 124b disposed at angle a4 and an adjoining second portion 124c, wherein the first and second portions 124b, 124c form the angle a4 between them. The shape of the support flange 124 imparts similar features onto the seal member 130 such that a seal surface 130a of the seal member 130 has a first portion 130b at the angle a3 and an adjoining second portion 130c at the angle a4 with respect to the first portion 130b. In the example shown, the media pack inlet flow face 112 is shown as being orthogonal to the longitudinal axis X1 of the filter cartridge 100. Accordingly, the support flange first portion 124a and the seal first portion 130b can be said to form an angle a5 with the plane P1 defining the inlet flow face that is equal to the angle a3 minus 90 degrees. As such, the angle a5 in the example shown is 10 degrees.

The seal support flange 126 defines a support surface 126a having a first portion 126b disposed at the angle a1 and an adjoining second portion 124c disposed at the angle a2 with respect to the first portion 126b. The shape of the support flange 126 imparts similar features onto the seal member 132 such that a seal surface 132a of the seal member 132 has a first portion 132b at the angle a1 and an adjoining second portion 132c at the angle a2 with respect to the first portion 132b. In the example shown, the media pack outlet flow face 114 is shown as being orthogonal to the longitudinal axis X1 of the filter cartridge 100. Accordingly, the support flange first portion 126a and the seal first portion 132b can be said to form an angle a6 with the plane P2 defining the inlet flow face that is equal to the angle a1 minus 90 degrees. As such, the angle a6 in the example shown is 10 degrees. In one aspect, the seal surfaces 130a, 132a can be characterized as defining axial seal surfaces or axially facing seal surfaces as the face of the seal surface is more orthogonal than not to the longitudinal axis X1 (i.e. more parallel than not to the end faces of the media pack 110 or facing in the same general direction as the media pack end) of the filter cartridge 100.

Figure 61:
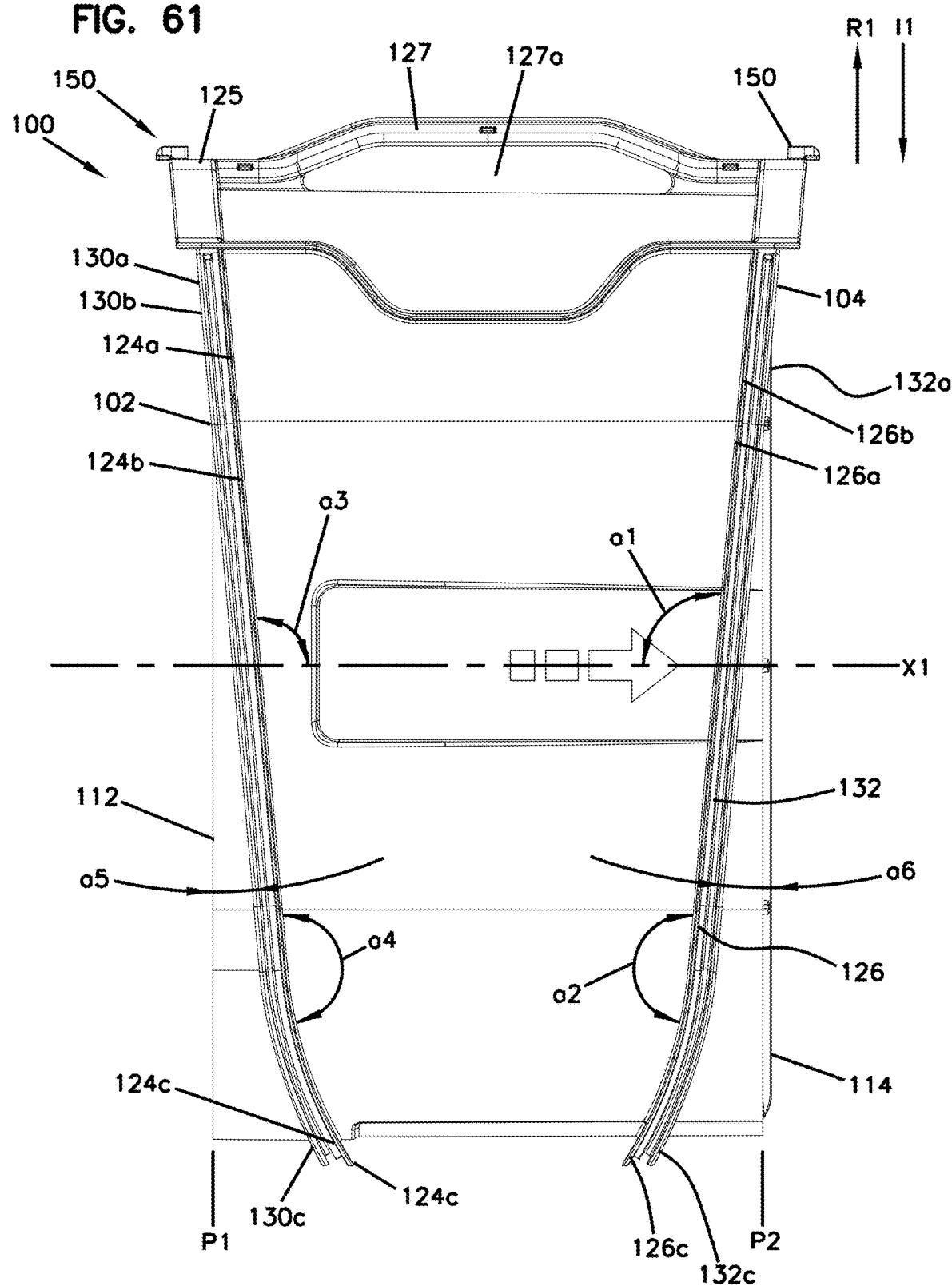
FIG. 61 is a side view of the filter cartridge shown in FIG. 60.
Figure 61A:
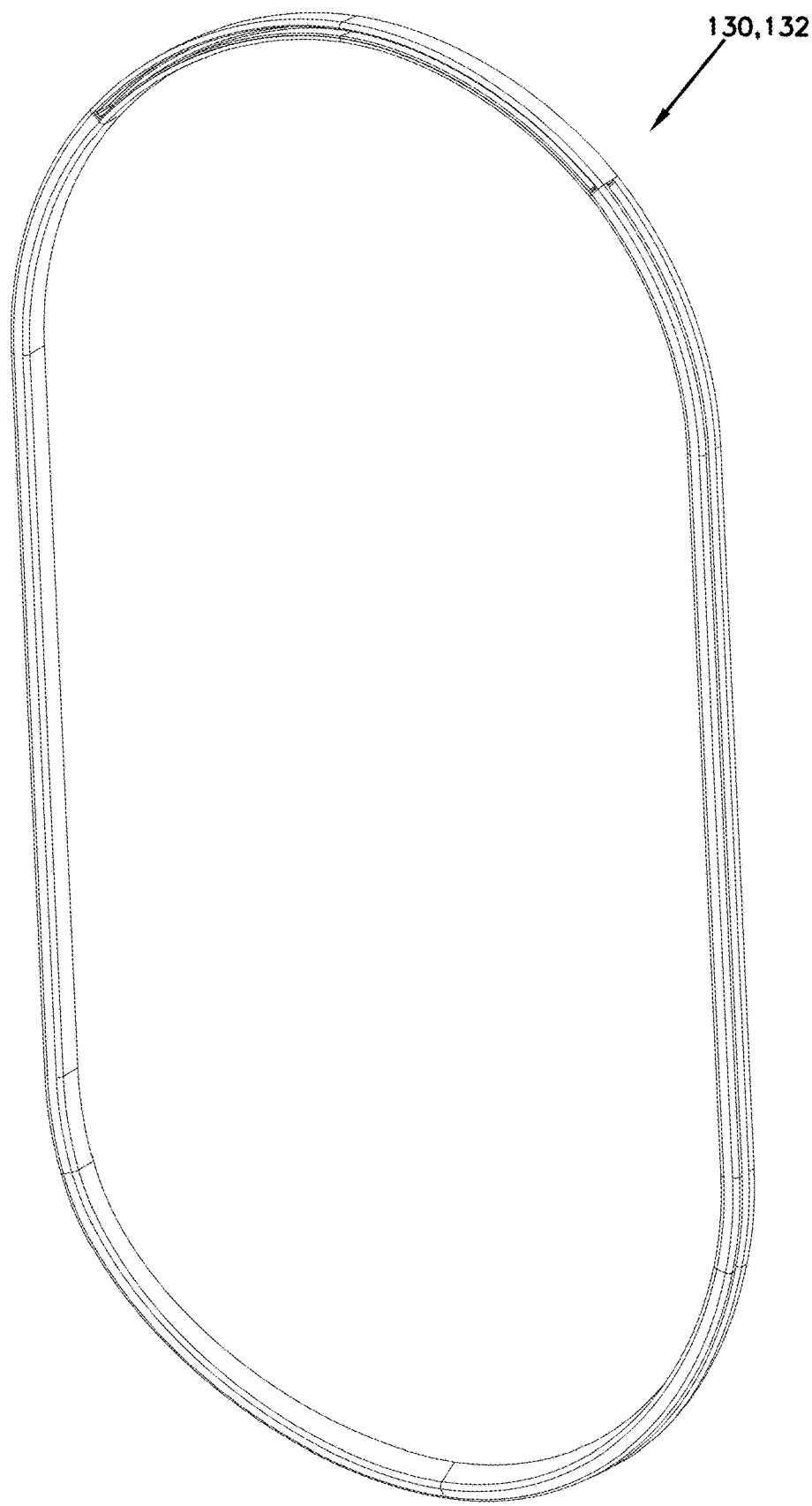
FIG. 61A is a perspective view of a representative seal member of the filter cartridge shown in FIG. 60.
Figure 61B:
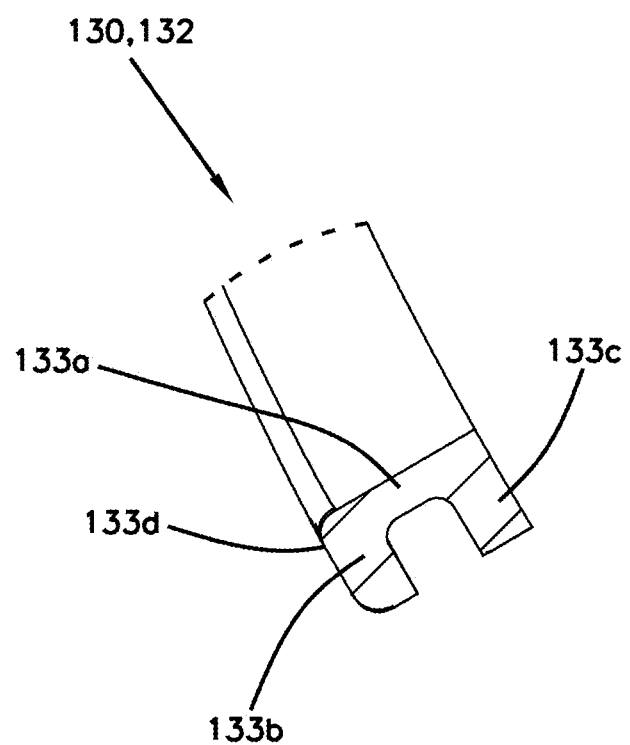
FIG. 61B is a cross-sectional side view of a first portion of the seal member shown in FIG. 61A.
Figure 61C:
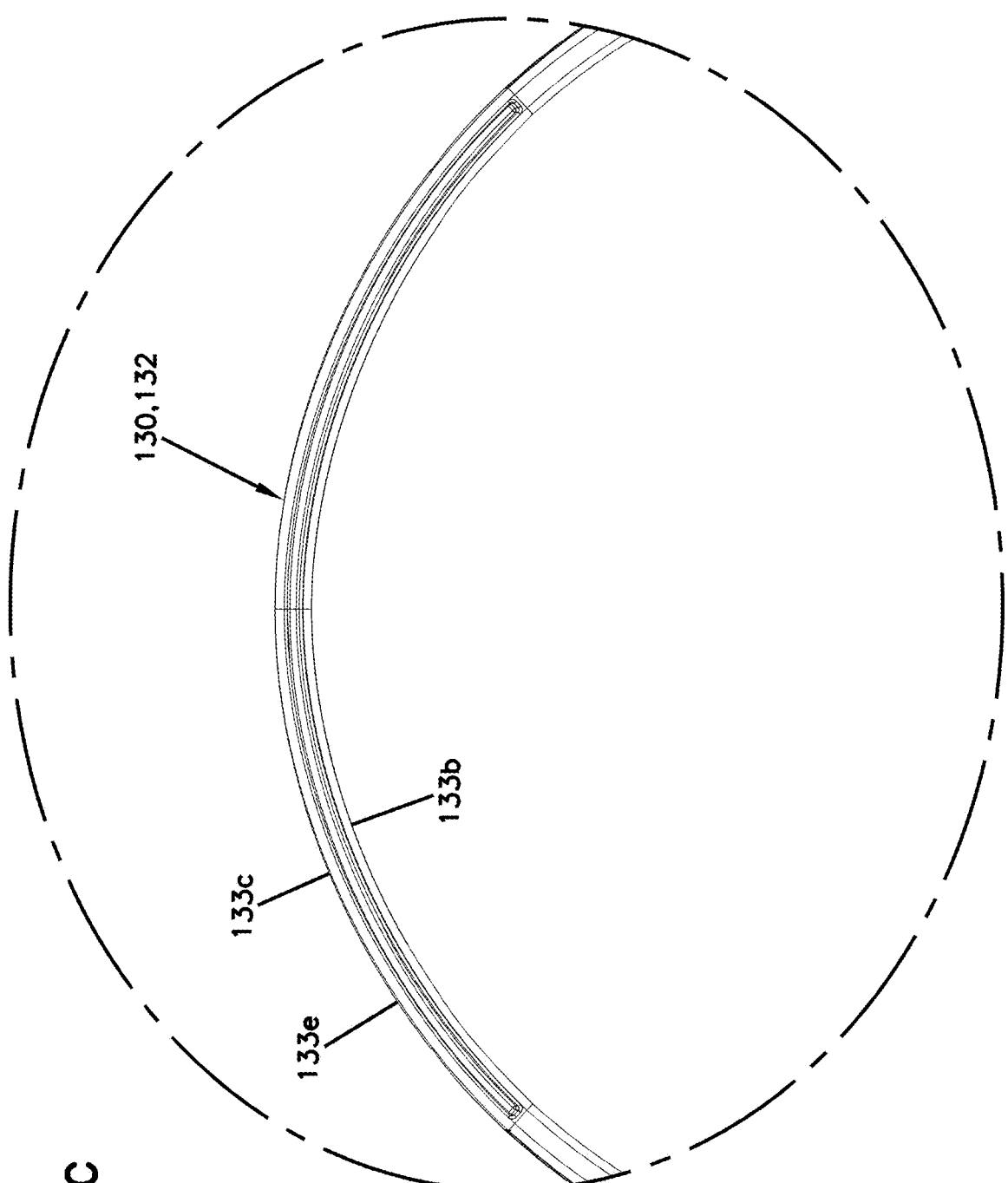
FIG. 61C is an enlarged portion of a second portion of the seal member shown in FIG. 61A.
Figure 62:
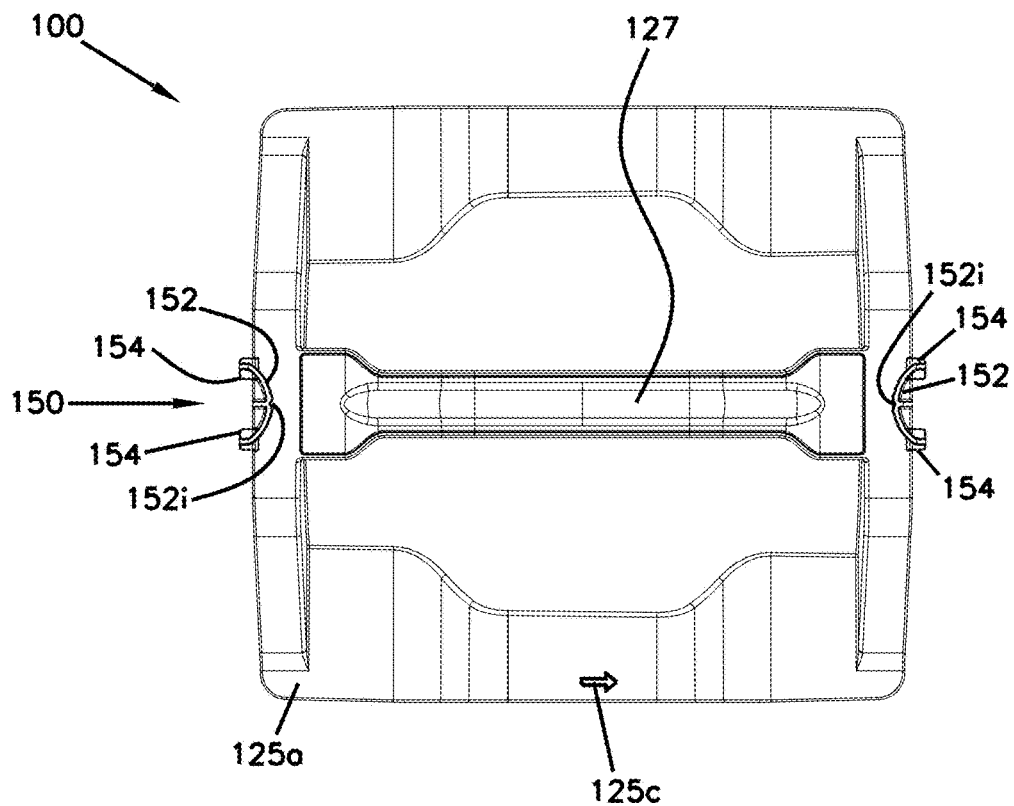
FIG. 62 is a top view of the filter cartridge shown in FIG. 60.
Figure 63:
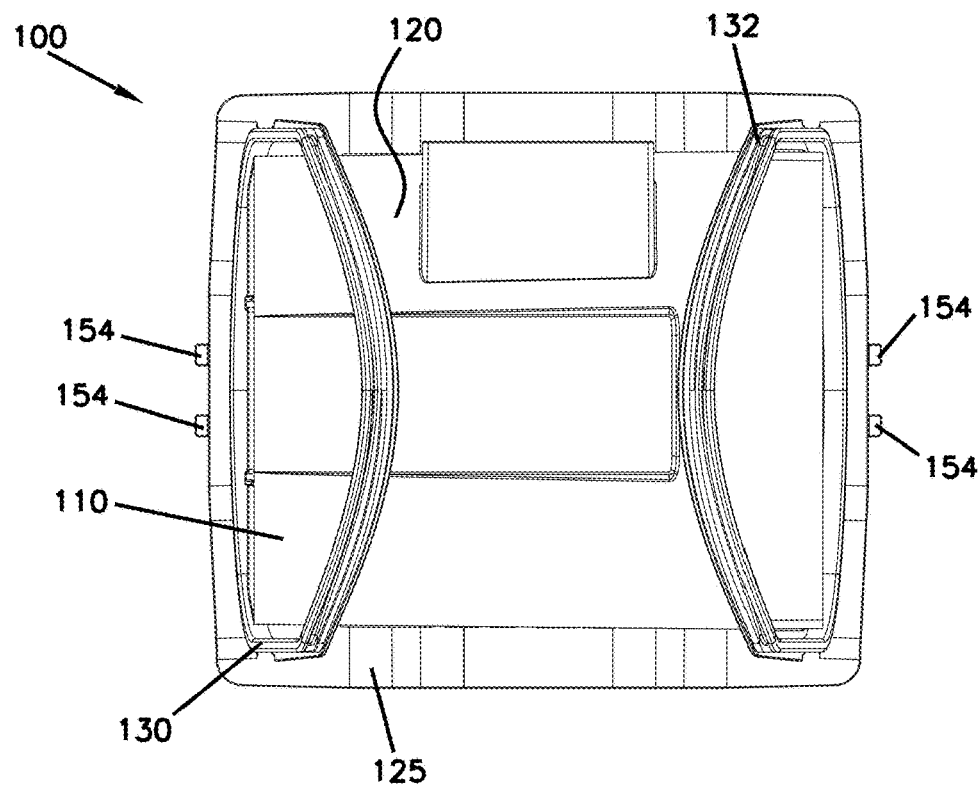
FIG. 63 is a bottom view of the filter cartridge shown in FIG. 60.
Figure 65:
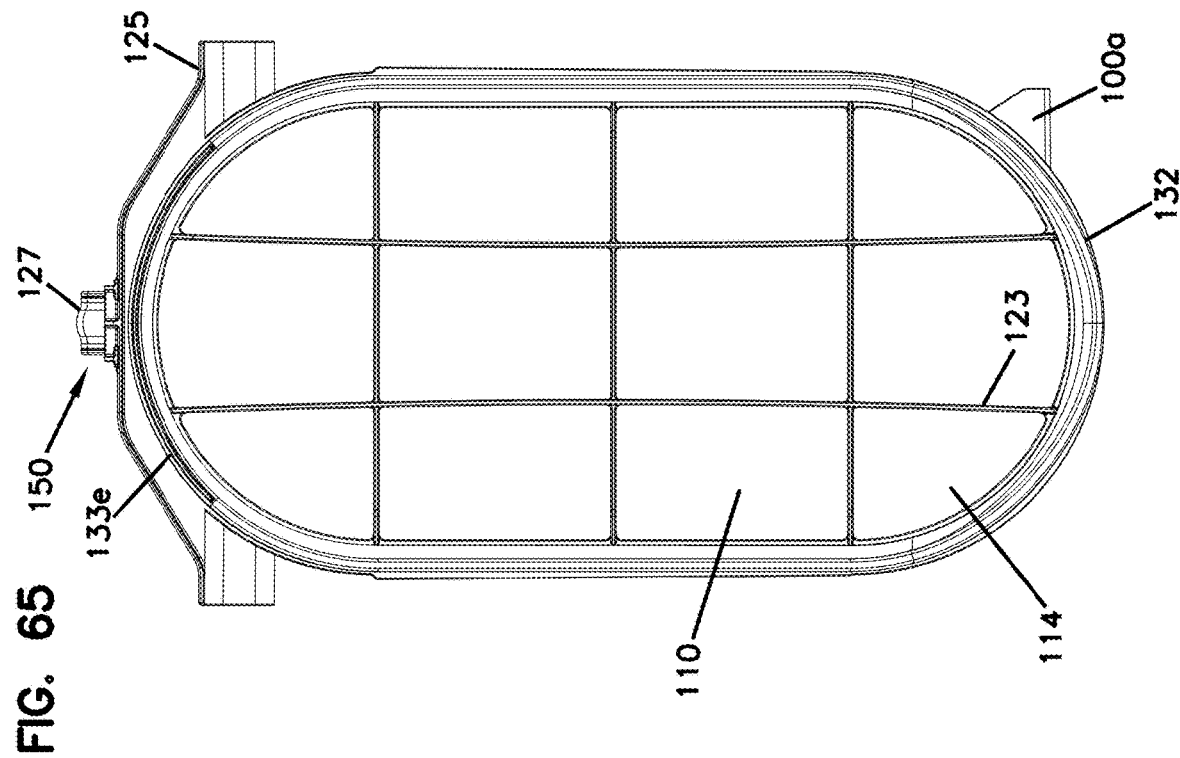
FIG. 65 is an outlet end view of the filter cartridge shown in FIG. 60.
Figure 64:
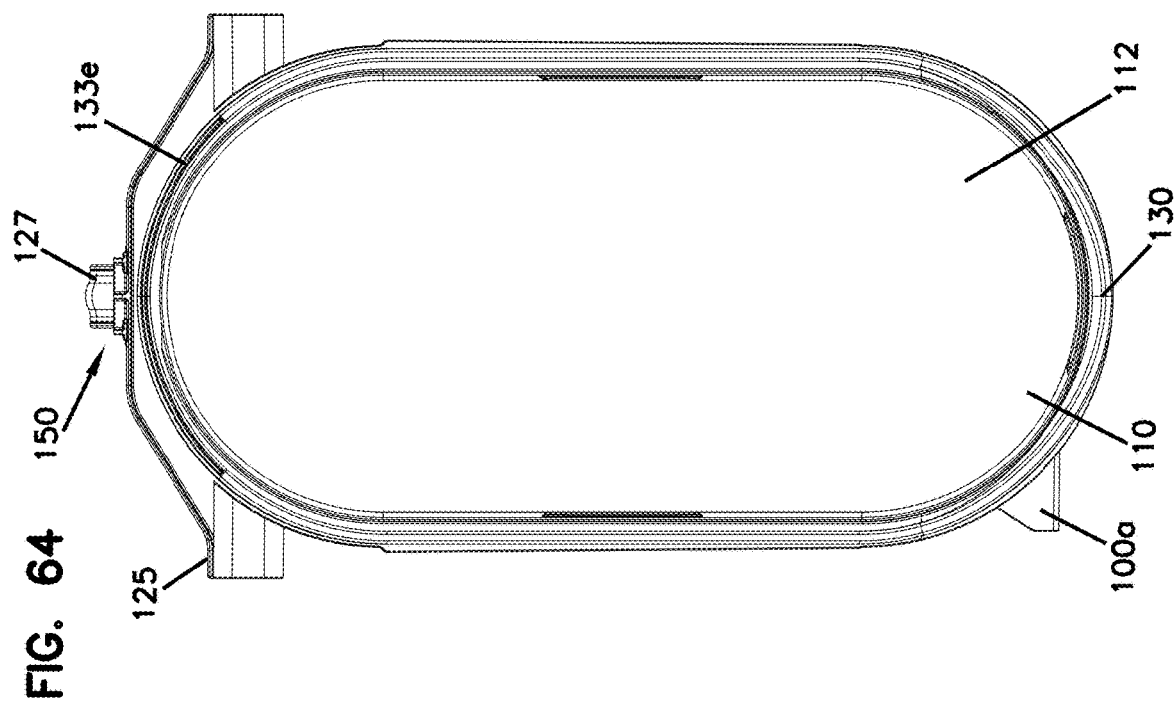
FIG. 64 is an inlet end view of the filter cartridge shown in FIG. 60.
Figure 66:
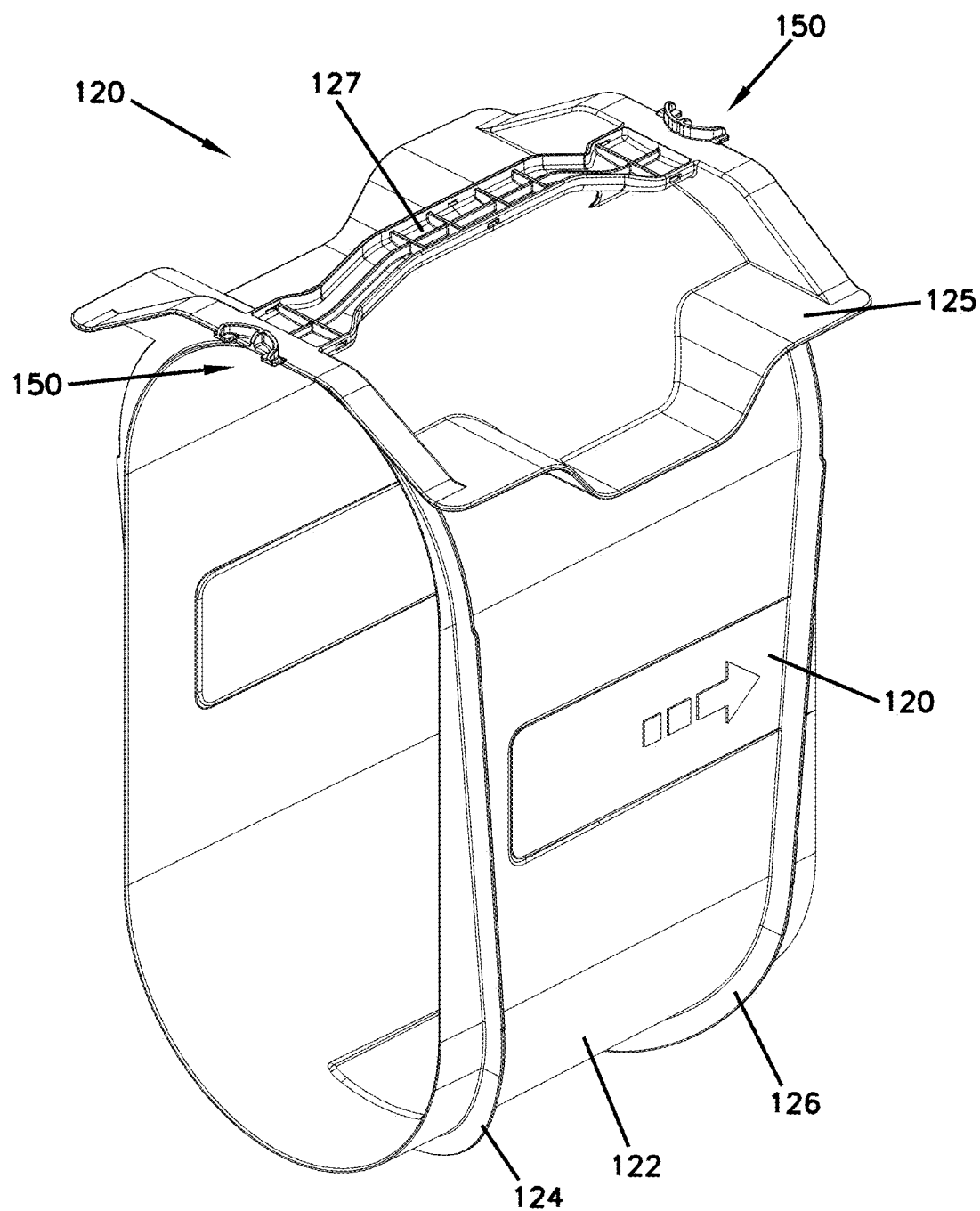
FIG. 66 is a first perspective view of an outer shell of the filter cartridge shown in FIG. 60.
Figure 67:
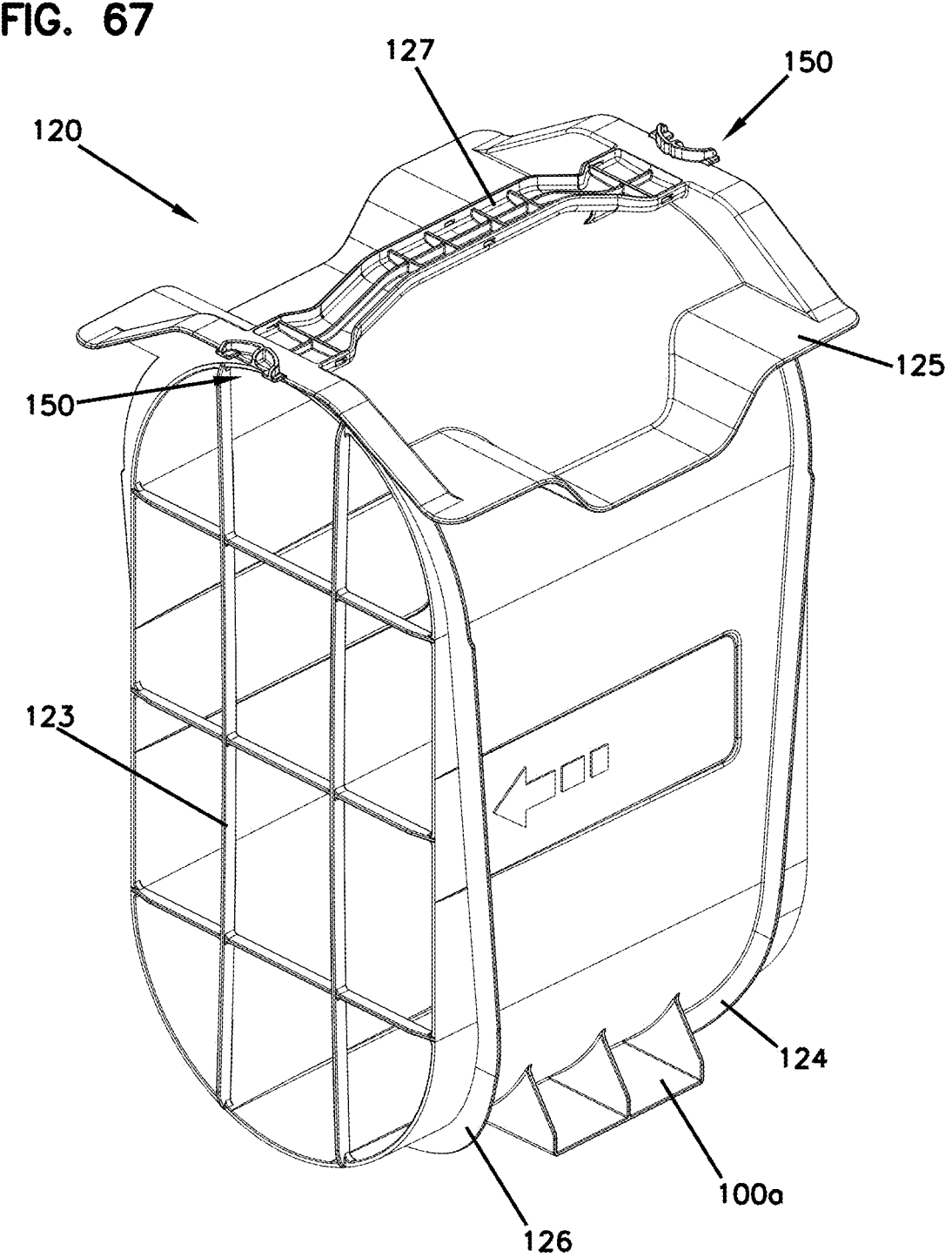
FIG. 67 is a second perspective view of the outer shell shown in FIG. 66.
Figure 68:
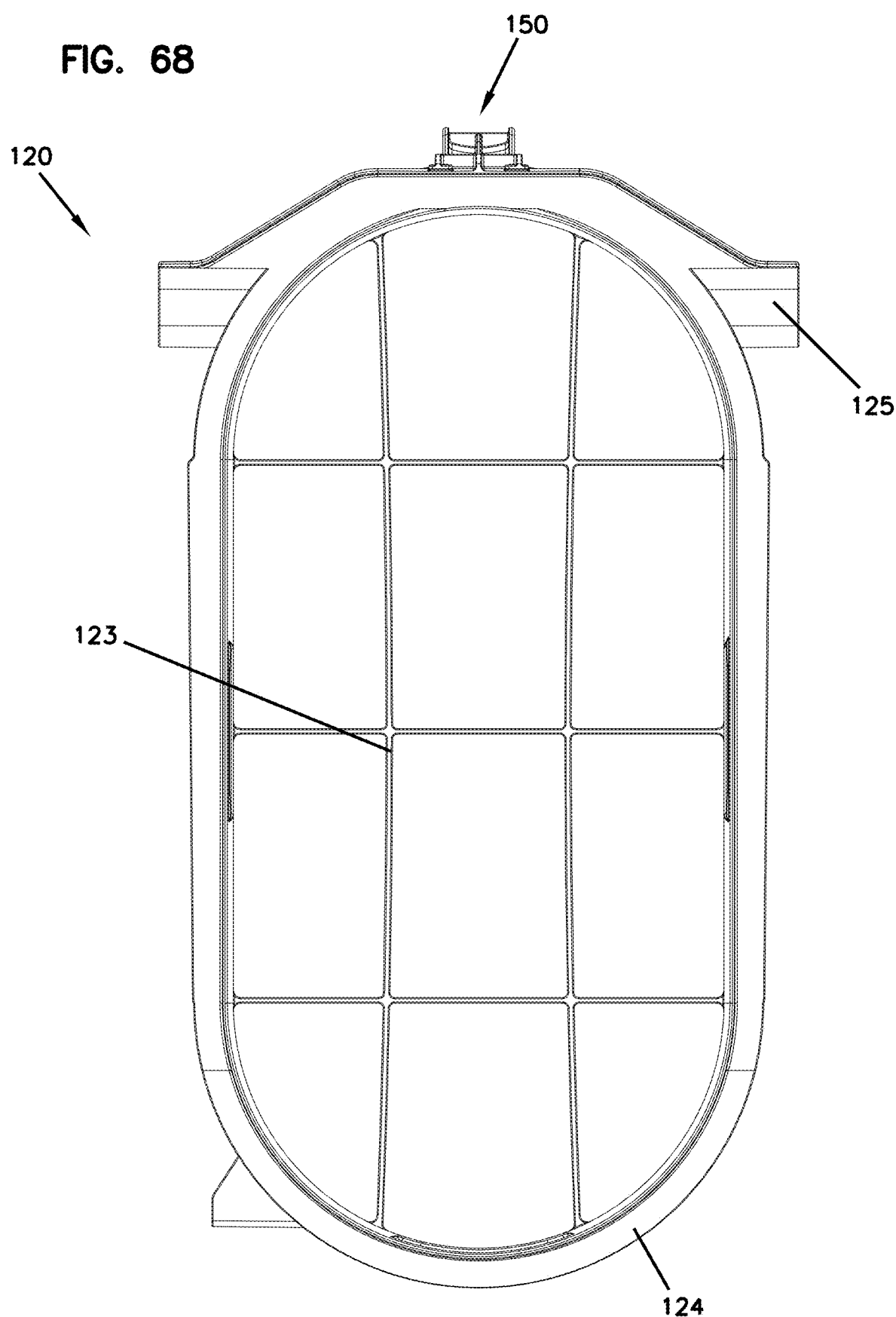
FIG. 68 is an inlet end view of the outer shell shown in FIG. 66.
Figure 69:
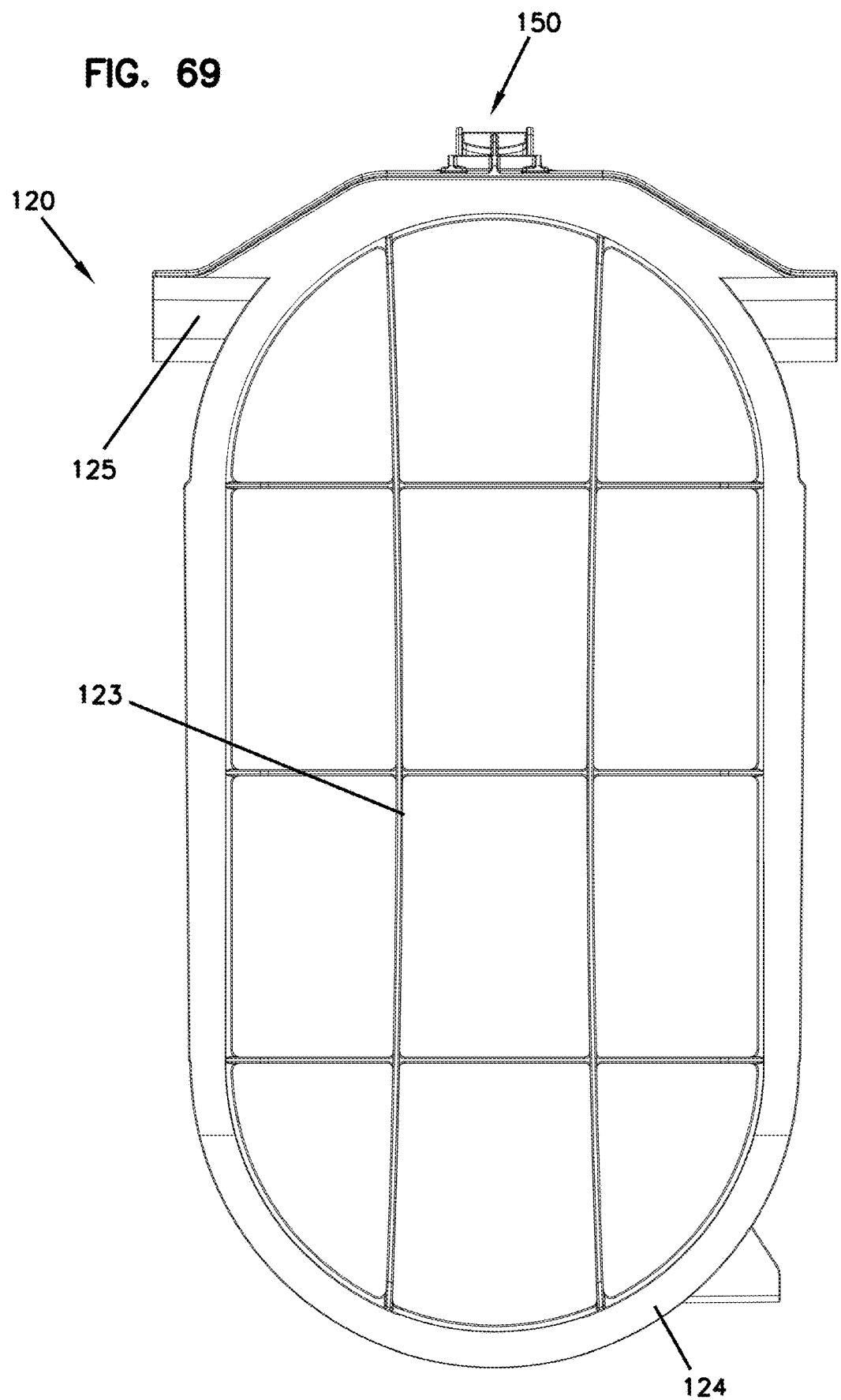
FIG. 69 is an outlet end view of the outer shell shown in FIG. 66.

The seal members 130, 132 can be provided with various features to enhance sealing. The seal members 130, 132 are shown in isolation at FIGS. 61A-61C, respectively. With reference to FIG. 61B a cross-sectional view of the seal members 130, 132 is presented. In one aspect, the seal members 130, 132 are injection molded seals. As presented, the seal members 130, 132 include a base member 133a and a pair of seal lips or extensions 133b, 133c that together form a c-channel type shape. The base member 133a and the side 133d of the lip extension 133b interfaces with the seal support flanges 124, 126 and can be secured to the flanges 124, 126 via an adhesive. The seal members 130, 132 can also include a top segment 133e wherein the c-shaped channel is oriented 90 degrees to the remainder of the seal member 130, 132. At top segment 133e, the open side of the channel faces in the same direction as the lip extension 133c of the remaining segment of the seal member 130, 132. This configuration allows for the seal members 130, 132 to be more easily molded onto the inlet and outlet housing assemblies 40, 50. At the location of the top segment 133e, the distal ends of each of the lip extensions 133b, 133c form the axial seal surface for the seal members 130, 132.

In one aspect, the seal surface first portions 130b, 132b form an angle with each as defined by the angles a1 and a3. As shown, this angle is about 20 degrees. In one aspect, the seal surface second portions 130c, 132c form an angle with each other as defined by the angles a1, a2, a3, and a4. As shown, this angle is about 65 degrees. Other angles are possible. In some examples, the first portions 130b, 132b are planar while in others the first portions 130b, 132b are curved. In some examples, the second portions 130c, 132c are planar while in others the second portions 130c, 132c are curved. In some examples, each of the first portions 130b, 132b and the second portions 130c, 132c are planar with a curved or radiused portion joining the first and second portions together. In some examples, the first portions 130b, 132b are planar and the second portions 130c, 132c are curved. In some examples, the first portions 130b, 132b define a majority of the length of the seal surfaces and the second portions 130c, 132c define a minority of the length of the seal surfaces.

As a result of the seal members 130, 132 being disposed at the angles a5, a6, the seal members 130, 132 taper towards each other in the insertion direction I1 and in a direction away from the cover 125 such that the seal members 130, 132 are closer to each other at a location remote from the cover 125 as compared to a location proximate the cover 125 (i.e. distance between seal members 130, 132 increases in a direction towards the cover). This tapered configuration allows for easier installation of the filter cartridge 100 into the interior region 20i of the housing body 20 with less compressive resistance from the seal members 130, 132, as compared to a configuration where the seal members 130, 132 oriented entirely parallel to each other and the plane P without any tapering. This advantage is even further achieved by the additional increased tapering angle presented by the second portions 130c, 132c which deviates outside of the plane defined by the first portions 130b, 132b (i.e. distance between seals at second portions 130c, 132c increases at a greater rate than distance between seals at first portions 130b, 132b in direction towards cover). These features allow for the filter cartridge 100 to simultaneously have axial seals while being transversely or side-loaded in the insertion direction I1, wherein the seals 130, 132 form a seal with the housing 20 without further requiring any movement of the filter cartridge 100 within the housing body 20 along the axis X1 in order to form a seal with the housing 20.

Another advantage of the disclosed configuration is that the filter cartridge seals against the inlet and outlet housing assemblies 40, 50 rather than the housing body 20. Because the seal member 130 forms a seal against the seal surface 56d of the inlet housing assembly 50 and the seal member 132 forms a seal against the seal surface 46d of the outlet housing assembly 40, it is not necessary for the cover 125 to form a leak-proof seal with the housing body 20 or for the filter cartridge 100 to form a leak-proof seal with the housing body 20.

In one aspect, the filter cartridge 100 is also shown as being provided with lock interface features 150 at each end. The lock interface features 150 interact with the locking mechanisms 90 such that the filter cartridge 100 can be locked in place with respect to the housing 20. As shown, the lock interface features 150 include an arcuate rib structure 152 and a pair of tab structures 154, each of which is integrally formed on the access cover 125. The structure and function of these features are further described in the lock mechanism section.

Filter Cartridge 200

Figure 1A:
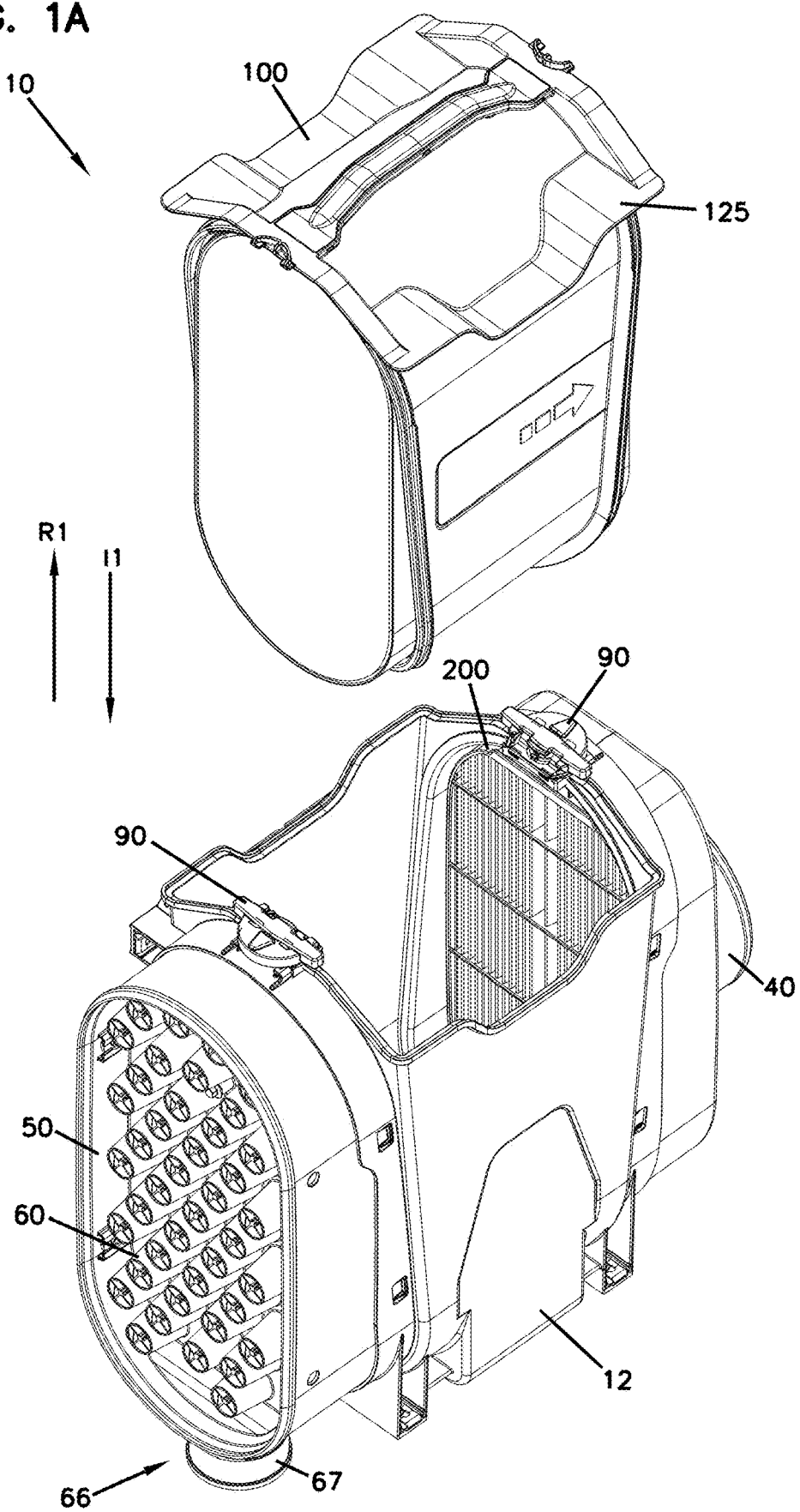
FIG. 1A is a perspective view of the air cleaner shown in FIG. 1, with a primary filter cartridge shown as being removed from the housing.

Referring to FIG. 1A, the exemplary air cleaner assembly 10 includes an optional secondary or safety filter cartridge 200. The safety filter cartridge 200 is shown in isolation at FIGS. 71 to 74. The safety filter 200 is generally positionable between the main filter cartridge 100 and the outlet 48b of the housing 20. In a typical arrangement, the safely filter 200 is removably positioned within the air cleaner assembly 10 and would also typically be considered to be a service component that is removable and replaceable, as desired and/or necessary.

The exemplary embodiment of safety filter 200 includes an outer frame 202 that carries a seal member 204 having a pair of parallel lip seals, and generally matches the size and shape of the inner area of the housing outlet body 42 (e.g. straight segmented portions 42d together with the straight sides of the interior surface of the sidewall 42a) and can seal to the outlet body 42, preferably with no gaps. In this way, the safety filter 200 can be pressed into the housing with a friction fit against the wall of the housing so that no air can reach the outlet without first going through the safety filter. The safety filter 200 can also include filtration media 220, such as pleated media. A handle 206 may also be provided to aid in installing and removing the filter cartridge 200 from the housing 20 via the access opening 22f.

Media Types and Configurations

Any type of filter media can be used as the media pack for the filter cartridges 100, 200 in accordance with embodiments of the invention. For example, woven and non-woven materials using natural and/or synthetic fibers can be used to form fluted filter media, pleated media, and depth media. An exemplary configuration includes fluted filter media, such as a z-filter construction. The term "z-filter construction" as used herein, is meant to refer to a type of filter construction in which individual ones of corrugated, folded or otherwise formed filter flutes are used to define sets of longitudinal, typically parallel, inlet and outlet filter flutes for fluid flow through the media; the fluid flowing along the length of the flutes between opposite inlet and outlet flow ends (or flow faces) of the media. Some examples of filter media are provided in U.S. Pat. Nos. 5,820,646; 5,772,883; 5,902,364; 5,792,247; 5,895,574; 6,210,469; 6,190,432; 6,350,296; 6,179,890; 6,235,195; D399,944; D428,128; D396,098; D398,046; and D437,401, each of which is incorporated herein by reference.

One type of z-filter media utilizes two specific media components joined together to form the media construction. The two components include a fluted (typically corrugated) media sheet and a facing media sheet. The facing media sheet is typically non-corrugated, although it is possible for it to also be corrugated (e.g., perpendicular to the flute direction) as described in U.S. Provisional Application No. 60/543,804, filed Feb. 11, 2004, and published as PCT WO 05/077487 on Aug. 25, 2005, which is incorporated herein by reference.

The fluted media sheet and the facing media sheet are used together to define media having parallel inlet and outlet flutes. In some instances, the fluted sheet and facing sheet are secured together and are then coiled as a media strip to form a z-filter media construction. Such arrangements are described, for example, in U.S. Pat. Nos. 6,235,195 and 6,179,890, each of which is incorporated herein by reference.

In certain other arrangements, some non-coiled sections or strips of fluted (typically corrugated) media secured to facing media, are stacked with one another, to create a filter construction.

Corrugated media is a specific form of fluted media, wherein fluted media has individual flutes or ridges (for example formed by corrugating or folding) extending thereacross. The term "corrugated" is used herein to refer to structure in media, such as media having a flute structure resulting from passing the media between two corrugation rollers (e.g., into a nip or bite between two rollers, each of which has surface features appropriate to cause corrugations in the resulting media).

Serviceable filter element or filter cartridge configurations utilizing z-filter media are sometimes referred to as "straight through flow configurations" or by variants thereof. In general, serviceable filter elements or cartridges have an inlet flow end (or face) and an opposite exit flow end (or face), with flow entering and exiting the filter cartridge in generally the same straight through direction. The term "serviceable" in this context is meant to refer to a media containing filter cartridge that is periodically removed and replaced from a corresponding fluid (e.g. air) cleaner.

Lock Mechanism 90

Figure 2:
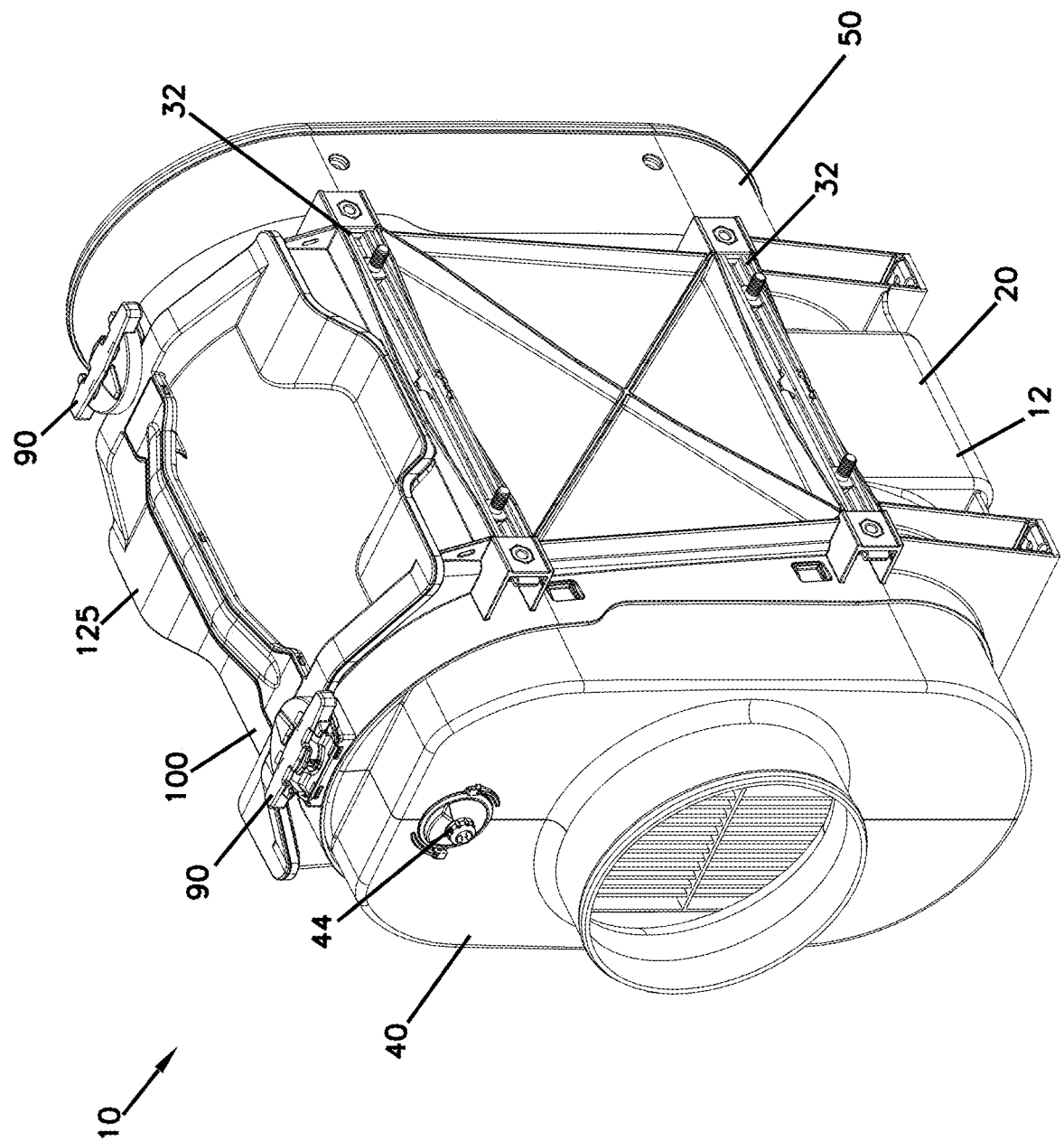
FIG. 2 is a second perspective view of the air cleaner shown in FIG. 1.
Figure 3:
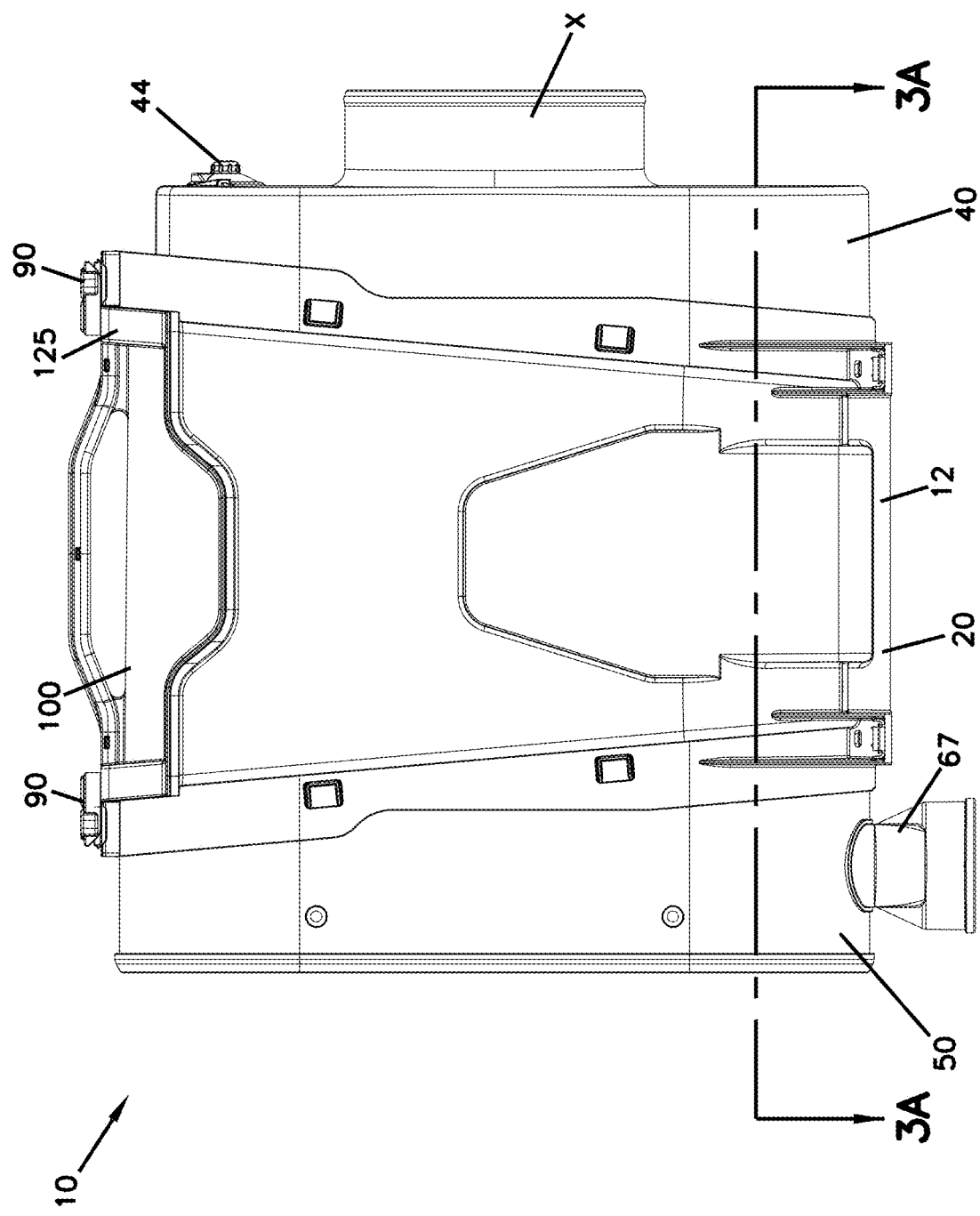
FIG. 3 is a side view of the air cleaner shown in FIG. 1.
Figure 3A:
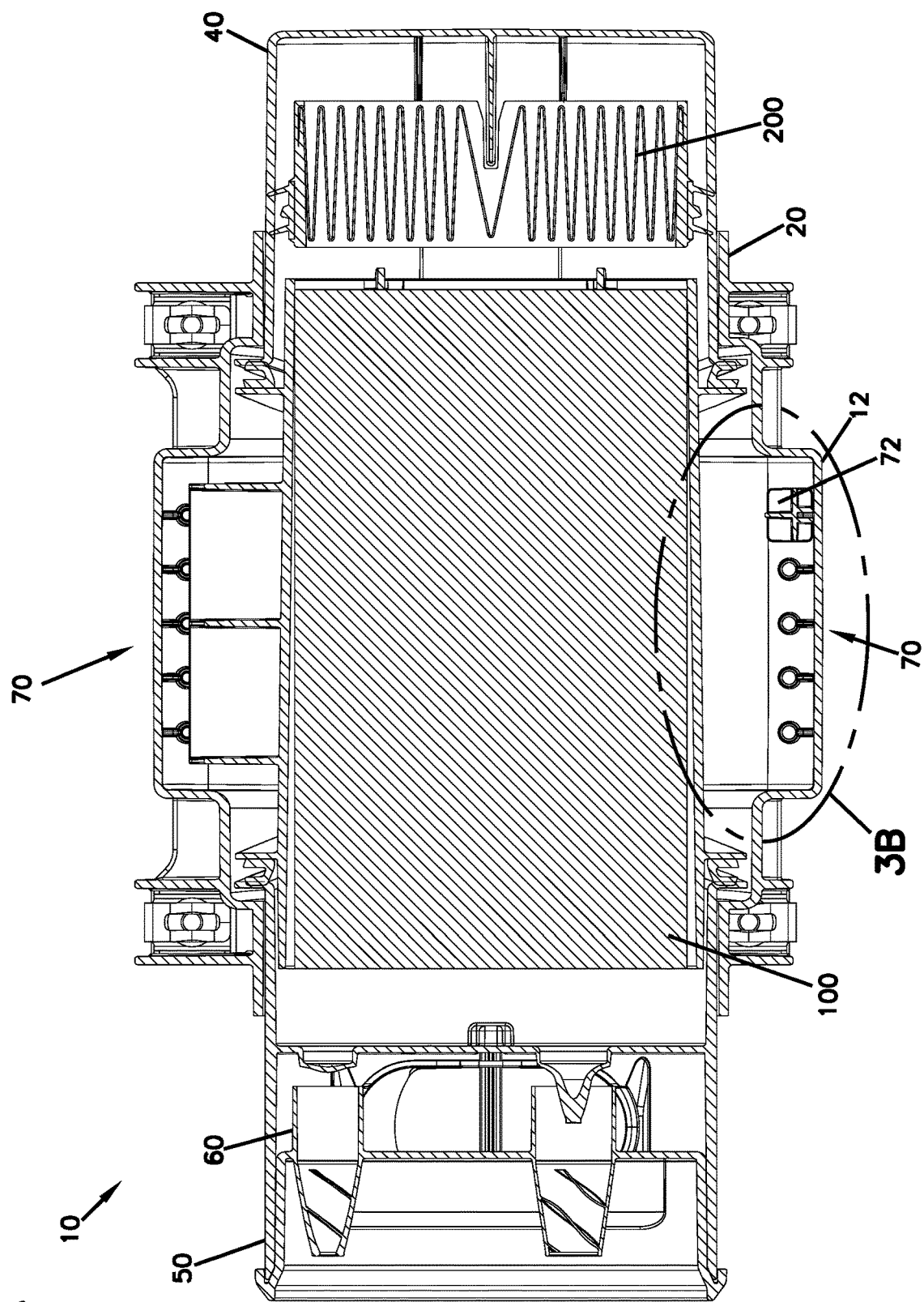
FIG. 3A is a cross-sectional view of the air cleaner shown in FIG. 1, taken along the line 3A-3A in FIG. 3.
Figure 3B:
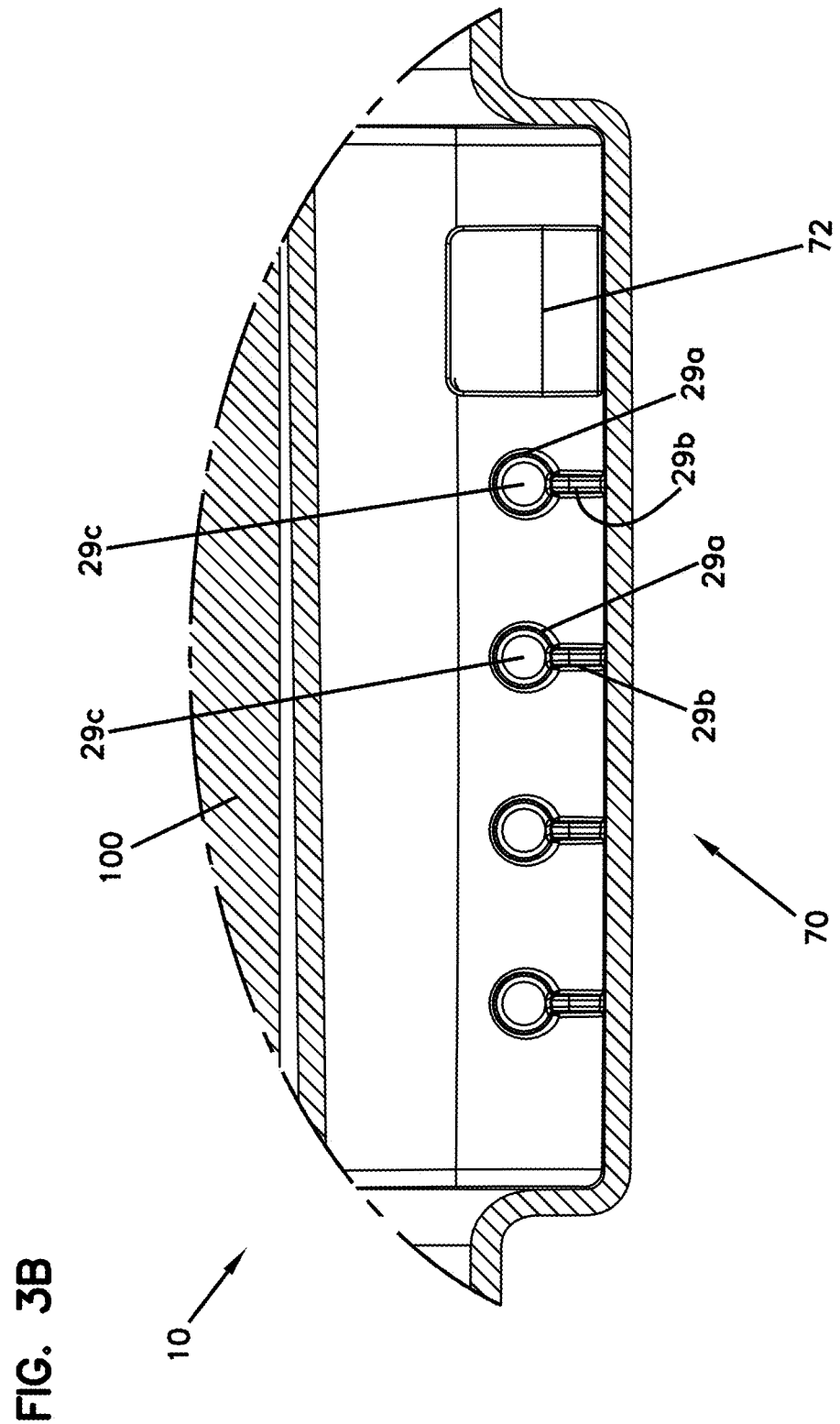
FIG. 3B is an enlarged view of a portion of the air cleaner shown in FIG. 3A.
Figure 4:
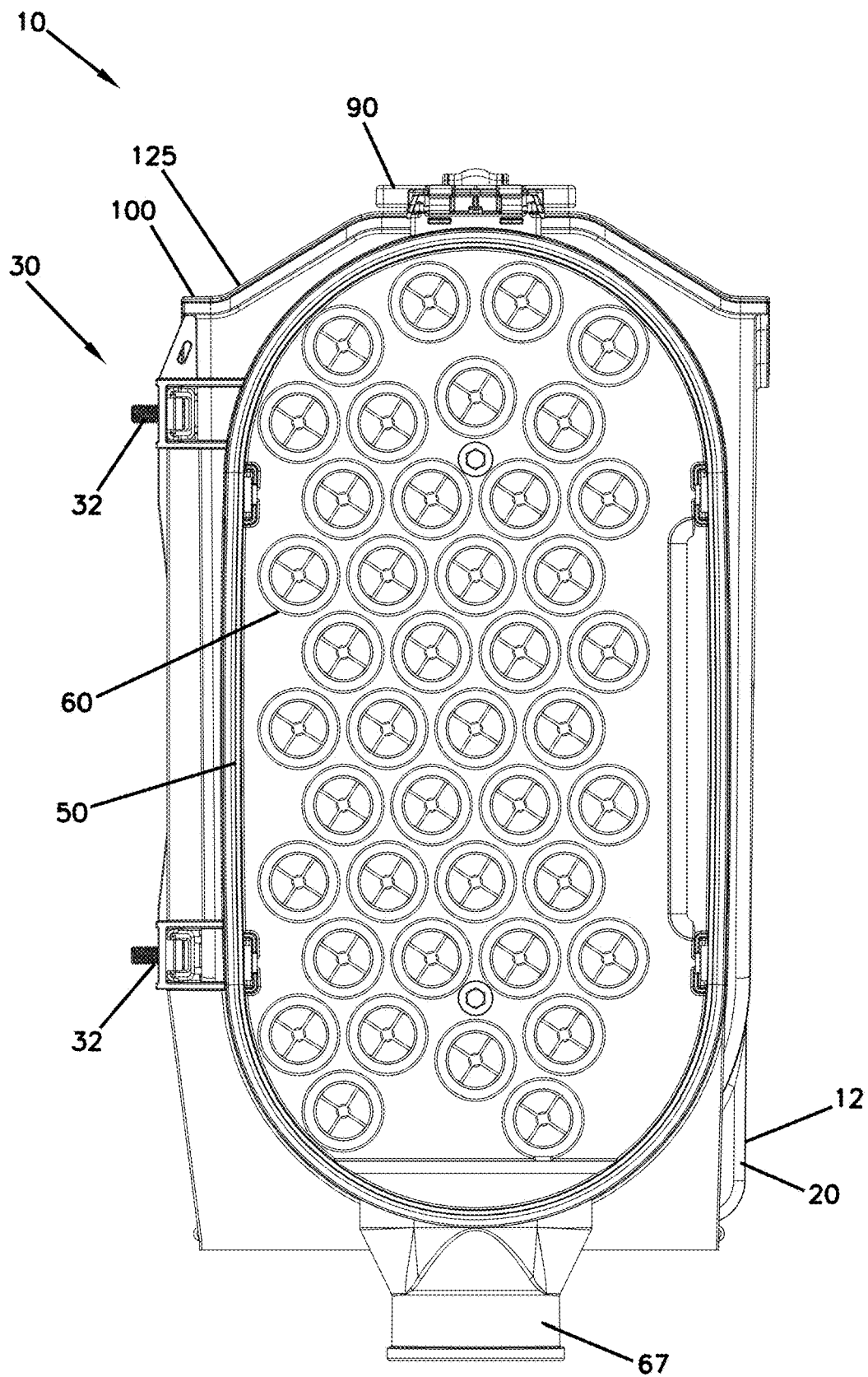
FIG. 4 is an inlet end view of the air cleaner shown in FIG. 1.
Figure 5:
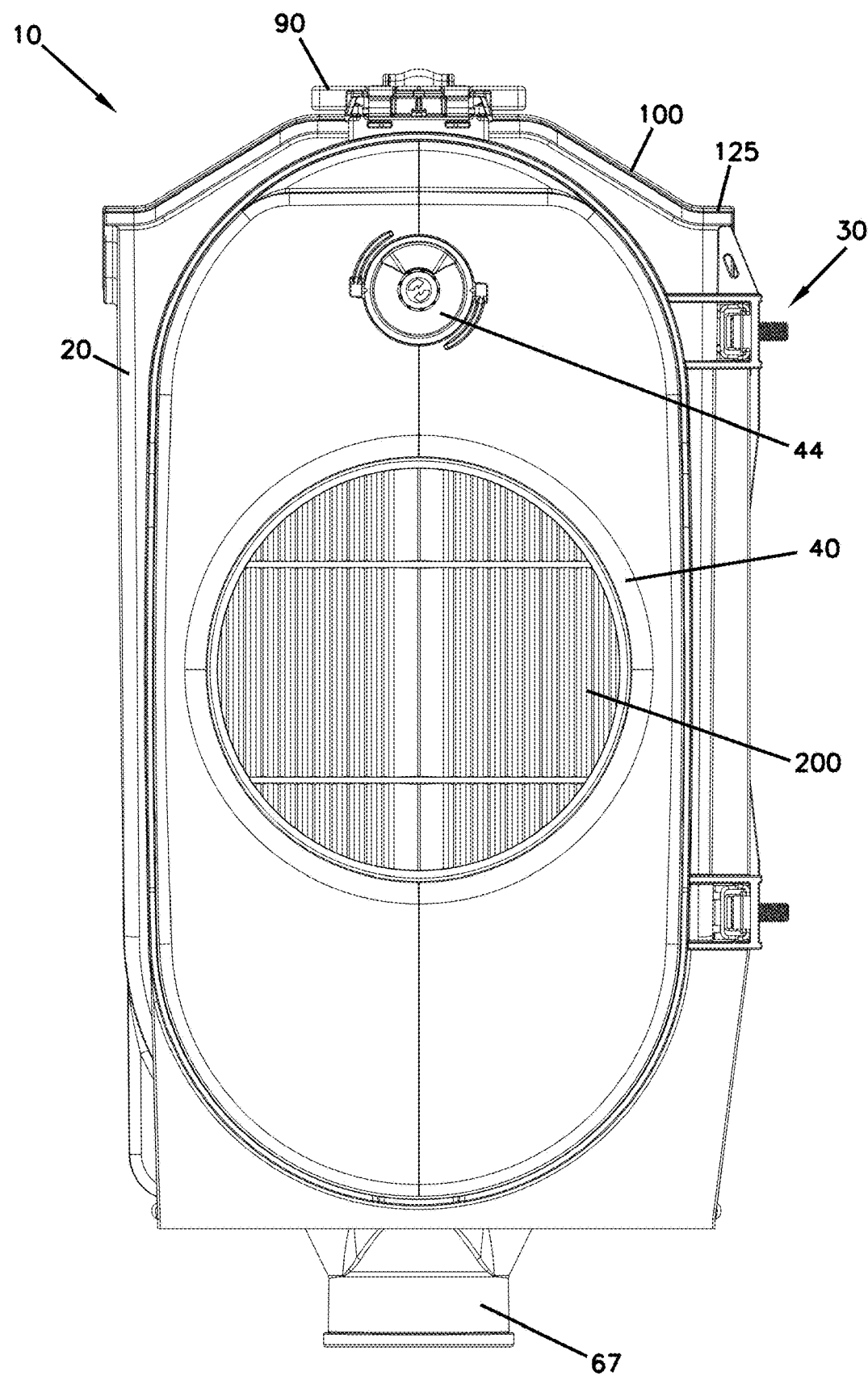
FIG. 5 is an outlet end view of the air cleaner shown in FIG. 1.

Referring to FIGS. 1 to 3, it can be seen that the connectors 90, hereafter referred to as lock mechanisms 90, are provided at each end of the filter cartridge 100. As described previously, the filter cartridge 100 includes features 150 including arcuate ribs 152 and tab structures 154 that are integrally formed with the access cover 125 of the shell 120. Each of the tabs 154 is received in a corresponding recess 92a of an operator part 92 of the lock mechanism 90. The filter cartridge 100 cannot be fully inserted into the housing 20 unless the lock mechanisms 90 are rotated into a fully unlocked position such that the recesses 92a align with the tabs 154.

Referring to FIGS. 39-45, the operator part 92 is shown in further detail. As shown, the operator part 92 includes the aforementioned recess 92a, a pair of handle portions 92b for enabling a user to grasp and rotate the operator part 92, a cover portion 92c, a stem portion 92d extending from the cover portion 92c, a retaining groove 92e defined within the stem portion 92d, an arc-shaped rib portion 92f defining a groove or channel 92g between the rib portion 92f and a sidewall portion 92h of the cover portion 92c, a pair of recessed areas 92i at the location where the rib portion 92f meets the sidewall portion 92h, and a central indexing member 92j extending between the rib portion 92f and the sidewall portion 92h. The sidewall portion 92h is also shown as including lead in or ramped portions 92h at the ends of the of the sidewall portion 92h to better allow the cover portion 92c to be rotated over the filter cartridge access cover 125.

Referring to FIGS. 46-52, a base part 94 of the lock mechanism 90 is shown in further detail. As shown, the base part 94 includes a main body 94a within which a central aperture 94b is defined, a lock spring retaining feature 94c including a pair of apertures 94f a pair of apertures 94g and a central tab 94h, a pair of arc-shaped rib portions 94d, and a pair of attachment features 94e for securing the lock mechanism 90 to the housing 20. In one aspect, the attachment features 94e include a pair of L-shaped channels 94e that receive the correspondingly shaped L-shaped rib members 24d, 26d on the housing body 20.

Referring to FIGS. 53 to 55, a lock spring 96 of the lock mechanism 90 is shown in further detail. As shown, the lock spring 96 extends from a base portion 96a to ramped portions 96b which in turn extends to tab portions 96c. The lock spring 96 further includes a latch portion 96d projecting from the tab portion 96c. The latch portion 96d includes a latch face 96e for engaging against an edge 92m of the cover portion 92. The lock spring 96 is also shown as being formed with tabs 96e and 96f for securing the lock spring 96 to the lock spring retaining feature 94c of the base part 94. In the example shown, the lock spring 96 is cut from a steel sheet (e.g. spring steel) and bent to shape.

Referring to FIGS. 56-59, a retaining ring 98 of the lock mechanism 90 is shown in further detail. The retaining ring 98 includes a main body 98a within which a central aperture 98b is defined. In the example shown, the retaining ring 92 is formed from a metal material, such as spring steel.

Figure 36:
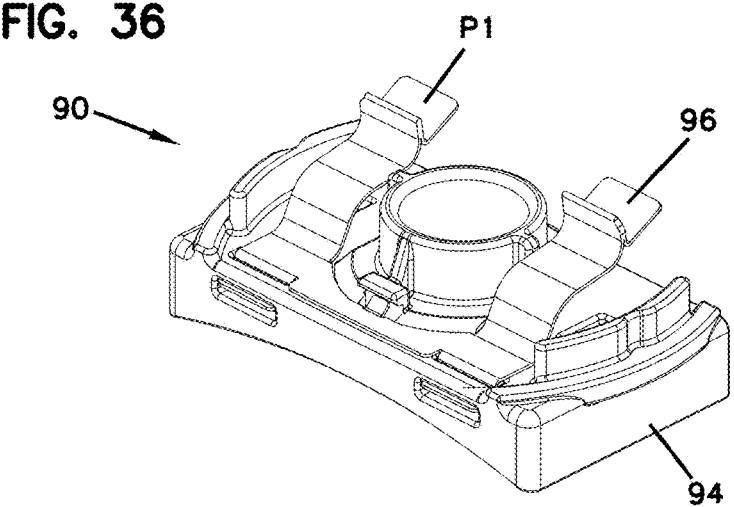
FIG. 36 is a top perspective view of the lock mechanism shown in FIG. 32 with the cover portion removed.
Figure 37:
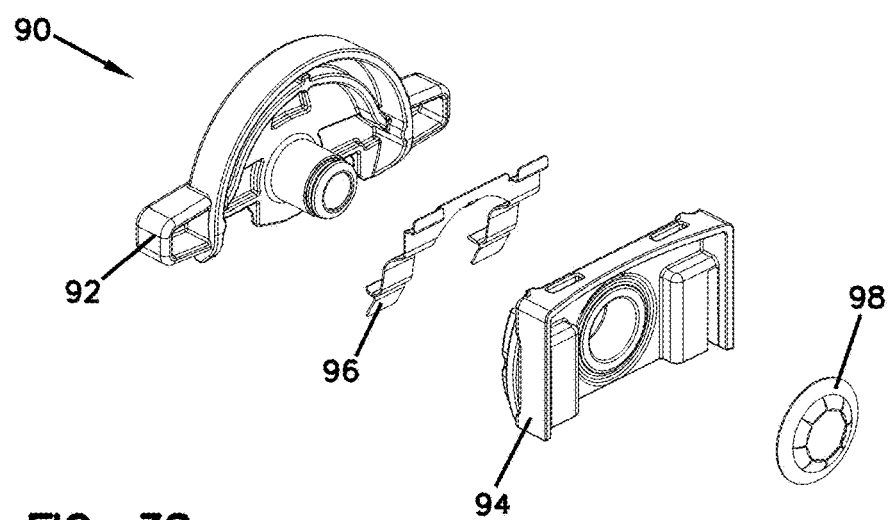
FIG. 37 is a bottom exploded perspective view of the lock mechanism shown in FIG. 32.
Figure 38:
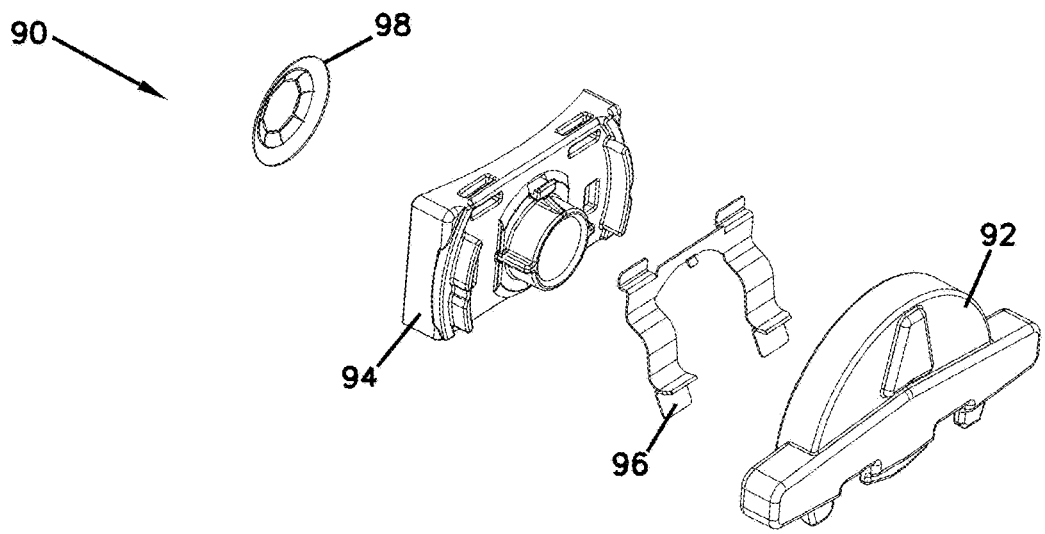
FIG. 38 is a top exploded perspective view of the lock mechanism shown in FIG. 32.
Figure 44:
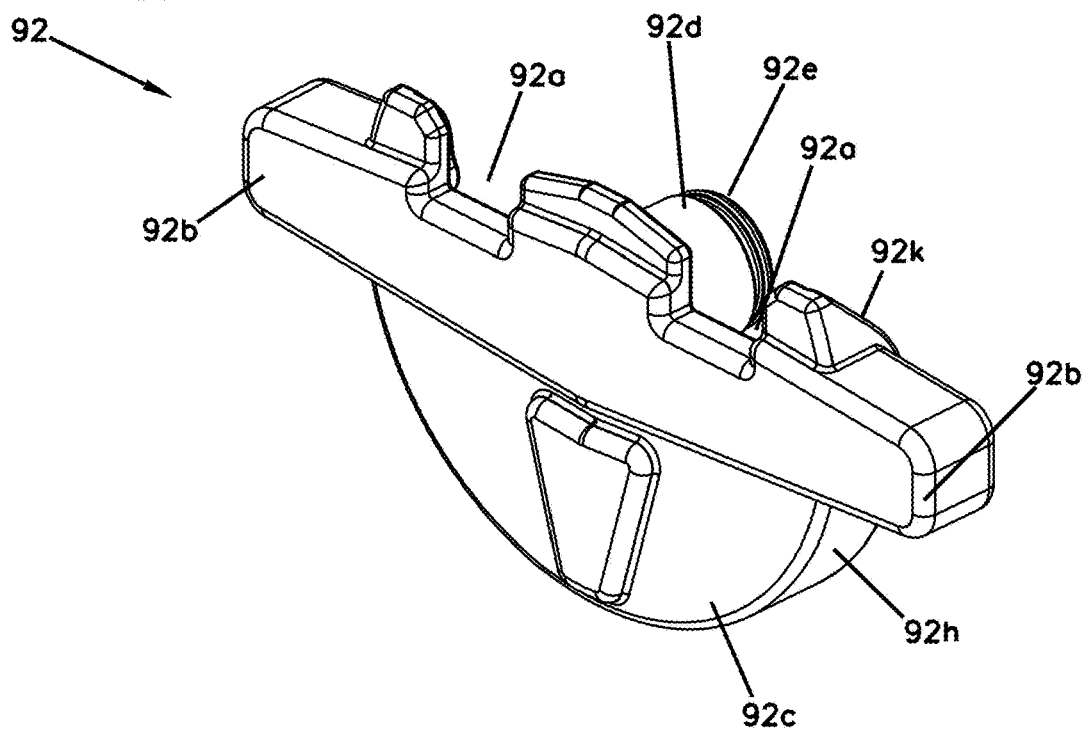
FIG. 44 is a top perspective view of the operator part shown in FIG. 39.
Figure 45:
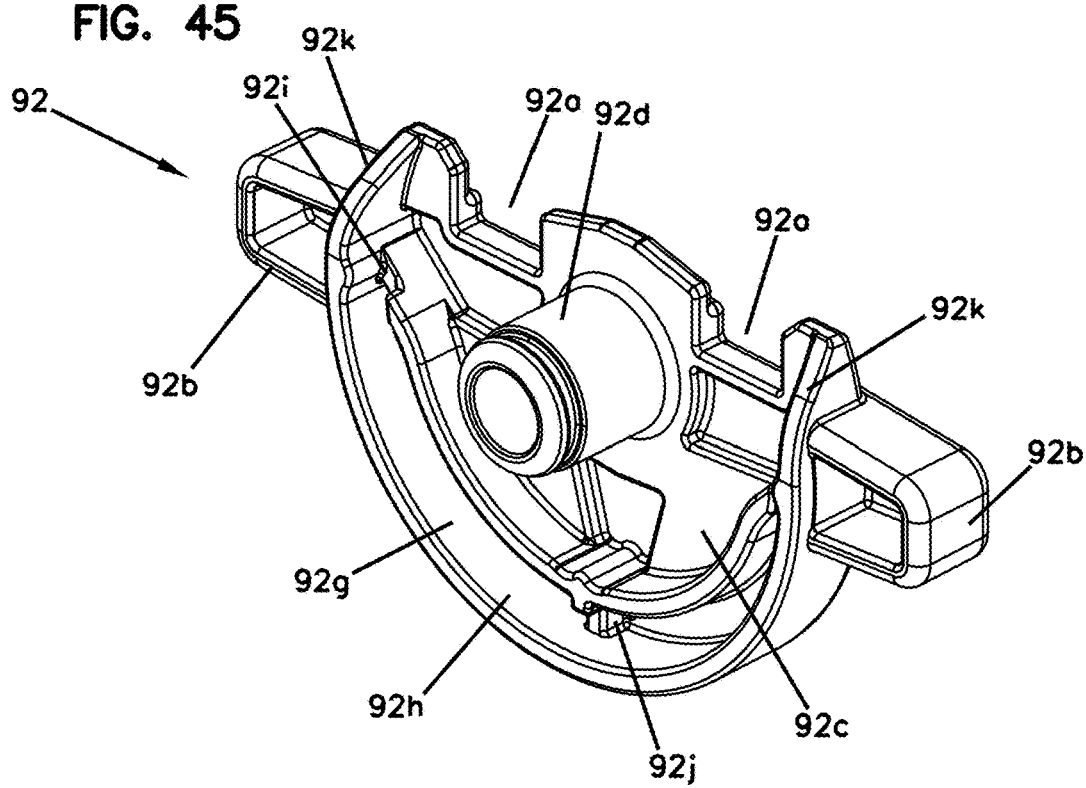
FIG. 45 is a bottom perspective view of the operator part shown in FIG. 39.
Figure 51:
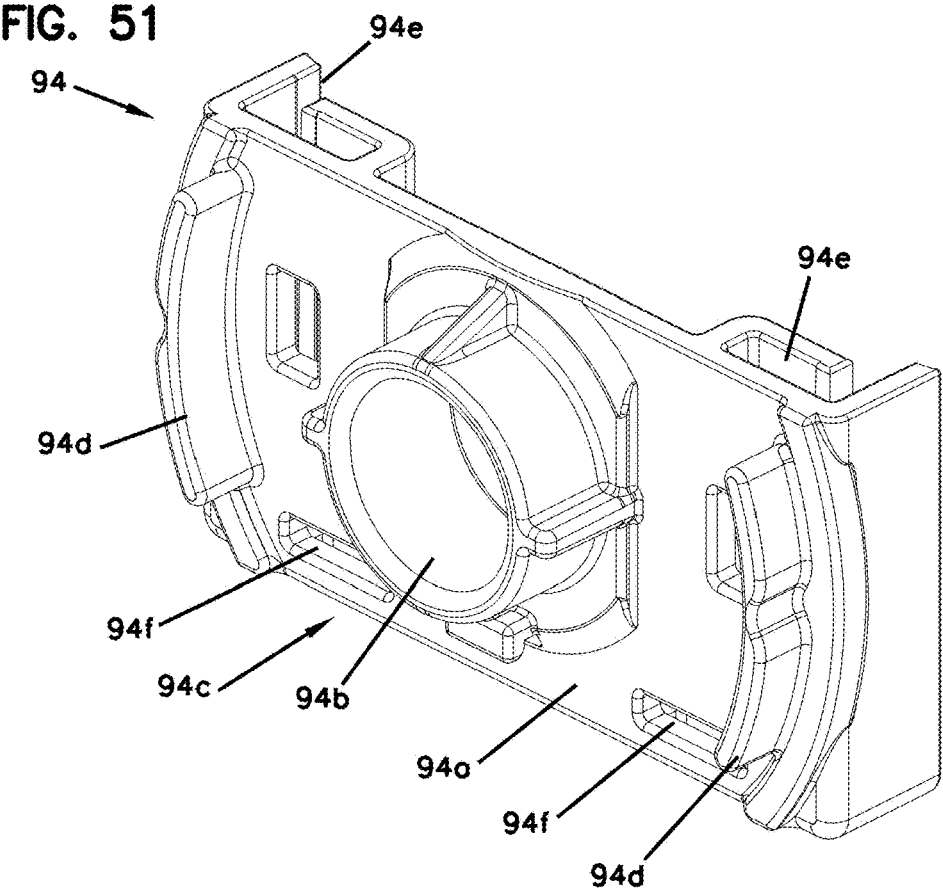
FIG. 51 is a top perspective view of the base part shown in FIG. 46.
Figure 52:
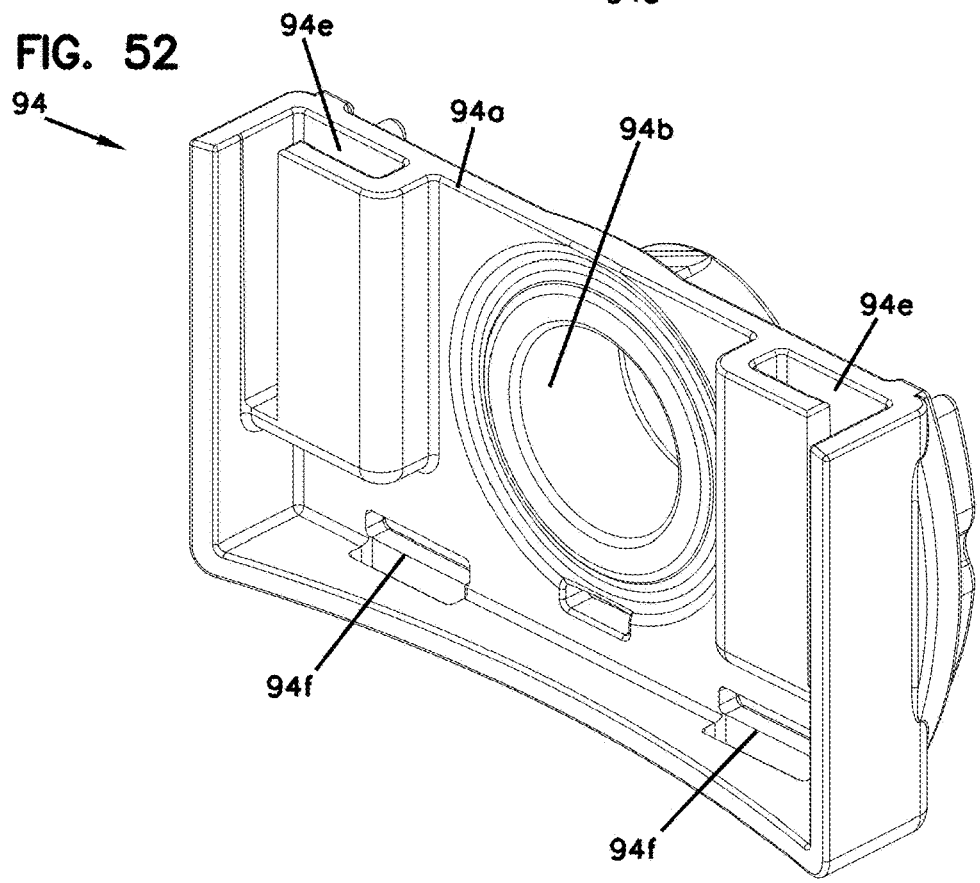
FIG. 52 is a bottom perspective view of the base part shown in FIG. 46.
Figure 56:
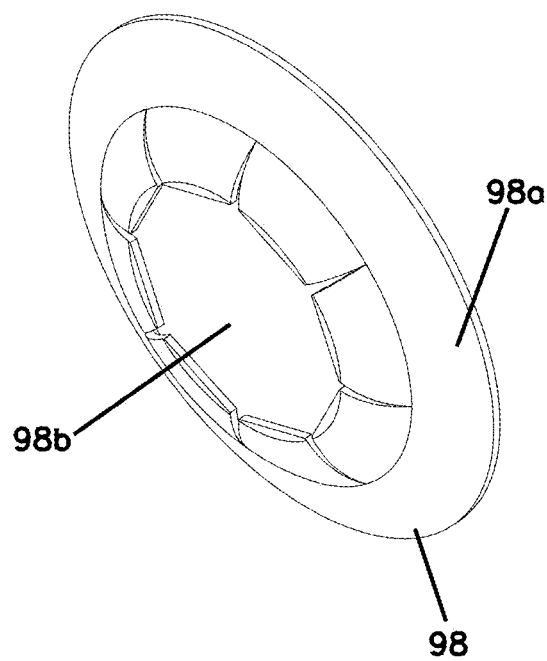
FIG. 56 is a top perspective view of a retaining ring of the lock mechanism shown in FIG. 32.
Figure 57:
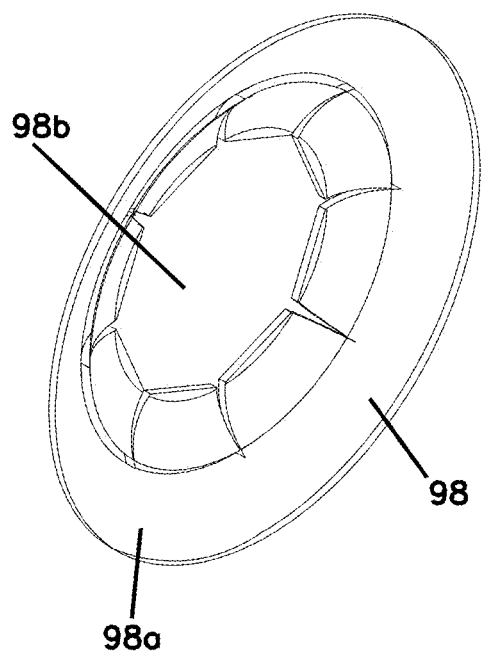
FIG. 57 is a bottom perspective view of the retaining ring shown in FIG. 56.
Figure 58:
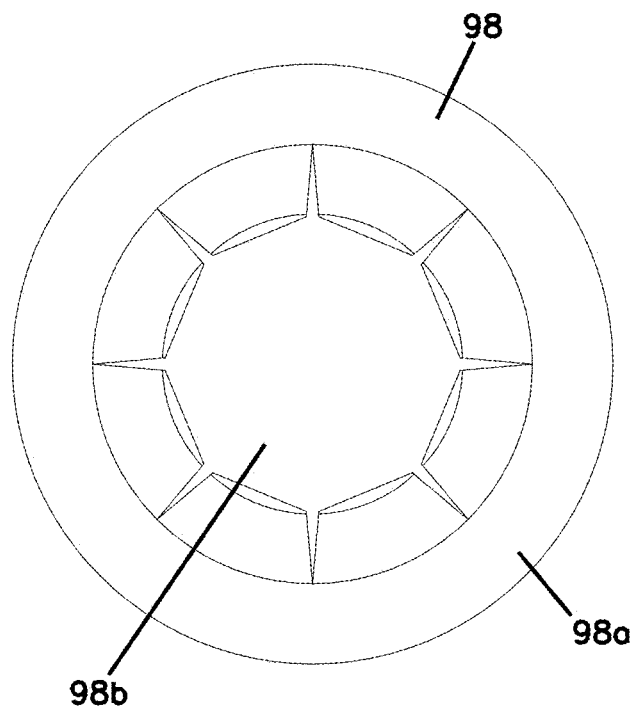
FIG. 58 is a top view of the retaining ring shown in FIG. 56.
Figure 59:
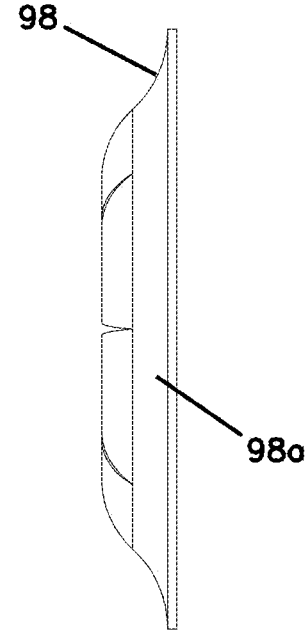
FIG. 59 is a side view of the retaining ring shown in FIG. 56.
Figure 60:
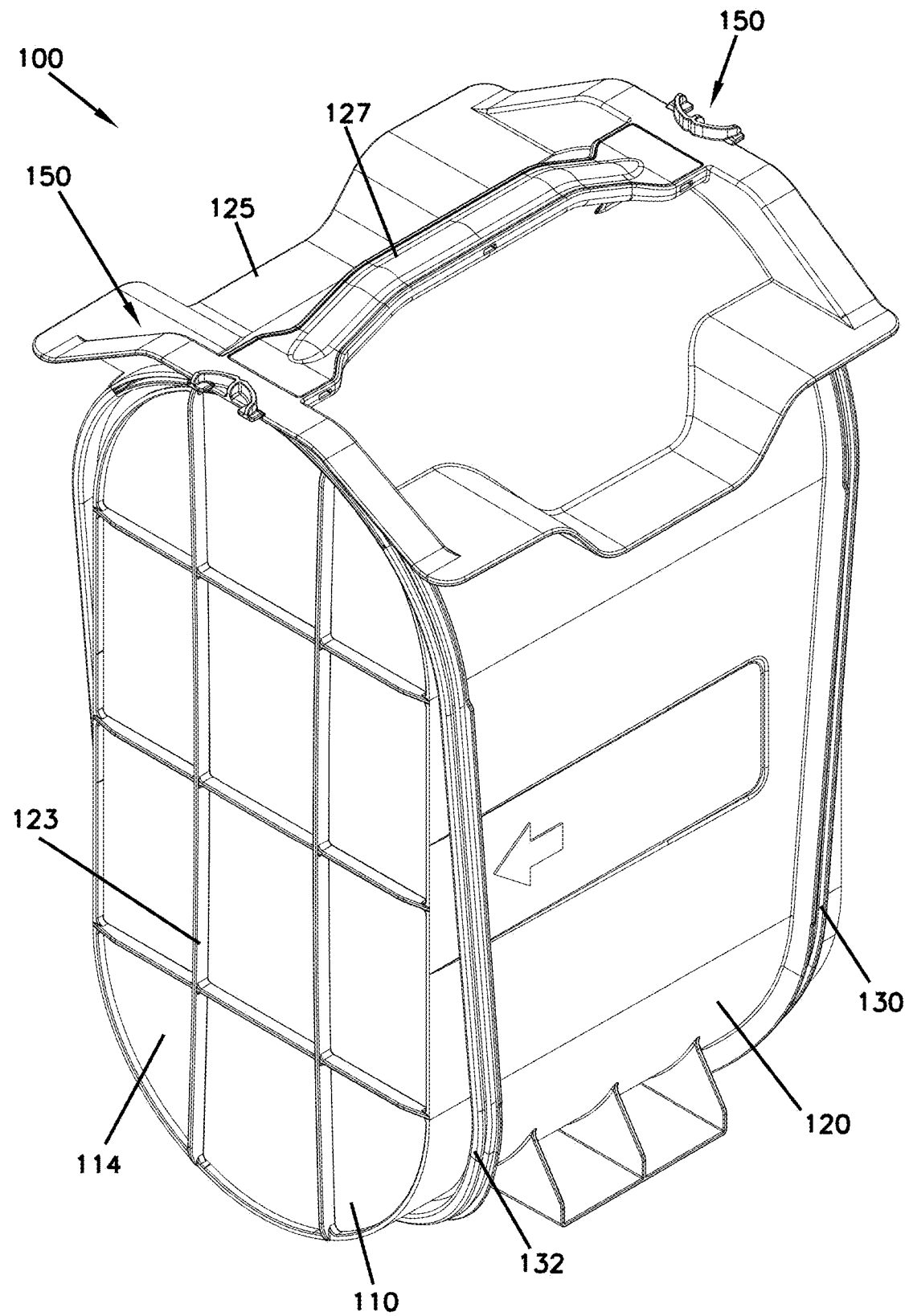
FIG. 60 is a perspective view of a primary filter cartridge of the air cleaner shown in FIG. 1.
Figure 78:
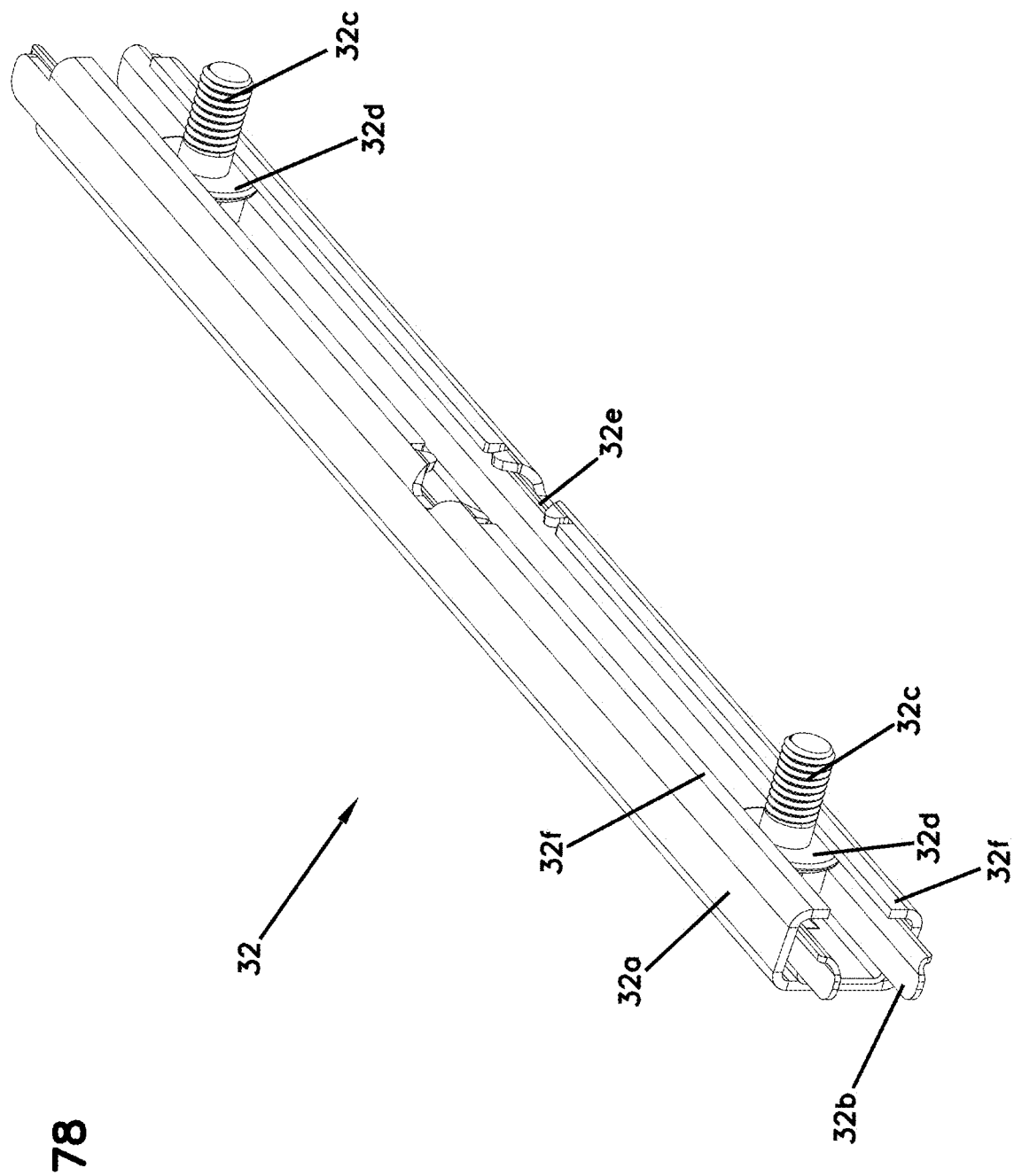
FIG. 78 is a perspective view of a mounting structure of the air cleaner shown in FIG. 1.
Figure 79:
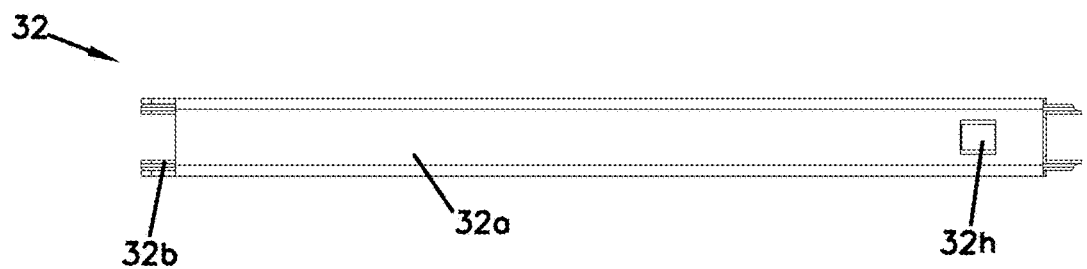
FIG. 79 is a top view of the mounting structure shown in FIG. 78.
Figure 80:
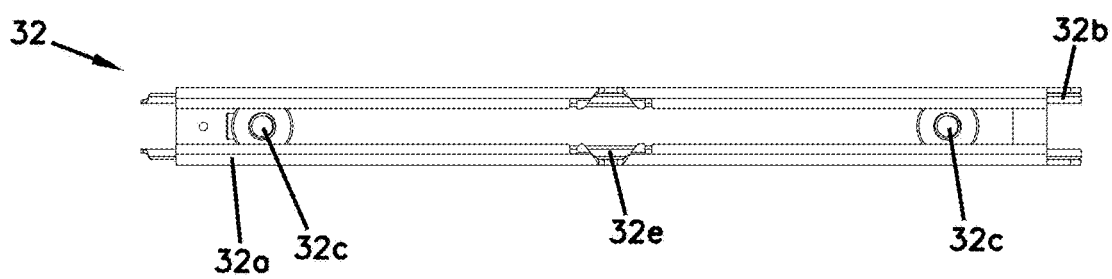
FIG. 80 is a bottom view of the mounting structure shown in FIG. 78.
Figure 81:
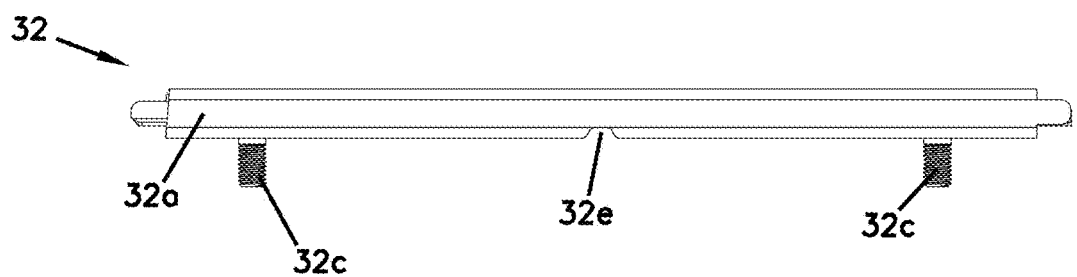
FIG. 81 is a side view of the mounting structure shown in FIG. 78.
Figure 82:
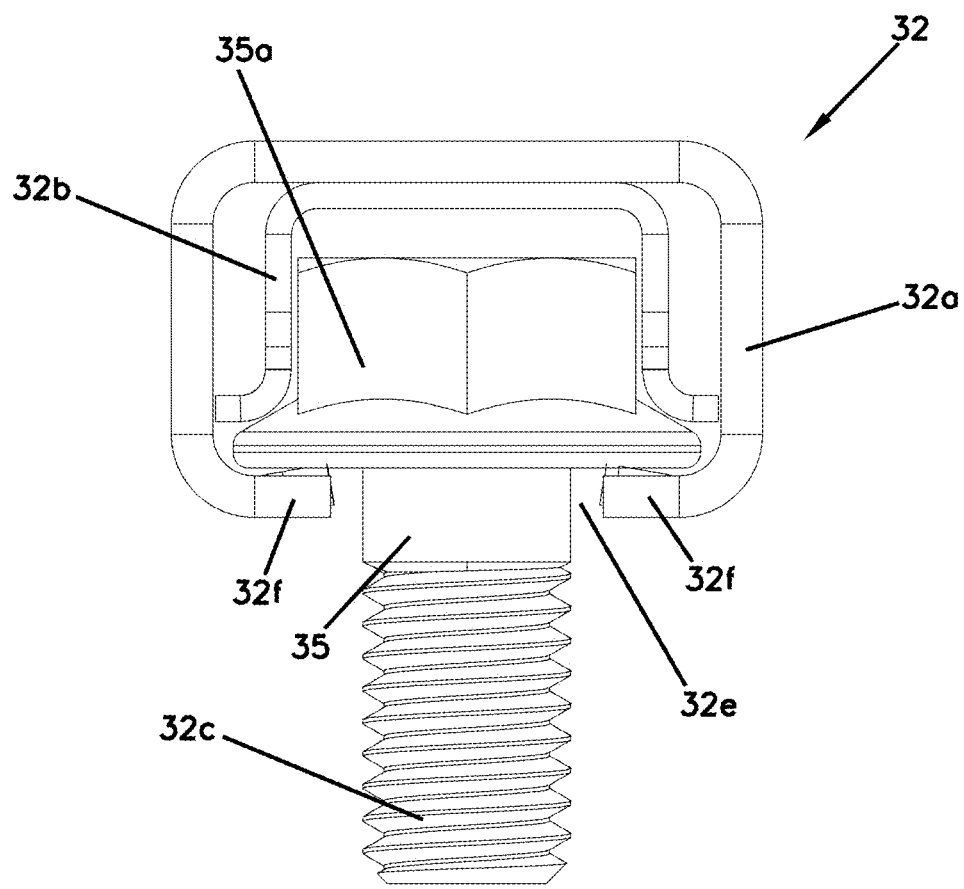
FIG. 82 is an end view of the mounting structure shown in FIG. 78.
Figure 83:
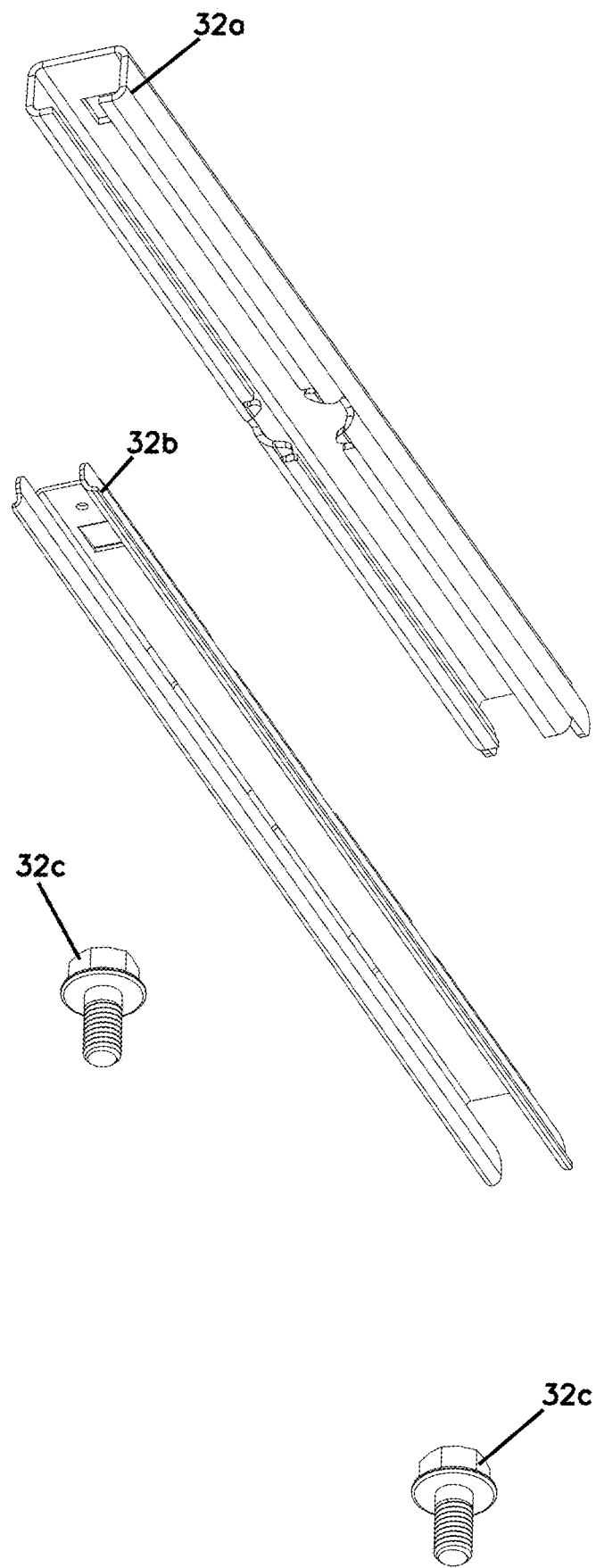
FIG. 83 is an exploded perspective view of the mounting structure shown in FIG. 78.
Figure 84:
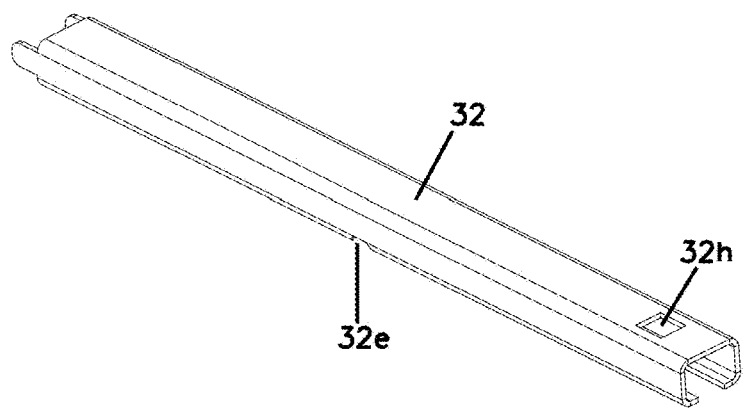
FIG. 84 is a perspective view of a first part of the mounting structure shown in FIG. 78.
Figure 85:
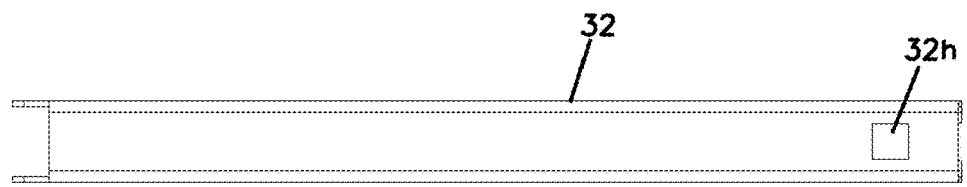
FIG. 85 is a top view of the mounting structure first part shown in FIG. 84.
Figure 86:
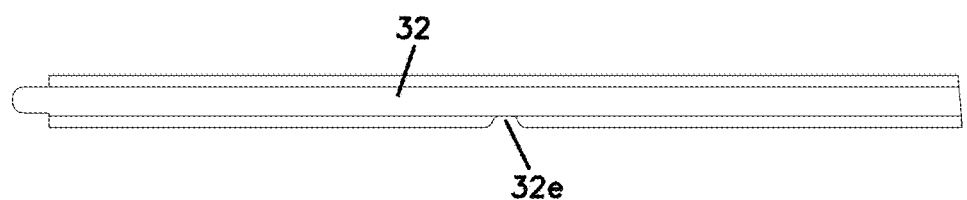
FIG. 86 is a side view of the mounting structure first part shown in FIG. 84.
Figure 87:
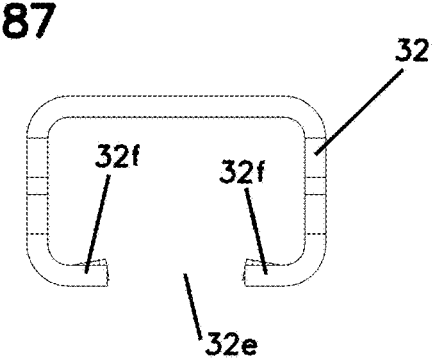
FIG. 87 is an end view of the mounting structure first part shown in FIG. 84.
Figure 88:
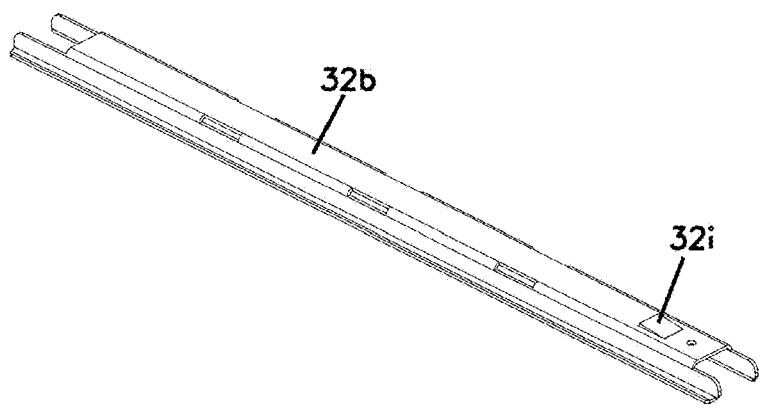
FIG. 88 is a perspective view of a second part of the mounting structure shown in FIG. 78.
Figure 89:
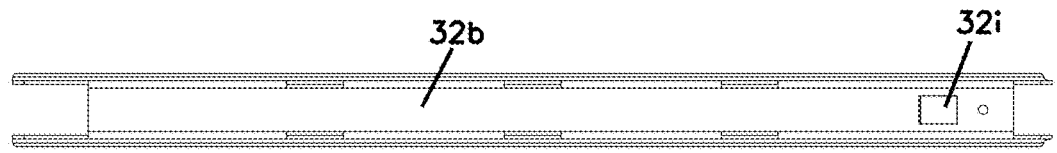
FIG. 89 is a top view of the mounting structure second part shown in FIG. 84.
Figure 90:
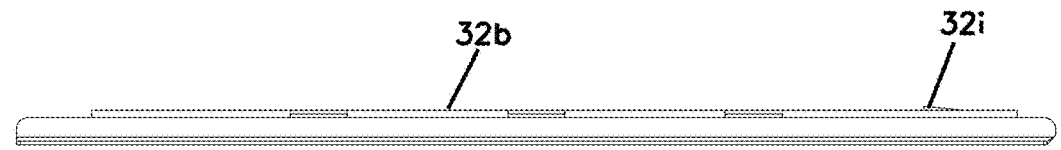
FIG. 90 is a side view of the mounting structure second part shown in FIG. 84.
Figure 91:
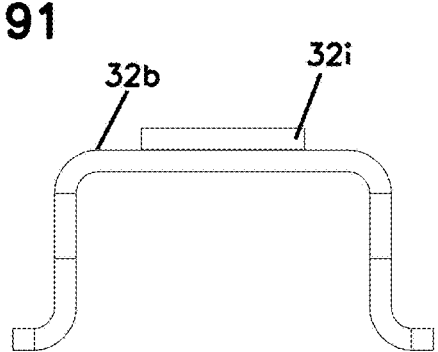
FIG. 91 is an end view of the mounting structure second part shown in FIG. 84.
Figure 99:
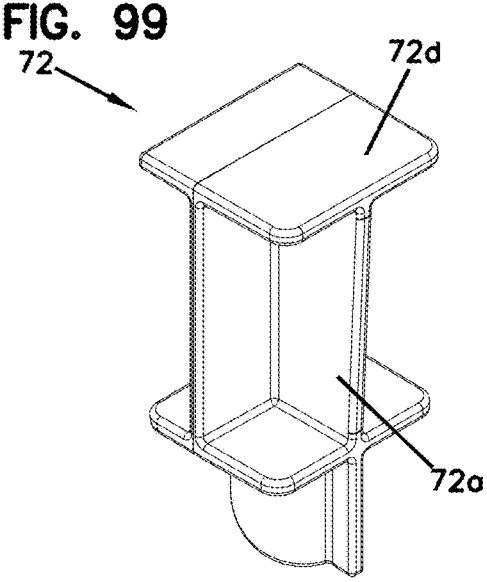
Figure 100:
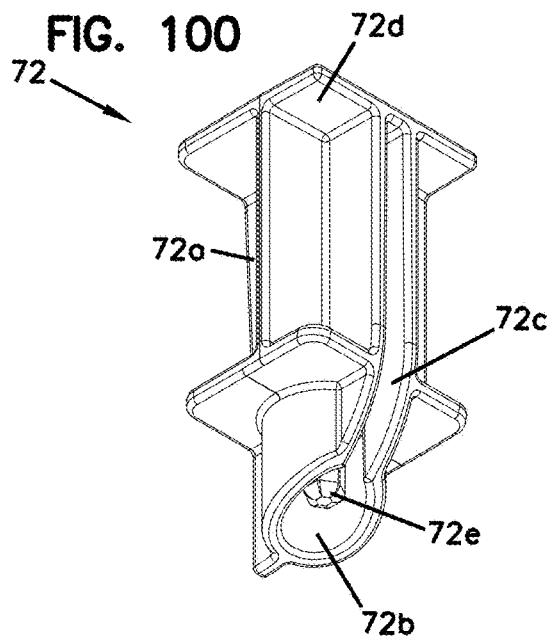
Figure 101:
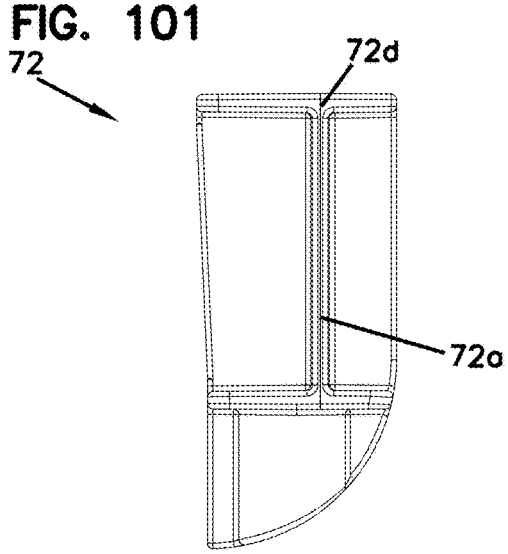
Figure 102:
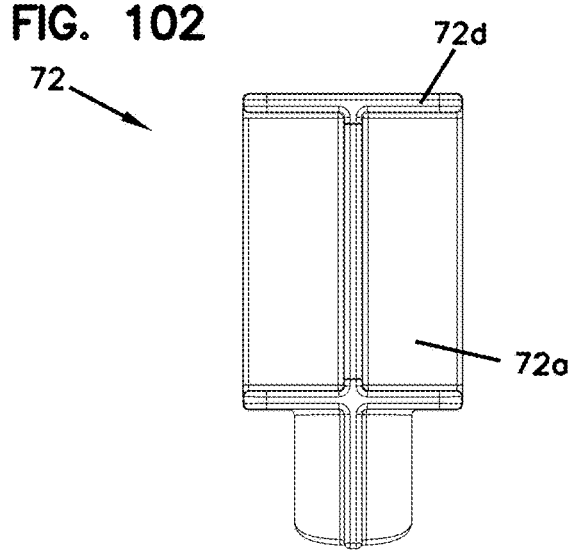
Figure 103:
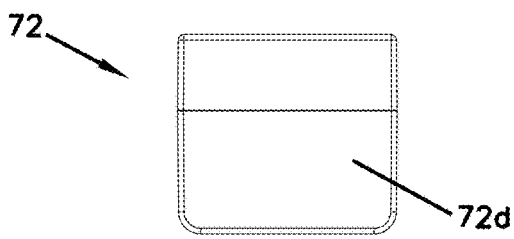
Figure 104:
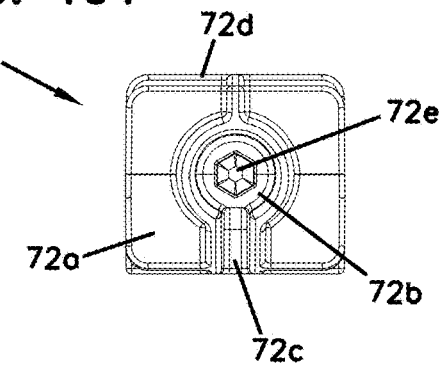

In one aspect, the lock spring base portion 94a is received within the lock spring retaining feature 94c such the tabs 96e extend through openings 94f and 94g and the tab 96f is retained by the central tab 94h of the base part 94 and such that the ramped portions 96b extend away from the base part main body 94a. FIG. 36 shows the lock spring 96 attached to the base portion 94 with the cover 92 removed to better show the connection between the lock spring 96 and the base portion 94. This configuration allows the lock spring tab portion 96c to be deflectable from a relaxed or resting position (i.e. the raised position in the drawings), as shown at position P1 in FIGS. 6E and 32-36, to a deflected position (i.e. the lowered position in the drawings) towards the main body 94a, as shown at position P2 in FIG. 78. The operator part 92 is mounted to the base part 94 by passing the stem portion 92d of the operator part 92 through the central aperture 94b of the base part 94 such that the operator part cover portion 92c covers the base part main body 94a. In this position, the ribbed portion 94d of the base part 94 rests in a groove formed between the operator part ribbed and outer wall 92h. The two parts are secured together by installing the retaining ring 98 onto the retaining groove 92e.

Once the operator and base parts 92, 94 are secured together, the operator part 92 is rotatable with respect to the base part 94 from an unlocked position to a locked position. In the unlocked position, the operator part 92 is aligned such that the tab portion 96c extends into the recess 92a in the cover portion 92c of the operator part 92 and such that the latch face 96f of the locking spring 96 rests against the side edge 92m of the operator part 92. Due to the interaction between the latch face 96f and the operator part side edge 92m, the operator part 92 is unable to be rotated out of the unlocked position with the locking spring 96 in the resting position. In the event that that the operator part 92 is rotated past this position without a filter cartridge 100 installed, the operator part 92 can be easily rotated back to the unlocked position as the ramped face 96e will allow the locking spring latch portion 96d to easily deflect and slide past the side edge 92f on the operator part 92.

When the filter cartridge 100 is installed into the housing 20, the tabs 154 on the access cover 125 contact and deflect the locking spring 96 of each of the lock mechanisms 90 in a direction towards the base part 94. This interaction is shown in the schematic presented at FIG. 6E as position P2. Once the filter cartridge 100 is fully installed, each latch portion 96d is displaced beyond the side edge 92f thereby allowing the operator part 92 to be rotated towards the locked position in either a clockwise or counterclockwise direction. As the operator part 92 is rotated towards the locked position, the ribbed portion 92f on the operator part 92 slides along the ribbed structure 152 of the filter cartridge 100. Thus, the ribbed structure 152, which can be characterized as a connection member, works in conjunction with the operator part 92 to secure the media pack within the air cleaner housing. As the filter cartridge 100 is a true side-loaded filter cartridge which does not need to be axially displaced after insertion into the housing 20 to effectuate a seal, the filter cartridge 100 is configured such that at least a portion of the ribbed structure 152 extends axially beyond the inlet/outlet flow end of the media pack 110. In the particular example shown, the entirety of the ribbed structure 152 is axially beyond the inlet/outlet flow end of the media pack 110.

In the example shown, the locking mechanisms 90 do not directly effectuate a seal at seal members 130, 132 in the direction of the longitudinal axis X. Instead, the seal is formed by an interference fit between the individual seals members 130, 132 and the individual sealing surfaces 46d, 56d. The lock mechanisms 90 can be configured to exert a compressive force onto the filter cartridge 100 and thus the seal members 130, 132 in the insertion direction. The locking mechanisms 90 do operate to lock the filter cartridge 100 in place in self centering fashion wherein stress is transferred between the lock mechanisms 90 and cover 125 but without imparting a force onto the seal members 130, 132. Thus, even in a configuration where only one of the seal members 130, 132 is provided, the lock mechanisms 90 will still function to axially align and fix the filter cartridge 100 to effectuate a single seal without the need for the presence of the second seal or any other component on the cartridge or housing to effectuate the seal.

Additionally, the retaining ring 92 is configured such to exert a spring force onto the operator part 92. The operator part 92 is rotated into the locking position until the rib 92j of the operator part engages with a stop member or detent 152i on the arcuate shaped rib structure 152 on the filter cartridge 100 to aid in retaining the operator part 92 in the locked position and to provide an installer with tactile feedback of the locked position. During initial rotation of the operator part 92, the rib 92j rides on to of or against the rib structure 152 on the filter cartridge 100 which provides slight resistance to rotation. Once the rib 92i reaches the stop member 152i, the rib 92i snaps into the recess defined by the stop member 152i, thus simultaneously indexing the operator part 92 into the locked position and providing tactile feedback. To remove the filter cartridge 100 from the housing, the operator simply rotates each operator part 92 until the recesses 92a align with the tabs 154.

As can be appreciated by the above description, the complementary configuration of the locking mechanisms 90 and filter cartridge tabs 154 ensures that the correct filter cartridge is installed into a housing that is actually designed to receive the filter cartridge. If an attempt is made to install a filter cartridge that does not include the tabs 154, the filter cartridge 100 will fail to enable the lock mechanisms to move to the locked position, thus alerting the installer that an incorrect filter cartridge is installed. Although the tabs and recesses are shown as having a particular shape, other shapes are possible. Different shapes may be used for different air cleaner sizes or designs, thus ensuring the correct filter cartridges are installed appropriate housings throughout an entire product line.

Mounting Arrangement 30

Referring to FIGS. 78-93, details of the mounting arrangement 30 are shown in greater detail. The mounting arrangement 30 is shown as being installed on the main housing body 20 at FIGS. 1 and 3-8. As shown, the mounting arrangement 30 is shown as including a pair of mounting structures 32 that are mounted to the housing body 20 in a spaced apart and parallel arrangement. The mounting arrangement 30 is also shown as including four mounting clips 34. Either of the mounting clips 34 or the mounting structures 32 can be independently used to mount the air cleaner 10 to a supporting structure with the mounting clips 34 providing a fixed-distance mounting arrangement and the mounting structures providing an adjustable mounting system. Where both mounting structures 32 and mounting clips 34 are provided, an installer or designer can utilize whichever mounting approach best suits a particular application. As the mounting structures 32 and mounting clips 34 can be independently used to mount the air cleaner 10 to a supporting structure, an air cleaner 10 can be provided with only the mounting structures 32 or only the mounting clips 34.

Figure 9:
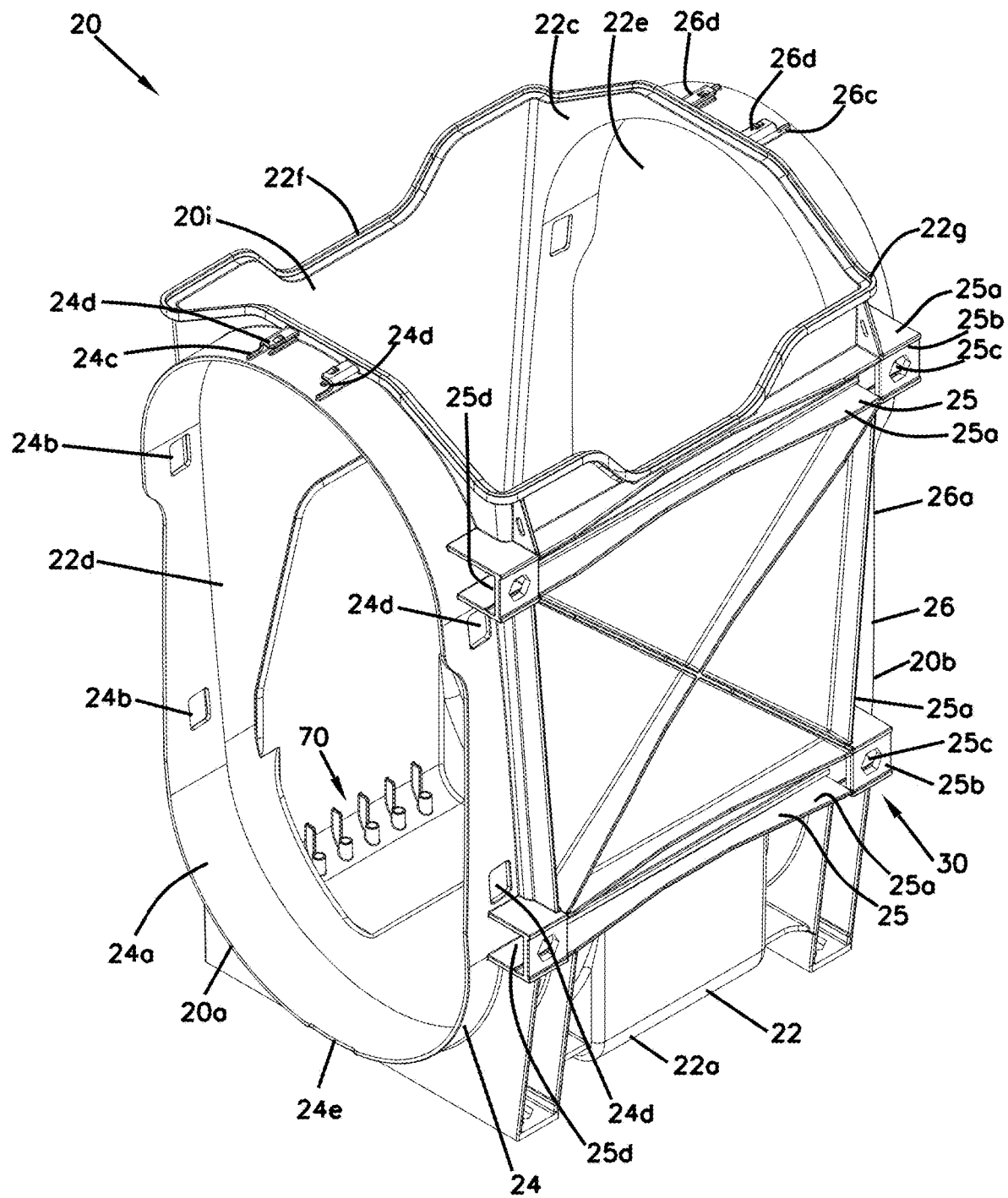
FIG. 9 is a first perspective view of the housing of the air cleaner shown in FIG. 1.
Figure 10:
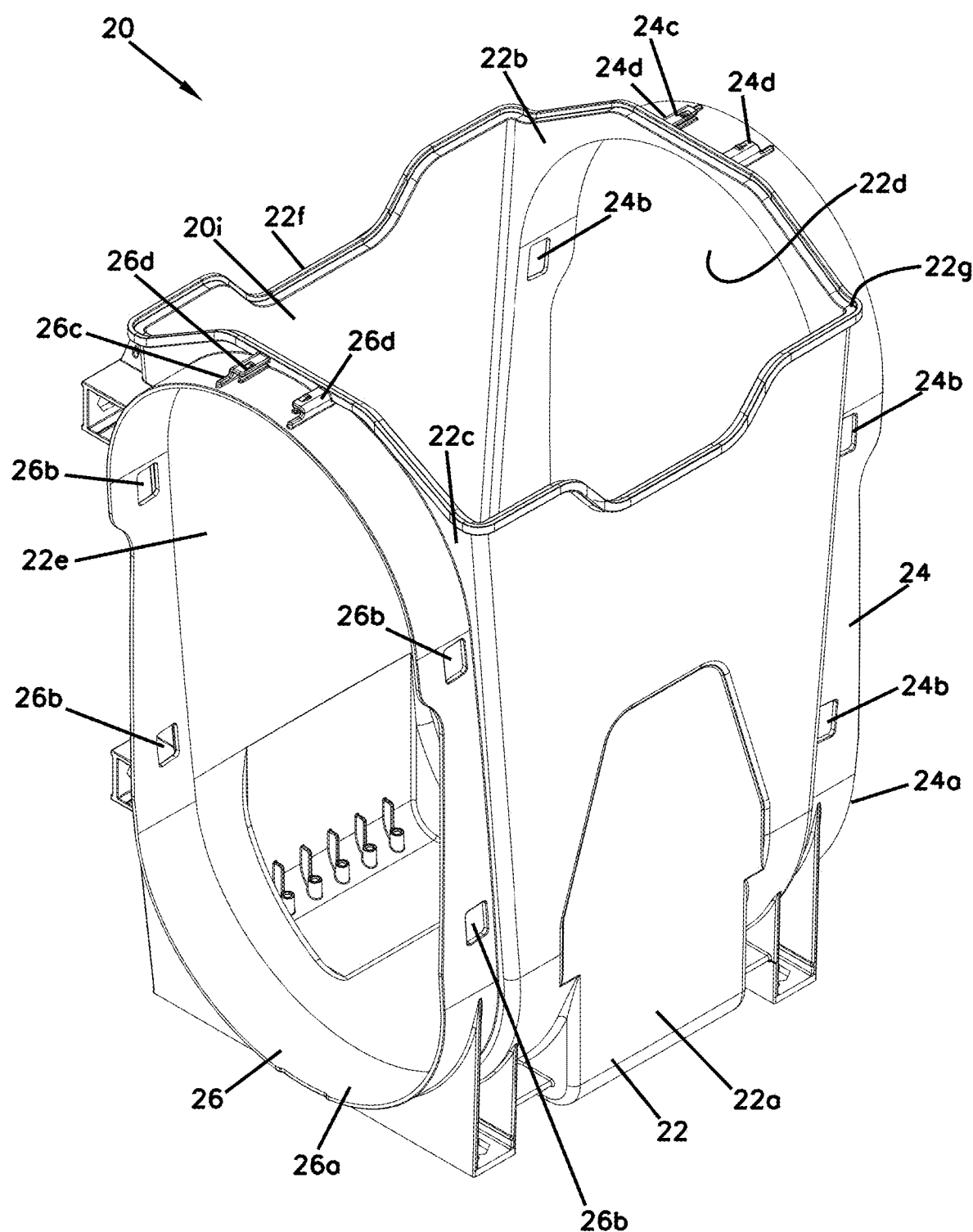
FIG. 10 is a second perspective view of the housing shown in FIG. 10.
Figure 11A:
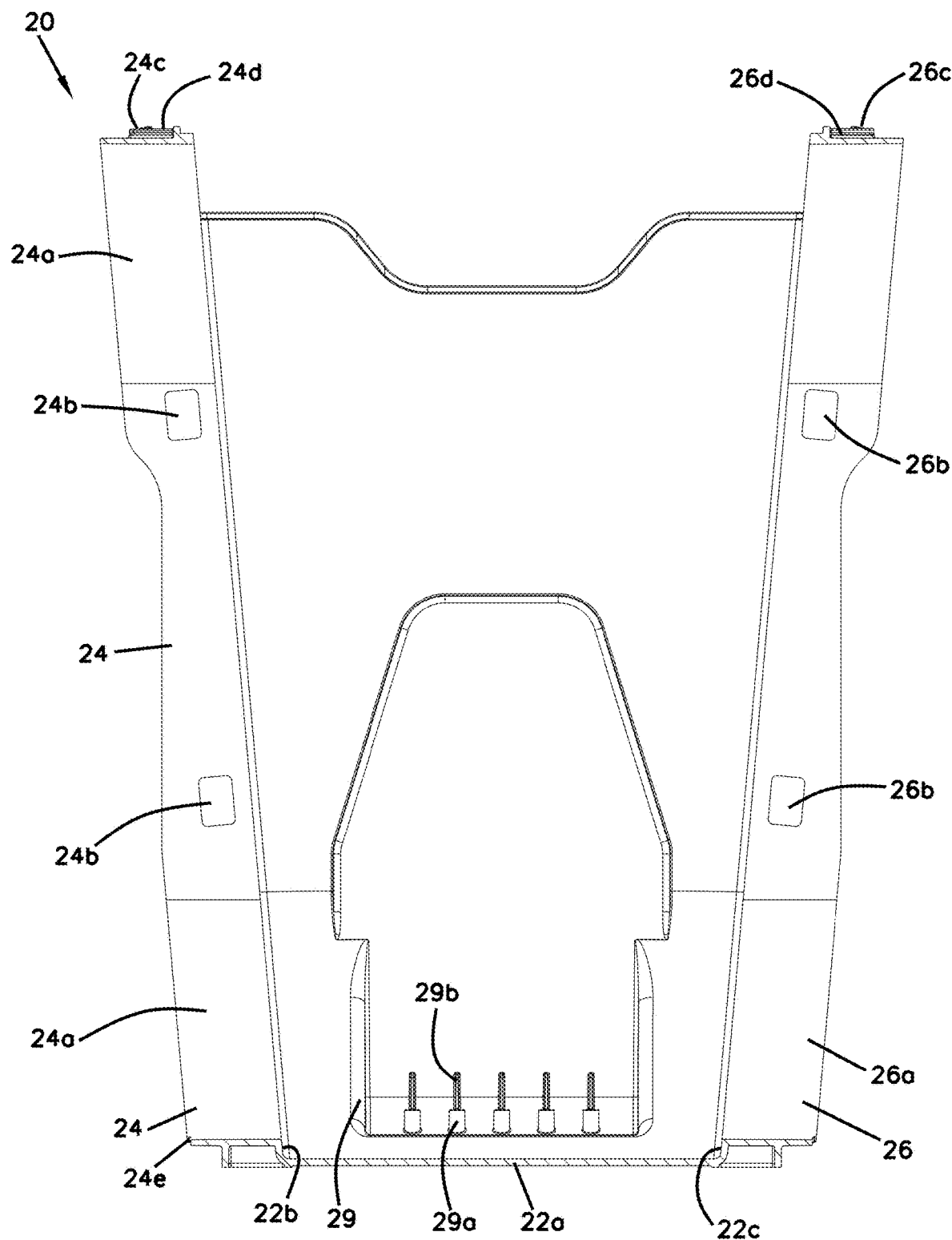
FIG. 11A is a cross-sectional view of the housing shown in FIG. 9, taken along the line 11A-11A in FIG. 11.
Figure 12:
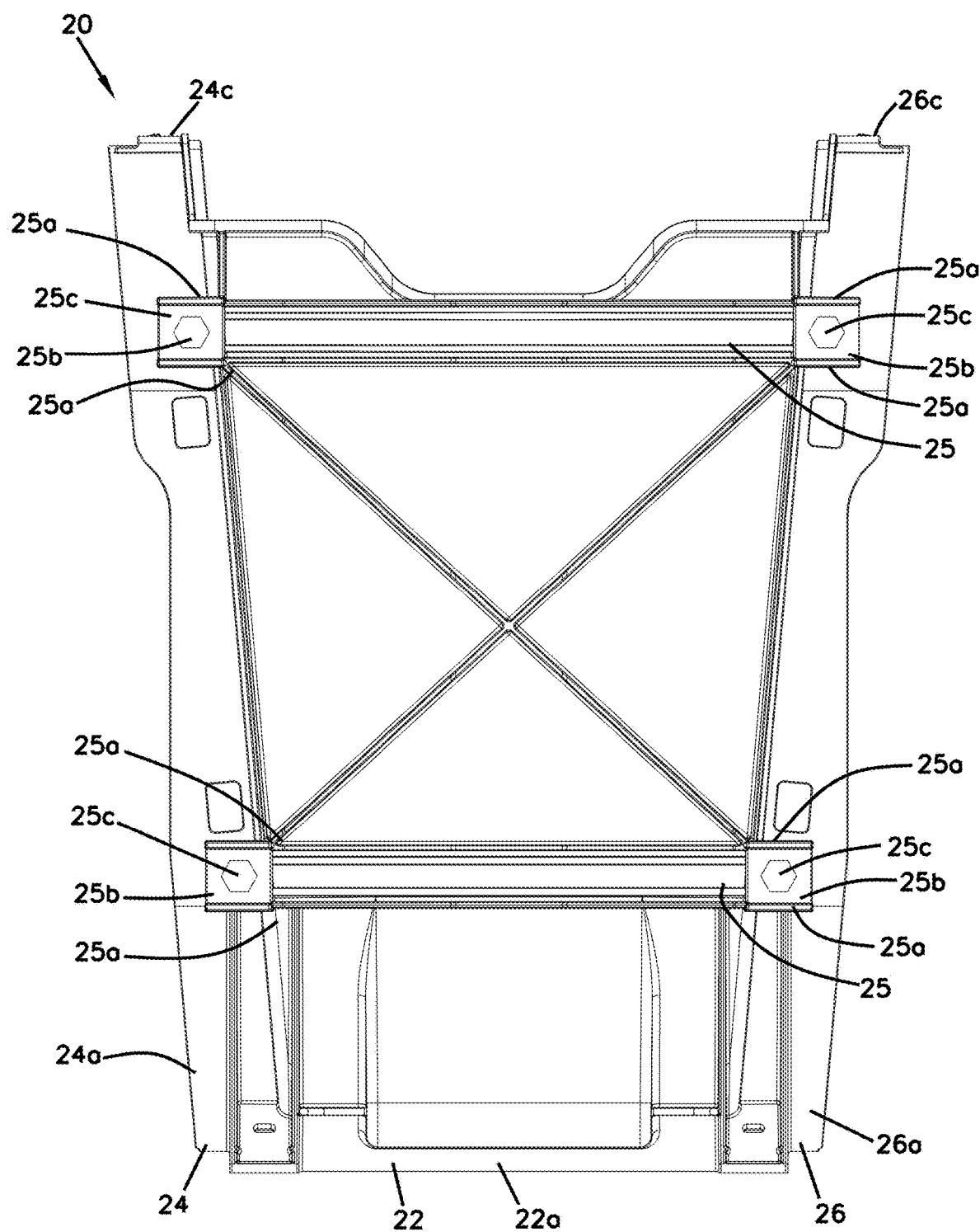
FIG. 12 is a first side view of the housing shown in FIG. 10.
Figure 13:
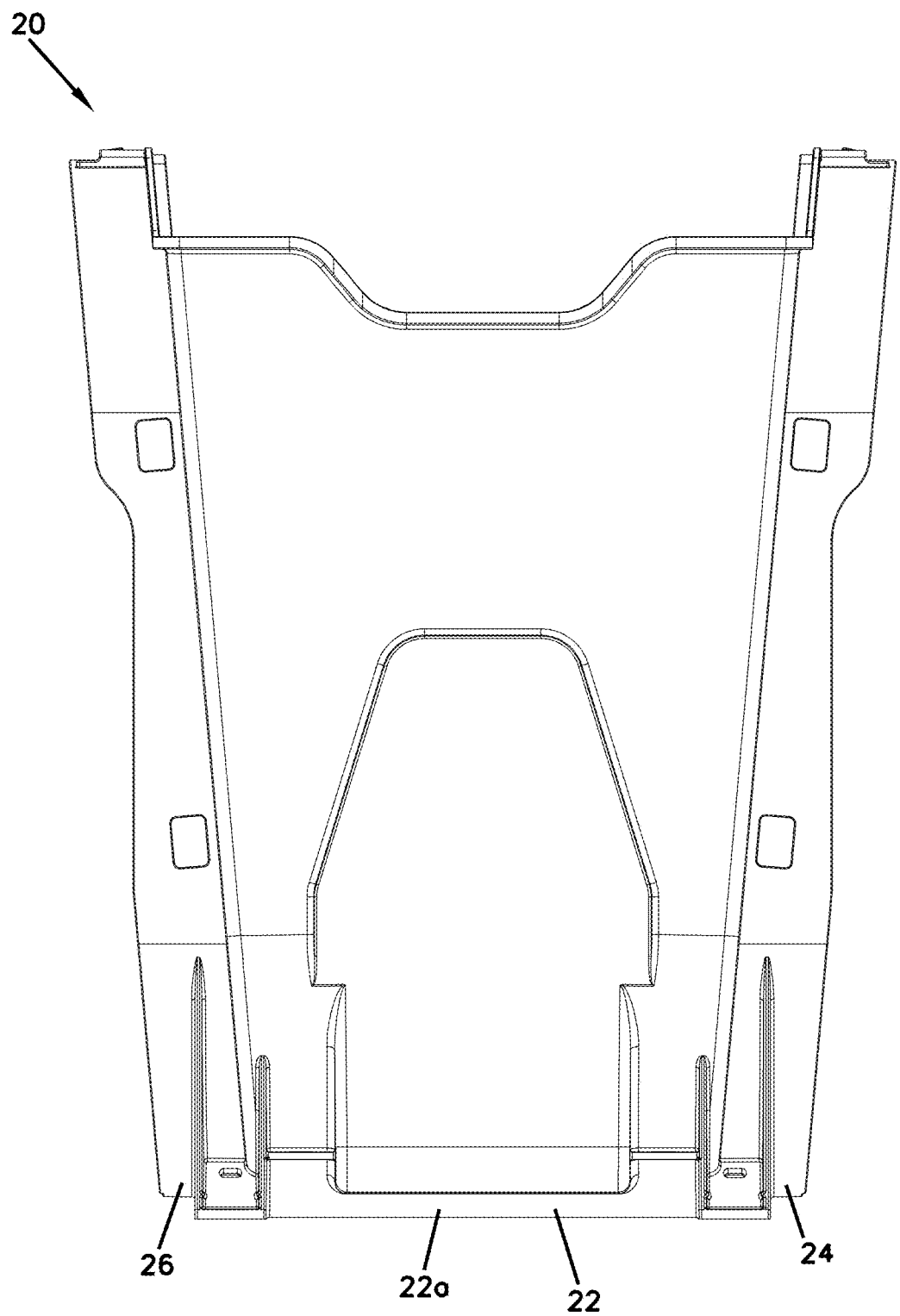
FIG. 13 is a second side view of the housing shown in FIG. 12.
Figure 14:
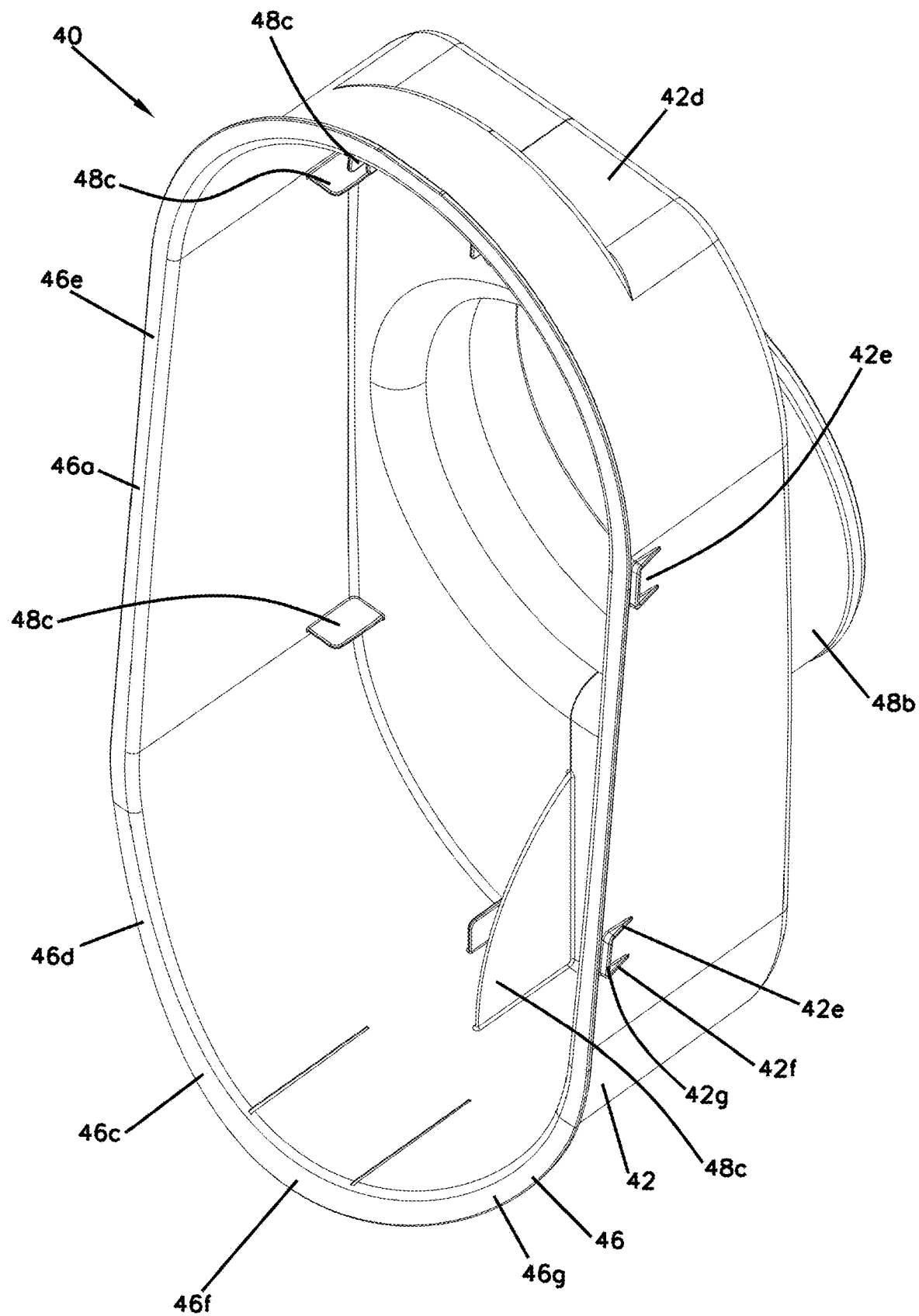
FIG. 14 is a first perspective view of the outlet assembly of the air cleaner shown in FIG. 1.
Figure 15:
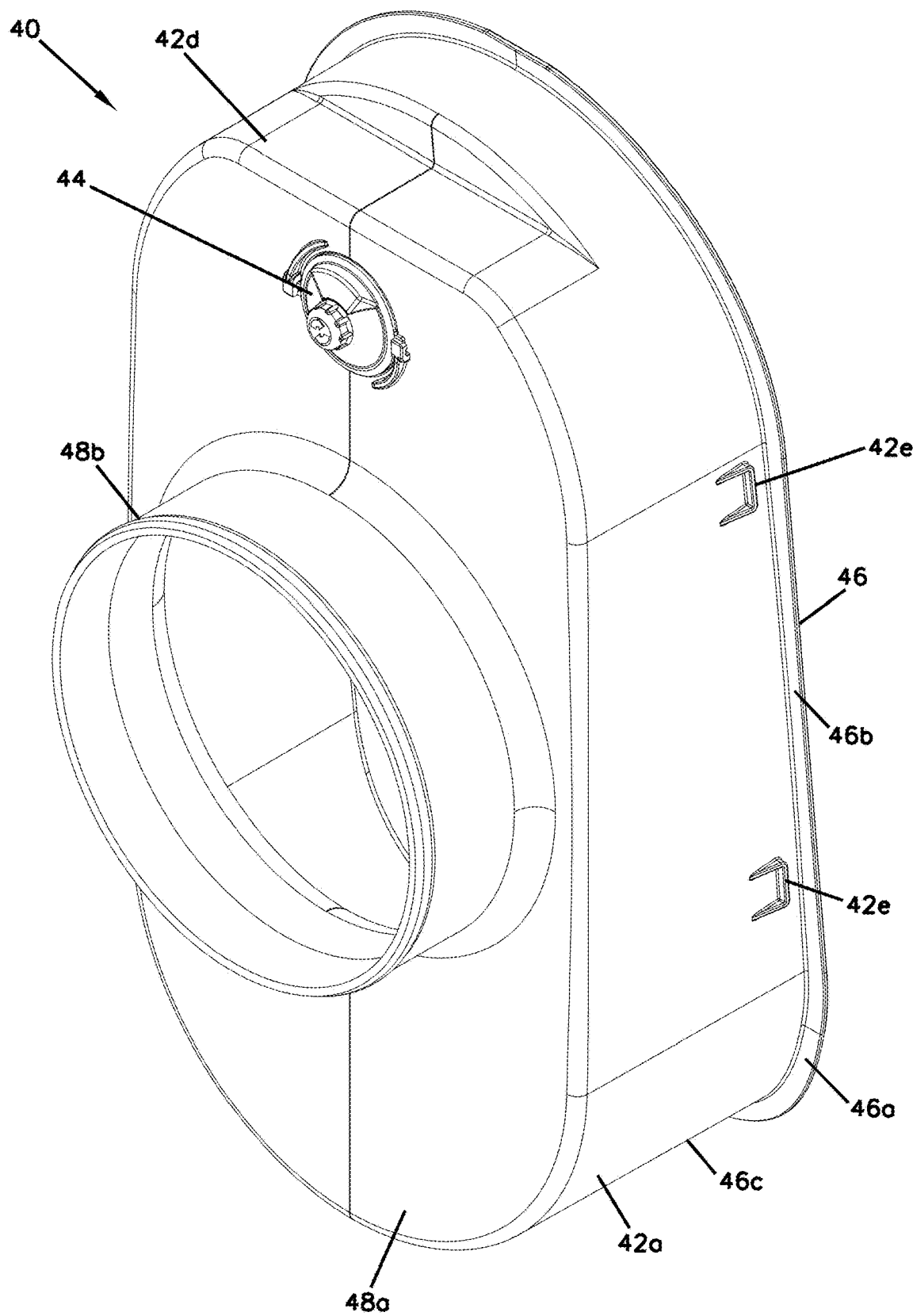
FIG. 15 is a second perspective view of the outlet assembly shown in FIG. 14.
Figure 16:
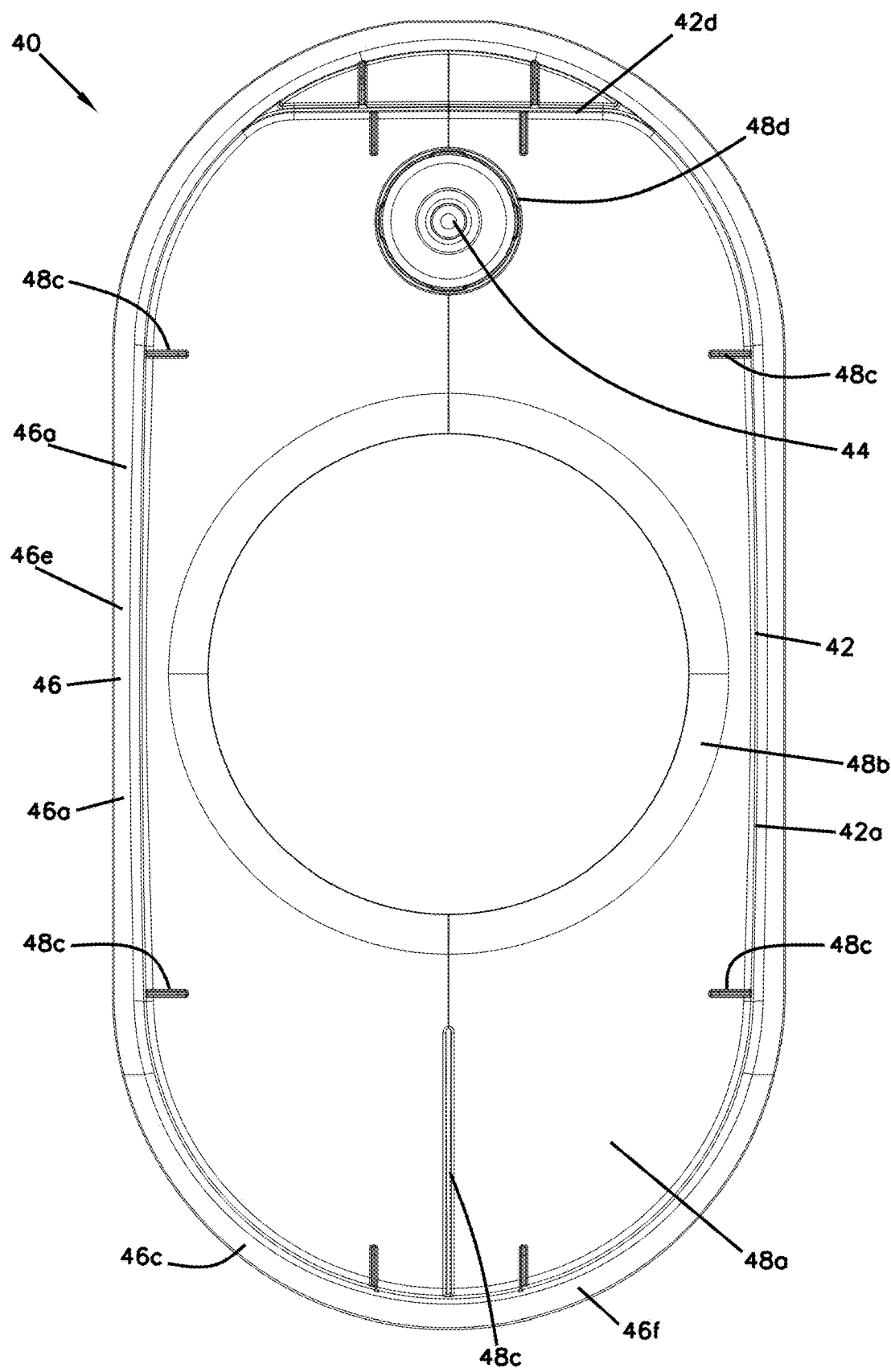
FIG. 16 is an end view of the outlet assembly shown in FIG. 14.
Figure 18A:
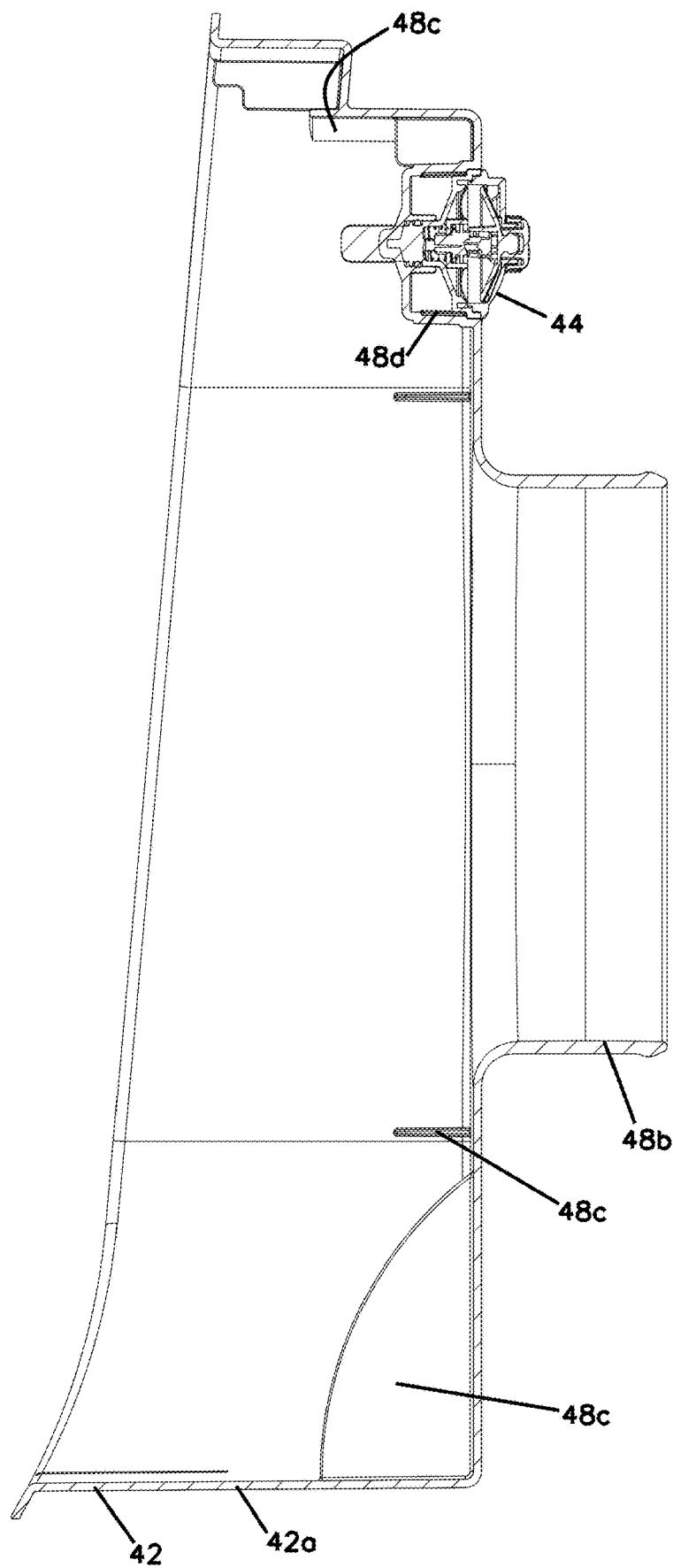
FIG. 18A is a cross-sectional view of the outlet assembly shown in FIG. 14, taken along the line 18A-18A in FIG. 18.

As can be seen at FIGS. 9 and 12, the housing body 20 defines a pair of channels 25 defined by sidewalls 25a which receive the mounting structures 32. The housing body 20 is also provided with end walls 25b extending across the sidewalls 25a at each end. The end walls 25b are shown as including apertures 25c such that the end walls can receive mounting clips 34. The mounting clips 34 form a portion of the mounting arrangement. The housing body 20 is also shown as including apertures 25d for receiving a portion of the mounting structures 32 such that the mounting structures 32 can be secured to the housing body 20.

With reference to FIGS. 78-91, features of the mounting structures 32 are shown in greater detail. In one aspect, each mounting structure 32 includes a first channel part 32a that receives a second channel part 32b. As can be most easily seen at FIG. 82, the second channel part 32b has a width or dimension that matches the head 32d of a bolt 32c that allows the bolt to slide along the length of the second channel part 32b but prevents the bolt from rotating. The first channel part 32a has a central opening 32e through which the head 32d can pass such that the head can be received by the second channel part 32b. The first channel part 32a additionally has lateral walls 32f that extend towards each other to secure the opposite side of the bolt head 32d. Thus, a bolt 32c can be received into the first channel part 32a and then into the second channel part 32b such that the bolt 32c is slidably secured between the second channel part 32b and the walls 32f. With such a configuration, the position of the bolts 32c can be easily adjusted to align with a given mounting structure. The bolts 32c are prevented from sliding off either end of the channel parts 32a, 32b by the end walls 25b on the housing body 20.

The second channel part 32b is shown as including an extension part 32g at one end that is received by the housing body slots 25d and an extension part 32h at the other end that can engage with or interact with the mounting clip 34. The mounting structure 32 can also be provided with a spacer, fill, or interference member 32k (e.g. collapsed polymeric tube or moon-shaped polymeric tube) that can be received by the first and second channel parts 32a, 32b that can aid in holding the bolts 32c in a fixed position and dampen potential vibration. In one aspect, the first channel part 32a can be provided with apertures 32f that receive tabs 32g of the second channel part 32b to aid in securing the first and second channel parts 32a, 32b together.

Referring to FIGS. 92-98, the retaining clip 34 is shown in greater detail. In one aspect, the retaining clip 34 includes a base portion 34a, a head portion 34b extending from the base portion 34a, and a clip portion 34c extending from the base portion 34a. The head portion 34b includes an aperture 34d, which can be a threaded opening for receiving a mounting bolt. The mounting clip 34 is installed onto the end wall 25b such that the head portion 34b extends through the aperture 25c and such that the end wall 25b is clipped between the base portion 34a and the clip portion 34c. The retaining clip 34 is further provided with a snap member 34e that snaps into the recess 25c when the clip 34 is installed such that the clip 34 is retained onto the end wall 25b via a snap-fit type connection. The clip member 34 can also be provided with protrusions 34f that can snap into recesses formed in the housing body 20 to further secure the clip member 34.

Positioning Arrangement 70

Referring to FIGS. 3A, 3B, 6B, 6C, and 6D, it can be seen that the air cleaner 10 is provided with a positioning arrangement 70 disposed within a well area 27 of the housing body 20. In one aspect, the well area 27 is defined by a pair of sidewall portions 27a and a sidewall portion 27b. The portions 27a, 27b are a part of the housing body sidewall 22a. The positioning arrangement 70 is designed to ensure that a proper filter cartridge 100 is installed into the air cleaner 10. In one aspect, the positioning arrangement creates an internal profile within the housing body 20 that requires the filter cartridge 100 to have a matching and complementarily shaped profile in order to be received fully into the housing body 20. In the embodiment shown, the positioning arrangement 70 is formed by a pair of arrays with spaced apart ribs 29b extending from the housing body sidewall 22a to pin extensions 29a. In the example shown, five pins 29a and ribs 29b are shown on each side of the housing body interior region 20i. The pins 29a and ribs 29b are each configured to receive and retain an insert module 72. In the embodiment shown, three insert modules 72 are mounted onto the pins 29a and ribs 29b on each side of the housing body 20. As should be appreciated, the positioning arrangement 70 is modular in nature and thus can be customized to achieve a number of different internal profiles to fit a particular application. For example, one, two, four, or all five insert modules 72 could be installed on each side. Where less than five insert modules 72 are utilized, the spacing between the insert modules 72 can likewise be customized (e.g. spaced on every other pin 29a, etc.). Also, the number and arrangement of the insert modules 72 can be different from one side of the housing body 20 to the other. Once the desired number and arrangement of insert modules 72 is selected, the filter cartridge 100 can then be designed such that no part of the filter cartridge interferes with the insert modules 72. An asymmetrical arrangement (side-to-side or front-to-back) can be selected such that it is impossible to inadvertently insert the filter cartridge 100 in the reverse direction, thus ensuring that even a properly selected filter is properly installed.

Figure 6B:
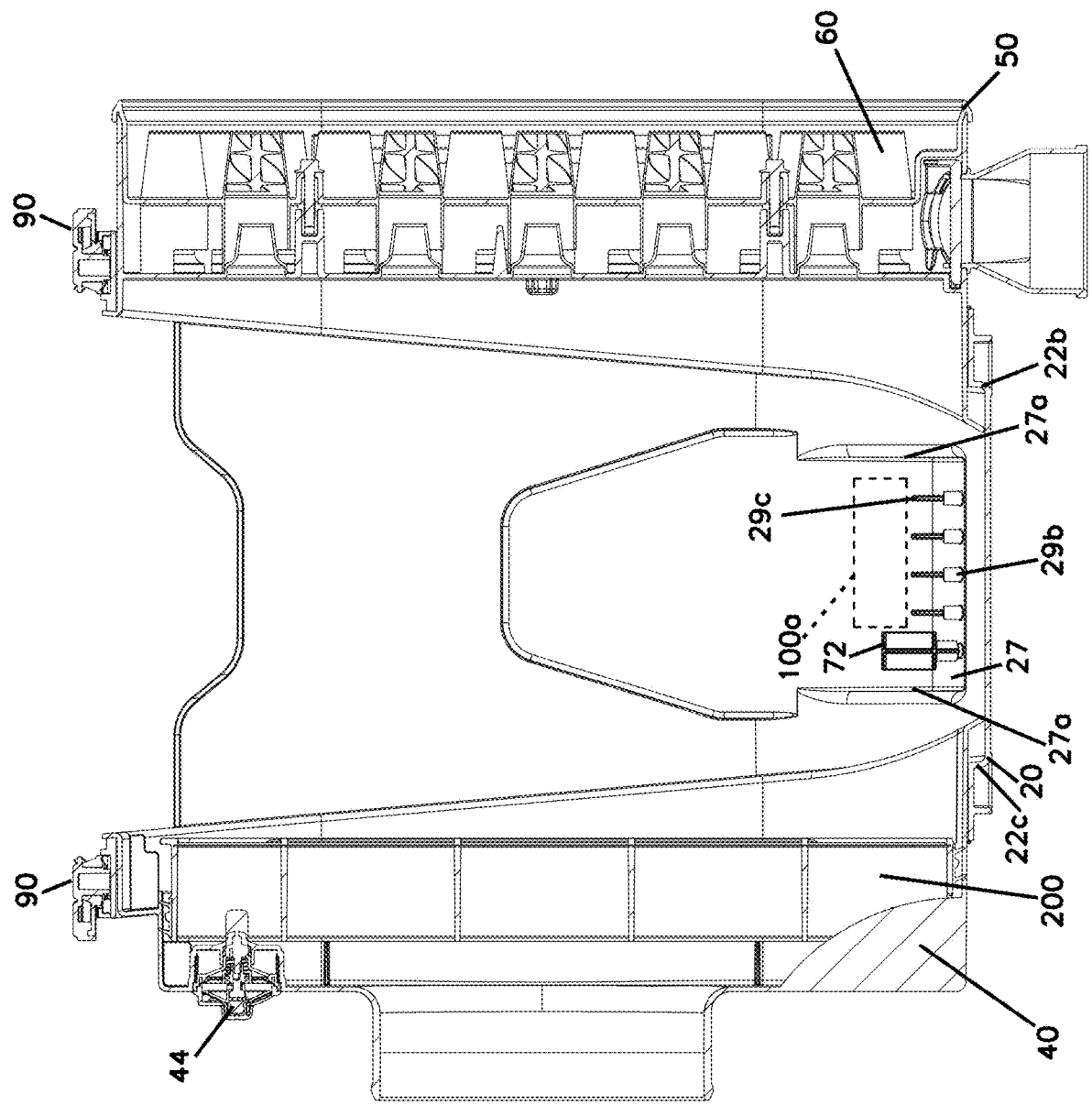
FIG. 6B is a cross-sectional view of the air cleaner shown in FIG. 6A with the filter cartridges removed from the air cleaner.
Figure 6D:
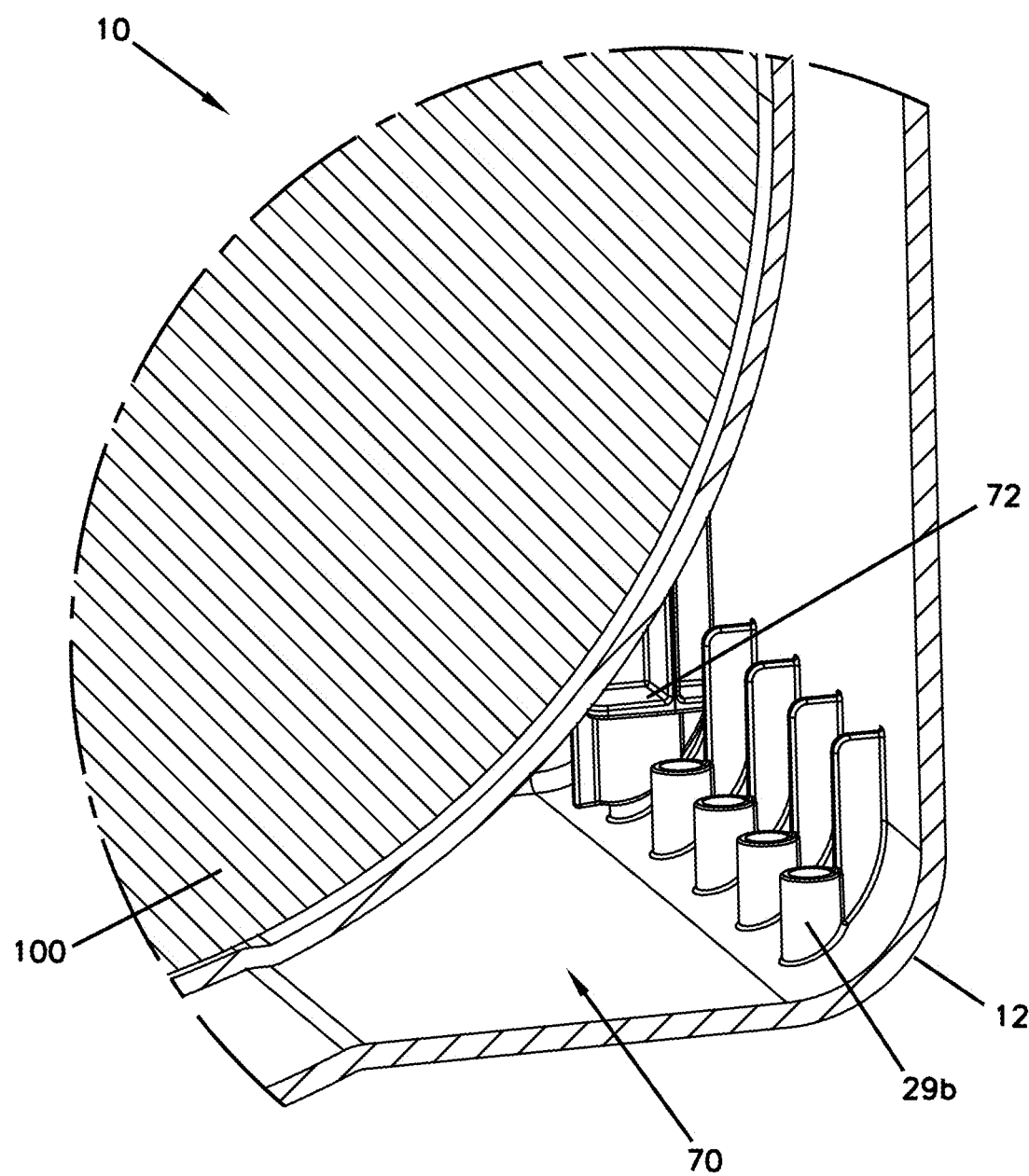
FIG. 6D is an enlarged view of a portion of the air cleaner shown in FIG. 6C.
Figure 6E:
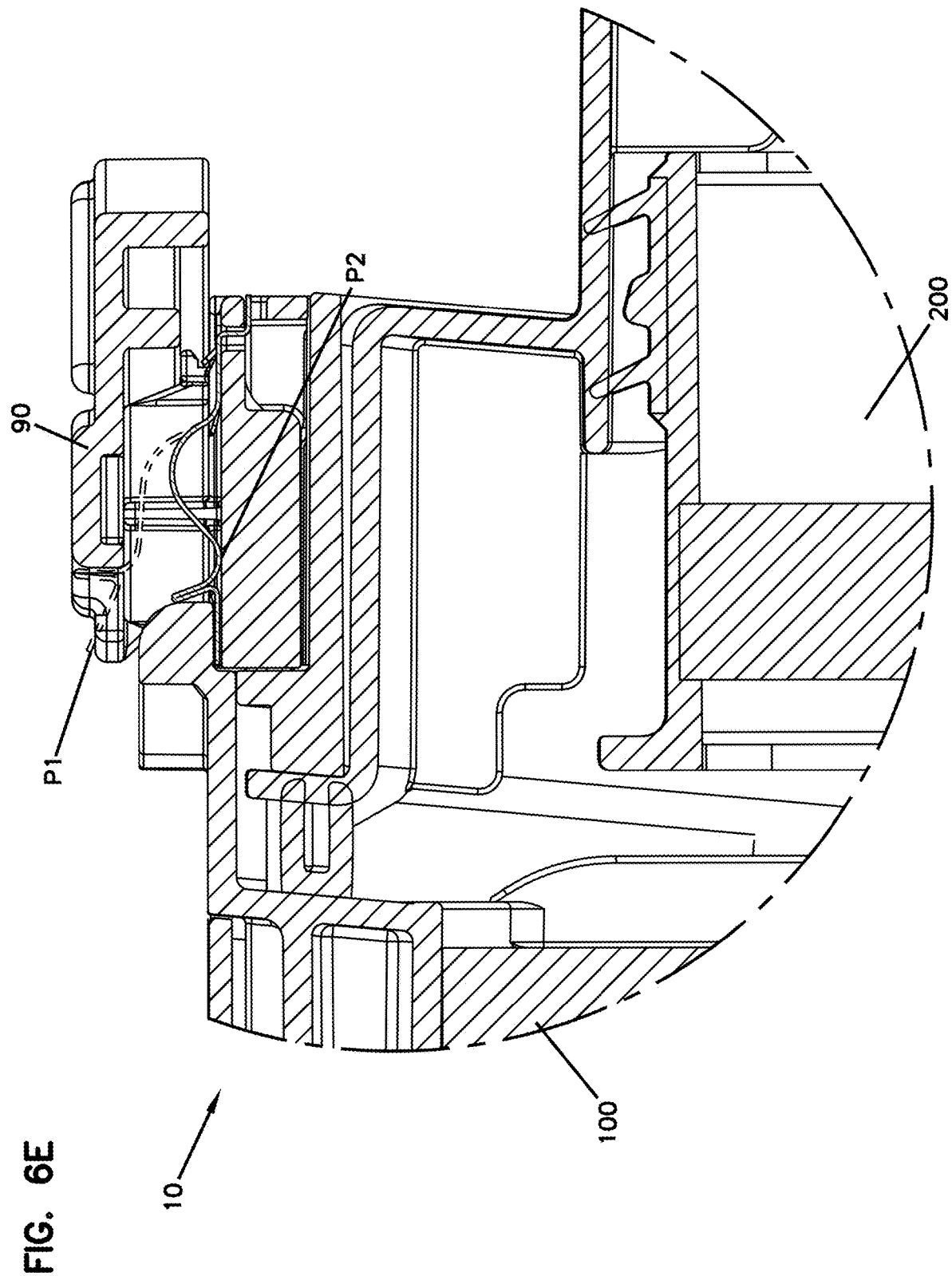
FIG. 6E is a cross-sectional view of the air cleaner shown in FIG. 1, taken along the line 6E-6E in FIG. 6.

With reference to FIG. 6B, an example filter cartridge 100 profile portion or extension 100a is shown in which portions of the filter cartridge profile 100a extend between the open spaces defined between the insert modules 72 and in which no portion of the filter cartridge profile 100a extends into a space occupied by an insert module 72. Thus, it is illustrated that a filter cartridge 100 must have a profile generally corresponding to profile 100a in order to be fully received within the interior region 20i of the housing body 20 in the proper orientation. In the embodiment shown, the profile extension 100a is a protrusion integrally formed with the filter cartridge shell 120.

FIGS. 99-105a show an example insert module 72 which includes a main body 72a a recess 72b for receiving the pin 29a and a recess 72c for receiving the rib 29b. The insert module 72b is also shown as including a profile head 72d which can act as an interference surface for an improperly selected and/or installed filter cartridge 100. The insert module 72 can also be provided with a pin structure 72e disposed within the recess 72b that can be received by a corresponding opening 27c in the pins 29b.

Aspects of the Disclosure

Various aspects of the disclosure are further described in the following paragraphs.

A side-load air filter cartridge comprising: a media pack configured for installation into a side opening of an air cleaner housing, the media pack extending along a longitudinal axis between an inlet end and an outlet end, the media pack defining an outer perimeter; a seal arrangement operatively positioned with respect to the media pack, the seal arrangement defining an axial seal surface facing towards the outlet flow end, a portion of which is arranged at an oblique angle to the longitudinal axis; and a first connection member configured to engage with a lock mechanism of the air cleaner to secure the media pack within the air cleaner housing, the first connection member being operably connected to the media pack with a portion of the first connection member extending axially beyond the media pack outlet flow end. In one example, the connection member extends axially beyond all or a portion of the axial seal surface.

Any of the side-load filter cartridges described herein, further including a second connection member located opposite the first connection member and proximate the first or second axial end.

Any of the side-load filter cartridges described herein, wherein one or both of the first and second connection members is aligned with a first plane, the first plane extending through the media pack longitudinal axis and defining an axis of symmetry of the media pack.

Any of the side-load filter cartridges described herein, wherein the first connection member has an axis of symmetry aligned with an axis of symmetry of the media pack.

Any of the side-load air filter cartridges described herein, wherein one or both of the first and second connection members each include an arc-shaped sidewall.

Any of the side-load air filter cartridges described herein, wherein each arc-shaped sidewall extends orthogonally away from the media pack and longitudinal axis.

Any of the side-load air filter cartridges described herein, wherein each arc-shaped sidewall includes a detent for receiving a corresponding feature on a lock mechanism mounted to the housing.

Any of the side-load air filter cartridges described herein, further including at least one tab structure for interacting with a corresponding lock mechanism associated with the housing.

Any of the side-load air filter cartridges described herein, wherein the at least one tab structure extends in a direction parallel to the longitudinal axis.

Any of the side-load air filter cartridges described herein, wherein the at least one tab structure includes at least two tab structures that extend away from each other such that a first tab structure extends axially beyond the media pack outlet end and a second tab structure extends axially beyond the media pack inlet end.

Any of the side-load air filter cartridges described herein, further comprising a circumferential shell surrounding the media pack outer perimeter.

Any of the side-load air filter cartridges described herein, further comprising a cover portion.

Any of the side-load air filter cartridges described herein, wherein the cover portion is integrally formed with the circumferential shell.

Any of the side-load air filter cartridges described herein, wherein one or both of the first and second connection members are provided on the cover portion.

Any of the side-load air filter cartridges described herein, wherein tab structures are provided on the cover portion.

Any of the side-load air filter cartridges described herein, wherein the cover portion includes a handle for installing and removing the media pack from an air cleaner housing, the handle being external to the media pack outer perimeter.

Any of the side-load air filter cartridges described herein, wherein the handle extends in a direction parallel to the media pack longitudinal axis.

Any of the side-load air filter cartridges described herein, wherein the handle is integrally formed with the cover portion.

Any of the side-load air filter cartridges described herein, wherein the media pack has a first length and the handle has a second length that is a majority of the first length.

A side-load air filter cartridge comprising: a media pack configured for installation into a side opening of an air cleaner housing, the media pack extending along a longitudinal axis and defining an outer perimeter; and a seal arrangement operatively positioned with respect to the media pack, the seal arrangement defining an axial seal surface facing generally towards the inlet flow end or outlet flow end, a portion of which is arranged at an oblique angle to the longitudinal axis; wherein a second segment of the axial seal surface deviates away from a first segment of the axial seal surface in an axial direction such that the axial seal surface second segment falls outside of a plane or curved surface defined by the axial seal surface first segment.

Any of the side-load air filter cartridges described herein, wherein the oblique angle is between 91 and 135 degrees.

Any of the side-load air filter cartridges described herein, wherein the oblique angle is 100 degrees.

Any of the side-load filter cartridges described herein, wherein the axial seal surface first segment is disposed at a first oblique angle and the axial seal surface second segment is disposed at a second oblique angle, wherein the second oblique angle is less than the first oblique angle.

Any of the side-load filter cartridges described herein, wherein the first oblique angle is between 91 and 135 degrees and the second oblique angle is between 60 and 70 degrees.

Any of the side-load filter cartridges described herein, wherein the first oblique angle is 100 degrees and the second oblique angle is 152 degrees.

Any of the side-load air filter cartridges described herein, wherein both the first and second segments of the seal arrangement are disposed at an oblique angle to the media pack outlet end.

Any of the side-load air filter cartridges described herein, wherein the axial seal surface second segment is aligned along a second plane that is disposed at an oblique angle to the first plane.

Any of the side-load air filter cartridges described herein, wherein the first segment of the seal arrangement crosses a plane defined by the media pack outlet end.

Any of the side-load air filter cartridges described herein, wherein one or both of the axial seal surface first and second segments has a curved profile shape.

Any of the side-load air filter cartridges described herein, wherein one or both of the axial seal surface first and second segments has a linear profile.

Any of the side-load air filter cartridges described herein, wherein the axial seal surface first and second segments are planar and are joined by an intermediate radiused portion.

Any of the side-load air filter cartridges described herein, wherein the axial seal surface first segment defines a majority of a total length of the axial seal surface.

Any of the side-load air filter cartridges described herein, wherein the seal arrangement is injection molded.

Any of the side-load filter cartridges described herein, further comprising: a circumferential shell surrounding at least a portion of the media pack outer perimeter; wherein at least a portion of the seal arrangement is disposed about the circumferential shell.

Any of the side-load filter cartridges described herein, further comprising: a seal support flange circumscribing at least a portion of the circumferential shell; wherein the seal arrangement is supported by the seal support flange.

Any of the side-load filter cartridges described herein, wherein the seal arrangement is injection molded onto the seal support flange.

Any of the side-load filter cartridges described herein, wherein the media pack is fluted media.

Any of the side-load filter cartridges described herein, wherein the first seal arrangement circumscribes at least a portion of the media pack outer perimeter.

Any of the side-load air filter cartridges described herein, further including a handle for installing and removing the media pack from an air cleaner housing, the handle being external to the media pack outer perimeter.

Any of the side-load air filter cartridges described herein, wherein the handle extends in a direction parallel to the media pack longitudinal axis.

Any of the side-load air filter cartridges described herein, wherein the handle is integrally formed with a cover portion.

Any of the side-load air filter cartridges described herein, wherein the media pack has a first length and the handle has a second length that is a majority of the first length.

A side-load air filter cartridge comprising: a media pack configured for installation into a side opening of an air cleaner housing, the media pack extending along a longitudinal axis and defining an outer perimeter; and a first seal arrangement operatively positioned with respect to the media pack and defining a first axial seal surface; and a second seal arrangement operatively positioned with respect to the media pack and defining a second axial seal surface, wherein the second axial seal surface faces generally away from the first axial seal surface; wherein a distance between corresponding axially opposite first segments of the first and second axial seal surfaces increases at a first rate along a length of the first segments and wherein a distance between corresponding axially opposite second segments of the first and second axial seal surfaces increases at a second rate along a length of the second segments, wherein the second rate is different than the first rate.

A side-load air filter cartridge comprising: a media pack configured for installation into a side opening of an air cleaner housing, the media pack extending along a longitudinal axis and defining an outer perimeter; and a first seal arrangement operatively positioned with respect to the media pack and defining a first axial seal surface opposite a first seal support flange supporting the first seal arrangement; and a second seal arrangement operatively positioned with respect to the media pack and defining a second axial seal surface opposite a second seal support flange supporting the second seal arrangement, wherein the second axial seal surface faces generally away from the first axial seal surface; wherein the media pack extends axially beyond at least a portion of one or both of the first and second axial seal surfaces.

A side-load air filter cartridge comprising: a media pack configured for installation into a side opening of an air cleaner housing, the media pack extending along a longitudinal axis and defining an outer perimeter; and a first seal arrangement operatively positioned with respect to the media pack and defining a first axial seal surface; and a second seal arrangement operatively positioned with respect to the media pack and defining a second axial seal surface, wherein the second axial seal surface faces generally away from the first axial seal surface; wherein the media pack extends axially beyond at least a portion of one or both of the first and second axial seal surfaces.

Any of the side-load air filter cartridges described herein, wherein the first seal arrangement first segment is disposed at a first oblique angle to the second seal arrangement first segment.

Any of the side-load air filter cartridges described herein, wherein the first oblique angle is between 5 and 20 degrees.

Any of the side-load air filter cartridges described herein, wherein the first axial seal surface first segment is disposed in a non-parallel relationship with the first axial seal second segment.

Any of the side-load air filter cartridges described herein, wherein the second axial seal surface first segment is disposed in a non-parallel relationship with the second axial seal second segment.

Any of the side-load air filter cartridges described herein, wherein the first and second axial seal surface first d segments are disposed at an oblique angle to the media pack outlet end.

Any of the side-load air filter cartridges described herein, wherein the first oblique angle is between 10 and 20 degrees.

Any of the side-load air filter cartridges described herein, wherein the first oblique angle is 10 degrees.

Any of the side-load air filter cartridges described herein, wherein the first segment of one or both of the first and second seal arrangements crosses a plane defined by the media pack inlet or outlet end.

Any of the side-load air filter cartridges described herein, wherein one or both of the axial seal surface first and second segments of one or both of the first and second seal arrangements defines a curved surface.

Any of the side-load air filter cartridges described herein, wherein one or both of the axial seal surface first and second segments of one or both of the first and second seal arrangements defines a planar surface.

Any of the side-load air filter cartridges described herein, wherein the axial seal surface first and second segments of one or both of the first and second seal arrangements are joined by an intermediate radiused portion.

Any of the side-load air filter cartridges described herein, wherein the axial seal surface first segment of one or both of the first and second seal arrangements is aligned along a first plane and the axial seal surface second segment of one or both of the first and second seal arrangements is disposed in a non-parallel relationship with the first portion.

Any of the side-load air filter cartridges described herein, wherein the axial seal surface second segments of one or both of the first and second seal arrangements defines a curved surface.

Any of the side-load filter cartridges described herein, further comprising: a first seal support flange circumscribing at least a portion of the circumferential shell; wherein the first seal arrangement is supported by the first seal support flange.

Any of the side-load filter cartridges described herein, wherein the first seal arrangement is injection molded onto the seal support flange.

Any of the side-load filter cartridges described herein, further comprising: a first seal support flange circumscribing at least a portion of the circumferential shell; a second seal support flange circumscribing at least a portion of the circumferential shell; wherein the first seal arrangement is supported by the first seal support flange and the second seal arrangement is supported by the second seal support flange.

Any of the side-load filter cartridges described herein, wherein the first and second seal arrangements are respectively injection molded onto the first and second seal support flanges.

Any of the side-load filter cartridges described herein, wherein the media pack is fluted media.

Any of the side-load filter cartridges described herein, wherein one or both of the first and second seal arrangements circumscribe at least a portion of the media pack outer perimeter.

Any of the side-load air filter cartridges described herein, further including a handle for installing and removing the media pack from an air cleaner housing, the handle being external to the media pack outer perimeter.

Any of the side-load air filter cartridges described herein, wherein the handle extends in a direction parallel to the media pack longitudinal axis.

Any of the side-load air filter cartridges described herein, wherein the handle is integrally formed with a cover portion.

Any of the side-load air filter cartridges described herein, wherein the media pack has a first length and the handle has a second length that is a majority of the first length.

An air cleaner assembly comprising: a housing defining an inlet and an outlet, and including an access opening between the inlet and outlet; a filter cartridge received within the housing, the filter cartridge covering the access opening; a lock mechanism, the lock mechanism being movable between an unlocked position in which the filter cartridge can be installed and removed from the housing and a locked position in which the filter cartridge is secured within the housing; wherein the filter cartridge and lock mechanism include interacting features enabling the lock mechanism to be moved from the unlocked position to the locked position only when the filter cartridge is installed within the housing.

Any of the air cleaner assemblies described herein, wherein the interacting features include a tab on the filter cartridge and a lock spring mounted within the lock mechanism.

Any of the air cleaner assemblies described herein, wherein the lock spring is movable between a relaxed position and a deflected position, and wherein when the spring is in the relaxed position the lock spring prevents rotation of an operator part of the lock mechanism such that the lock mechanism is prevented from being rotated out of the unlocked position.

Any of the air cleaner assemblies described herein, wherein the lock spring includes a latch portion that engages with the operator part when the lock spring is in the relaxed position.

Any of the air cleaner assemblies described herein, wherein the latch portion engages with a side edge of the operator part when the lock spring is in the relaxed position.

Any of the air cleaner assemblies described herein, wherein when the tab of the filter cartridge moves the lock spring to the deflected position when the filter cartridge is fully installed within the housing.

Any of the air cleaner assemblies described herein, wherein the lock mechanism includes two lock mechanisms.

Any of the air cleaner assemblies described herein, wherein the lock mechanism includes a rotatable operator part that engages with a portion of the filter cartridge when the lock mechanism is in the locked position.

Any of the air cleaner assemblies described herein, further including a handle for installing and removing the media pack from the air cleaner housing, the handle being external to the media pack outer perimeter.

Any of the air cleaner assemblies described herein, wherein the handle extends in a direction parallel to the media pack longitudinal axis.

Any of the air cleaner assemblies described herein, wherein the handle is integrally formed with a cover portion.

Any of the air cleaner assemblies described herein, wherein the media pack has a first length and the handle has a second length that is a majority of the first length.

A lock mechanism for securing an air filter cartridge within an air cleaner housing, the lock mechanism comprising: a base part configured for mounting to a housing of the air filter cartridge; an operator part rotatably mounted to the base part, the operator part being rotatable between an unlocked position and a locked position; and a lock spring mounted to the base part, the lock spring being movable between a relaxed position and a deflected position, wherein when the lock spring is in the relaxed position, the operator part is prevented from rotating to the locked position from the unlocked position.

Any of the lock mechanisms described herein, wherein the operator part defines a recess area for receiving a tab portion of the filter cartridge for moving the lock spring from the relaxed position to the locked position.

Any of the lock mechanisms described herein, wherein a portion of the lock spring extends into the operator part recess area.

Any of the lock mechanisms described herein, wherein the lock spring includes a latch portion that engages with the operator part when the lock spring is in the relaxed position.

Any of the lock mechanisms described herein, wherein the latch portion engages with a side edge of the operator part when the lock spring is in the relaxed position.

Any of the lock mechanisms described herein, further comprising a retaining ring securing the operator part to the base part.

Any of the lock mechanisms described herein, wherein the operator part includes a stem portion extending through the base part, and wherein the retaining ring is mounted to the stem to secure the operator part to the base part.

Any of the lock mechanisms described herein, wherein the base part includes mounting features for securing the base part to the air cleaner housing.

Any of the lock mechanisms described herein, wherein the lock mechanism includes a pair of lock springs.

Any of the lock mechanisms described herein, wherein the lock mechanism includes a pair of recessed areas.

An air cleaner assembly comprising: a housing defining an inlet and an outlet, and including an access opening between the inlet and outlet; a filter cartridge received within the housing, the filter cartridge including a cover part that covers the access opening, the cover part including a tab structure; and a lock mechanism comprising: a base part mounted to the housing of the air filter cartridge; an operator part rotatably mounted to the base part, the operator part being rotatable between an unlocked position and a locked position; and a lock spring mounted to the base part, the lock spring being movable between a relaxed position and a deflected position, wherein when the lock spring is in the relaxed position, the operator part is prevented from rotating to the locked position from the unlocked position.

Any of the air cleaner assemblies described herein, wherein the operator part includes a stem portion received in a central aperture of the base part, and wherein the operator part is secured to the base part by a retaining ring mounted to the stem portion.

Any of the air cleaner assemblies described herein, wherein the operator part defines a recess area for receiving the tab structure of the filter cartridge, wherein the tab structure moves the lock spring from the relaxed position to the locked position when the filter cartridge is installed within the housing.

Any of the air cleaner assemblies described herein, wherein the lock spring includes a latch portion that engages with the operator part when the lock spring is in the relaxed position.

Any of the air cleaner assemblies described herein, wherein the lock mechanism includes a pair of lock springs.

Any of the air cleaner assemblies described herein, wherein the lock mechanism includes a pair of recessed areas.

Any of the air cleaner assemblies described herein, further including a handle for installing and removing the media pack from the air cleaner housing, the handle being external to the media pack outer perimeter.

Any of the air cleaner assemblies described herein, wherein the handle extends in a direction parallel to the media pack longitudinal axis.

Any of the air cleaner assemblies described herein, wherein the handle is integrally formed with a cover portion.

Any of the air cleaner assemblies described herein, wherein the media pack has a first length and the handle has a second length that is a majority of the first length.

A filter housing comprising: a main body extending between a first end and a second end, the main body defining an access opening between the first and second ends, the access opening being for receiving a filter cartridge, the main body having a first flange located at the outlet end; and an outlet body extending between a base end and an outlet end, the outlet body having an outlet body flange proximate the base end, wherein the outlet body is connected to the main body such that the outlet body flange is adjacent the main body first flange with the first flange being located between the outlet body flange and the outlet body outlet end.

Any of the filter housings described herein, wherein the outlet body is connected to the main body with a snap-fit connection.

Any of the filter housings described herein, wherein the outlet body defines a first sealing surface against which a filter cartridge disposed within the main body can form a seal.

Any of the filter housings described herein, wherein the outlet body defines a first seal flange defining the first seal surface for forming a first seal with the filter cartridge.

Any of the filter housings described herein, further comprising: a main body second flange located at the inlet end; an inlet body extending between a base end and an inlet end, the inlet body having an inlet body flange proximate the base end, wherein the inlet body is connected to the main body such that the inlet body flange is adjacent the main body second flange with the second flange being located between the inlet body flange and the outlet body inlet end.

Any of the filter housings described herein, wherein the inlet body is connected to the main body with a snap-fit connection.

Any of the filter housings described herein, wherein the inlet body defines a second seal flange defining a second seal surface for forming a second seal with a filter cartridge housed within the main body.

A filter housing comprising: a main body extending between a first end and a second end, the main body defining an access opening between the first and second ends, the access opening being for receiving a filter cartridge, the main body having a first flange located at the inlet end; and an inlet body extending between a base end and an inlet end, the inlet body having an inlet body flange proximate the base end, wherein the inlet body is connected to the main body such that the inlet body flange is adjacent the main body first flange with the second flange being located between the inlet body flange and the outlet body inlet end.

Any of the filter housings described herein, wherein the inlet body is connected to the main body with a snap-fit connection.

Any of the filter housings described herein, wherein the inlet body defines a first sealing surface against which a filter cartridge disposed within the main body can form a seal.

Any of the filter housings described herein, wherein the inlet body defines a first seal flange defining the first seal surface for forming a first seal with the filter cartridge.

Any of the filter housings described herein, further comprising: a main body second flange located at the inlet end; an outlet body extending between a base end and an outlet end, the outlet body having an outlet body flange proximate the base end, wherein the outlet body is connected to the main body such that the outlet body flange is adjacent a main body second flange with the second flange being located between the outlet body flange and the outlet body outlet end.

Any of the filter housings described herein, wherein the outlet body is connected to the main body with a snap-fit connection.

Any of the filter housings described herein, wherein the outlet body defines a second sealing surface against which a filter cartridge disposed within the main body can form a seal.

Any of the filter housings described herein, wherein the outlet body defines a second seal flange defining the second seal surface for forming a second seal with the filter cartridge.

An air cleaner housing comprising: a main body extending between a first end and a second end, the main body defining an access opening between the first and second ends, the access opening being for receiving a filter cartridge, the main body having a first flange located at the outlet end; an outlet body extending between a base end and an outlet end, the outlet body having an outlet body flange proximate the base end, wherein the outlet body is connected to the main body such that the outlet body flange is adjacent the main body first flange with the first flange being located between the outlet body flange and the outlet body outlet end; and an inlet body extending between a base end and an inlet end, the inlet body having an inlet body flange proximate the base end, wherein the inlet body is connected to the main body such that the inlet body flange is adjacent the main body second flange with the second flange being located between the inlet body flange and the outlet body inlet end.

Any of the air cleaner filter housings described herein, wherein the inlet body and the outlet body are connected to the main body with snap-fit connections.

Any of the air cleaner filter housings described herein, wherein the outlet body defines a first sealing surface against which a filter cartridge disposed within the main body can form a first seal and the inlet body defines a second sealing surface against which the filter cartridge can form a second seal.

Any of the air cleaner filter housings described herein, wherein the outlet body defines a first seal flange defining the first seal surface and the inlet body defines a second seal flange defining the second seal surface.

Any of the air cleaner filter housings described herein, wherein the inlet body includes a precleaner air separator and the outlet body is configured to house a secondary filter cartridge.

An air cleaner assembly comprising: a housing defining an inlet and an outlet, and including an access opening between the inlet and outlet; an air filter cartridge operably installed within the housing; and a pair of mounting arrangements located on an exterior side of the housing, wherein each of the pair of mounting arrangements slidably retains at least one mounting bolt.

Any of the air cleaner assemblies described herein, wherein the housing defines a pair of channel structures, wherein each of the pair of mounting arrangements is installed within one of the pair of channel structures.

Any of the air cleaner assemblies described herein, wherein each of the pair of mounting arrangements includes a first channel part and a second channel part, wherein the second channel part is received within the second channel part.

Any of the air cleaner assemblies described herein, wherein the first channel part includes a flange portions that retains a head of the at least one mounting bolt within the mounting structure.

Any of the air cleaner assemblies described herein, wherein the second channel part includes sidewalls that prevent the head of the at least one mounting bolt from rotating with respect to the mounting structure.

Any of the air cleaner assemblies described herein, wherein the first channel part flange portions of each of the pair of first channel parts define an opening for receiving the head of the at least one mounting bolt.

Any of the air cleaner assemblies described herein, wherein each of the pair of mounting arrangements includes an elastic elongate spacer positioned within the second channel part, the spacer being for retaining the position of the at least one mounting bolt and for dampening vibration between the at least one mounting bolt and the mounting structure.

Any of the air cleaner assemblies described herein, wherein the at least one mounting bolt includes a pair of mounting bolts.

Any of the air cleaner assemblies described herein, further including a plurality of mounting clips secured to the pair of channel structures, the plurality of mounting clips being for providing a fixed mounting position for the air cleaner assembly.

Any of the air cleaner assemblies described herein, wherein each of the plurality of mounting clips includes a threaded connection for receiving a mounting bolt.

Any of the air cleaner assemblies described herein, wherein each of the plurality of mounting clips is attached to the housing with a snap-fit connection.

An air cleaner assembly comprising: a housing defining an inlet and an outlet, and including an access opening between the inlet and outlet; a filter cartridge received within an interior region of the housing, the filter cartridge defining a insertion profile portion; and a positioning arrangement located within an interior of the housing, the position arrangement defining an interior profile having a complementary shape to the insertion profile portion of the filter cartridge, wherein the filter cartridge can only be fully inserted into the interior region of the housing when the filter cartridge is oriented in a single direction.

Any of the air cleaner assemblies described herein, wherein the positioning arrangement includes two positioning arrangements and the filter cartridge insertion profile portion includes two profile portions.

Any of the air cleaner assemblies described herein, further including a handle for installing and removing the media pack from the air cleaner housing, the handle being external to the media pack outer perimeter.

Any of the air cleaner assemblies described herein, wherein the handle extends in a direction parallel to the media pack longitudinal axis.

Any of the air cleaner assemblies described herein, wherein the handle is integrally formed with a cover portion.

Any of the air cleaner assemblies described herein, wherein the media pack has a first length and the handle has a second length that is a majority of the first length.

Methods of making and using an air cleaner assembly or a filter cartridge, such as any of the embodiments of air cleaner assemblies or filter cartridges shown or described herein.

An access cover for securing an air filter cartridge within an air cleaner housing, the cover comprising: a main body extending between a first axial end and a second axial end and between an exterior side and an interior side, the interior side being adapted to exert a closing force onto the air filter cartridge; a first connection member operably connected to the access cover main body, wherein the first connection member is located proximate the main body first axial end, the connection member interacting with a lock mechanism of the air cleaner housing to fix the axial position of the main body with respect to the housing and to generate the closing force when the access cover is secured to the air cleaner housing by the first connection member.

Any of the access covers described herein, further including a second connection member located opposite the first connection member proximate the second axial end.

Any of the access covers described herein, wherein one or both of the first and second connection members are integrally formed with the main body.

Any of the access covers described herein, wherein one or both of the first and second connection members each include an arc-shaped sidewall.

Any of the access covers described herein, wherein each arc-shaped sidewall extends orthogonally away from the media pack and longitudinal axis.

Any of the access covers described herein, wherein each arc-shaped sidewall includes a detent for receiving a corresponding feature on a lock mechanism mounted to the housing.

Any of the access covers described herein, wherein one or both of the first and second connection members each include a tab structure for interacting with a corresponding lock mechanism associated with the housing.

Any of the access covers described herein, wherein one or both of the tab structures of the first and second connection members extend in a direction parallel to the longitudinal axis.

Any of the access covers described herein, wherein the tab structures of one or both of the first and second connection members extend away from each other such that a first tab structure extends axially beyond the media pack outlet end and a second tab structure extends axially beyond the media pack inlet end.

Any of the access covers described herein, wherein the tab structures of one or both of the first and second connection members each include a pair of axially extending parallel tabs.

Any of the access covers described herein, wherein each arc-shaped sidewall is at least partially supported by one of the tab structures.

Any of the access covers described herein, wherein the main body includes an integrally formed handle.

Any of the access covers described herein, wherein the handle extends axially between the pair of connection features.

Any of the access covers described herein, wherein the main body has a longitudinal axis of symmetry.

Any of the access covers described herein, wherein the main body has a transverse axis of symmetry.

A side-load air filter cartridge comprising: a media pack configured for installation into a side opening of an air cleaner housing, the media pack extending along a longitudinal axis between an inlet face and an outlet face, the media pack defining an outer perimeter; a seal arrangement operatively positioned with respect to the media pack, the seal arrangement defining an axial seal surface facing towards the outlet flow end, a portion of which is arranged at an oblique angle to the longitudinal axis; and an access cover for securing the media pack within an air cleaner housing, the access cover including a main body extending between a first axial end and a second axial end and between an exterior side and an interior side, wherein the access cover first and second axial ends extend beyond the inlet and outlet faces of the media pack and wherein the first and second interior sides extend beyond the media pack outer perimeter to define a closure surface, wherein the closure surface has a varying profile relative to the longitudinal axis and has a first axis of symmetry that is orthogonal to the media pack longitudinal axis.

Any of the side-load air filter cartridges described herein, wherein the access cover has a second axis of symmetry that is parallel to the media pack longitudinal axis.

Any of the side-load air filter cartridges described herein, further including a second connection member located opposite the first connection member proximate the second axial end.

Any of the side-load air filter cartridges described herein, wherein one or both of the first and second connection members are integrally formed with the main body.

Any of the side-load air filter cartridges described herein, wherein one or both of the first and second connection members each include an arc-shaped sidewall.

Any of the side-load air filter cartridges described herein, wherein each arc-shaped sidewall extends orthogonally away from the media pack and longitudinal axis.

Any of the side-load air filter cartridges described herein, wherein each arc-shaped sidewall includes a detent for receiving a corresponding feature on a lock mechanism mounted to the housing.

Any of the side-load air filter cartridges described herein, wherein one or both of the first and second connection members each include a tab structure for interacting with a corresponding lock mechanism associated with the housing.

Any of the side-load air filter cartridges described herein, wherein one or both of the tab structures of the first and second connection members extend in a direction parallel to the longitudinal axis.

Any of the side-load air filter cartridges described herein, wherein the tab structures of one or both of the first and second connection members extend away from each other such that a first tab structure extends axially beyond the media pack outlet end and a second tab structure extends axially beyond the media pack inlet end.

Any of the side-load air filter cartridges described herein, wherein the tab structures of one or both of the first and second connection members each include a pair of axially extending parallel tabs.

Any of the side-load air filter cartridges described herein, wherein each arc-shaped sidewall is at least partially supported by one of the tab structures.

Any of the side-load air filter cartridges described herein, wherein the main body includes an integrally formed handle.

Any of the side-load air filter cartridges described herein, wherein the handle extends axially between the pair of connection features.

Any of the side-load air filter cartridges described herein, wherein the main body has a longitudinal axis of symmetry.

Any of the side-load air filter cartridges described herein, wherein the main body has a transverse axis of symmetry.

An air filter cartridge comprising: a media pack configured for installation into an air cleaner housing, the media pack extending along a longitudinal axis between an inlet face and an outlet face; a seal arrangement operatively positioned with respect to the media pack, the seal arrangement defining an radial seal surface; and a support frame having an inlet end proximate the media pack inlet face and an outlet end proximate the media pack outlet face, wherein the support frame defines: a perimeter portion circumscribing the media pack; a handle portion proximate the inlet end, the handle portion being for allowing an operator to install and remove the air filter cartridge into and out of the air cleaner housing; a first member of a positioning arrangement proximate the outlet end, the first member being for interacting with a second member of the positioning arrangement located on the air cleaner housing to fix the position of the air filter cartridge with respect to the air cleaner housing.

Any of the air filter cartridges described herein, wherein the handle portion extends away from the perimeter portion in a radial direction.

Any of the air filter cartridges described herein, wherein the first member of the positioning arrangement is a slot defined within the perimeter portion, wherein the slot extends in a direction parallel to the media pack longitudinal axis.

Any of the air filter cartridges described herein, wherein the support frame perimeter portion, the handle portion, and the first member are integrally formed as a single component.

Any of the air filter cartridges described herein, wherein the seal arrangement is mounted to the support frame.

Any of the air filter cartridges described herein, wherein the seal arrangement is non-planar.

Any of the air filter cartridges described herein, wherein a first portion of the seal arrangement is proximate the media pack inlet end and a second portion of the seal arrangement is proximate the media pack outlet end.

Any of the air filter cartridges described herein, wherein the seal arrangement first portion is oppositely positioned from the handle portion on the support frame and the seal arrangement second portion is oppositely positioned from the first member of the positioning arrangement on the support frame.

Any of the air filter cartridges described herein, wherein the media pack includes pleated media.

Any of the air filter cartridges described herein, wherein the seal arrangement includes a pair of lip seals.

Any of the air filter cartridges described herein, wherein the seal arrangement is injection molded onto the support frame.

A method of serving an air cleaner, the method including: positioning one or more lock mechanisms mounted to a housing of the air cleaner into an unlocked position, wherein the one or more lock mechanisms are prevented from being moved from the unlocked position to a locked position when a filter cartridge is removed from the housing; inserting a filter cartridge into the air cleaner housing, wherein the step of inserting the filter cartridge enables the one or more lock mechanisms to be movable from the unlocked position to the locked position; and moving the one or more lock mechanisms into the locked position. The method of servicing, wherein the one or more lock mechanisms includes a pair of lock mechanisms. The method of servicing, wherein the one or more lock mechanisms includes a lock spring that prevents the one or more lock mechanisms from moving to the locked position from the unlocked position when the lock spring is in a first position, and wherein the filter cartridge includes a component for moving the lock spring out of the first position.

The present invention has now been described with reference to several embodiments thereof. The entire disclosure of any patent or patent application identified herein is hereby incorporated by reference. The foregoing detailed description and examples have been given for clarity of understanding only. No unnecessary limitations are to be understood therefrom. It will be apparent to those skilled in the art that many changes can be made in the embodiments described without departing from the scope of the invention. Thus, the scope of the present invention should not be limited to the structures described herein, but only by the structures described by the language of the claims and the equivalents of those structure

What is claimed is:

1. A side-load air filter cartridge comprising:
   a. a media pack configured for installation into a side opening of an air cleaner housing, the media pack extending along a longitudinal axis and defining an outer perimeter; and
   b. a first seal arrangement operatively positioned with respect to the media pack, the first seal arrangement defining a first axial seal surface facing generally towards the inlet flow end or outlet flow end, a portion of which is arranged at an oblique angle to the longitudinal axis;
   c. wherein a second segment of the first axial seal surface deviates away from a first segment of the first axial seal surface in an axial direction such that the first axial seal surface second segment falls outside of a plane defined by the first axial seal surface first segment.

2. The side-load filter cartridge of claim 1, wherein the first axial seal surface first segment is disposed at a first oblique angle and the first axial seal surface second segment is disposed at a second oblique angle, wherein the second oblique angle is greater than the first oblique angle.

3. The side-load air filter cartridge of claim 1, wherein the first segment of the first seal arrangement crosses a plane defined by the media pack outlet end.

4. The side-load air filter cartridge of claim 1, further comprising a second seal arrangement operatively positioned with respect to the media pack, the seal arrangement defining a second axial seal surface facing away from the first axial seal surface, wherein the second axial seal surface is arranged at an oblique angle to the longitudinal axis.

5. The side-load air filter cartridge of claim 4, wherein a second segment of the second axial seal surface deviates away from a first segment of the second axial seal surface in an axial direction such that the axial seal surface second segment falls outside of a plane defined by the axial seal surface first segment.

* * * * *